(12) United States Patent
Bykowski

(10) Patent No.: US 11,572,855 B2
(45) Date of Patent: Feb. 7, 2023

(54) FUEL TANK AND PUMP SYSTEM

(71) Applicant: Kohler Co., Kohler, WI (US)

(72) Inventor: Jonathan T. Bykowski, Shorewood, WI (US)

(73) Assignee: KOHLER CO.

( * ) Notice: Subject to any disclaimer, the term of this patent is extended or adjusted under 35 U.S.C. 154(b) by 0 days.

(21) Appl. No.: 17/484,441

(22) Filed: Sep. 24, 2021

(65) Prior Publication Data

US 2022/0010757 A1    Jan. 13, 2022

Related U.S. Application Data

(63) Continuation of application No. 16/910,666, filed on Jun. 24, 2020, now Pat. No. 11,143,151, which is a
(Continued)

(51) Int. Cl.
*F02M 37/10* (2006.01)
*B60K 15/03* (2006.01)
(Continued)

(52) U.S. Cl.
CPC .......... *F02M 37/103* (2013.01); *B01D 29/03* (2013.01); *B01D 35/005* (2013.01);
(Continued)

(58) Field of Classification Search
CPC .... F02M 37/025; F02M 37/103; F02M 37/50; F02M 37/22; B01D 29/03
See application file for complete search history.

(56) References Cited

U.S. PATENT DOCUMENTS

| 4,651,899 A * | 3/1987 | Pauls | B65D 81/32 222/402.1 |
| 4,657,156 A * | 4/1987 | Uranishi | B60K 15/04 137/590 |

(Continued)

FOREIGN PATENT DOCUMENTS

| CN | 106640425 | 5/2017 |
| CN | 209539483 | 10/2019 |

OTHER PUBLICATIONS

Summit Racing Equipment website, Tanks Inc. PA Series Fuel Pump Modules PA-A, https://www.summitracing.com/parts/tnk-pa-a?seid=sresel&cm_mmc=pla-google-_-shopping-_-sresel-_-tanks-nc&gclid=EAIalQobChMI-6mj3Zvh1QI%E2%80%A6, retrieved Aug. 18, 2017, pp. 1-2.

(Continued)

Primary Examiner — Long T Tran
(74) Attorney, Agent, or Firm — The Belles Group, P.C.

(57) ABSTRACT

An in-tank fuel pump assembly and mounting system is disclosed which may be configured for mounting inside a fuel tank. The assembly includes a pump housing, pump mounted to the housing, and pressure relief valve. The housing may comprise upper and lower pump housing units coupled together. The upper housing unit is configured for mounting to a tank opening, which in one implementation may be the fuel fill opening. The lower housing unit extends into the tank to approximately the bottom of the tank. A fuel fill fluid pathway is created through the housing for adding fuel to the tank while the pump assembly remains in situ. The upper housing unit may include a removable fuel cap. The pump housing may include an integral vapor trap.

20 Claims, 59 Drawing Sheets

Related U.S. Application Data continuation of application No. 16/137,808, filed on Sep. 21, 2018, now Pat. No. 10,731,613.

(60) Provisional application No. 62/569,206, filed on Oct. 6, 2017.

(51) Int. Cl.

| | | |
|---|---|---|
| *B60K 15/04* | (2006.01) | |
| *F02M 37/00* | (2006.01) | |
| *F02M 37/22* | (2019.01) | |
| *B01D 29/03* | (2006.01) | |
| *B01D 35/00* | (2006.01) | |
| *B01D 35/027* | (2006.01) | |
| *F02M 37/50* | (2019.01) | |
| *B60K 15/035* | (2006.01) | |

(52) U.S. Cl.
CPC ..... *B01D 35/0273* (2013.01); *F02M 37/0076* (2013.01); *F02M 37/22* (2013.01); *F02M 37/50* (2019.01); *B60K 15/03* (2013.01); *B60K 15/035* (2013.01); *B60K 15/03519* (2013.01); *B60K 15/0406* (2013.01); *B60K 2015/0319* (2013.01); *B60K 2015/03236* (2013.01); *B60K 2015/03243* (2013.01); *B60K 2015/03296* (2013.01); *B60K 2015/03453* (2013.01); *B60K 2015/03514* (2013.01); *B60K 2015/0438* (2013.01); *B60K 2015/0496* (2013.01)

(56) References Cited

U.S. PATENT DOCUMENTS

| | | | |
|---|---|---|---|
| 4,822,258 A | 4/1989 | Matsuda et al. | |
| 4,853,123 A * | 8/1989 | Hayes | F02M 37/50 |
| | | | 210/416.4 |
| 4,860,714 A | 8/1989 | Bucci | |
| 5,070,849 A | 12/1991 | Rich et al. | |
| 5,080,077 A | 1/1992 | Sawert et al. | |
| 5,361,742 A | 11/1994 | Briggs et al. | |
| 5,368,001 A | 11/1994 | Roche | |
| 5,449,029 A | 9/1995 | Harris | |
| 5,511,957 A | 4/1996 | Tuckey | |
| 5,623,907 A | 4/1997 | Cotton | |
| 5,680,847 A | 10/1997 | Begley et al. | |
| 5,687,778 A | 11/1997 | Harris | |
| 5,787,865 A | 8/1998 | Harris et al. | |
| 5,992,473 A * | 11/1999 | Hammonds | F02M 25/14 |
| | | | 417/408 |
| 6,142,126 A | 11/2000 | Kanamaru | |
| 6,216,671 B1 | 4/2001 | Sawert et al. | |
| 6,250,287 B1 * | 6/2001 | Wickman | F02M 37/10 |
| | | | 123/497 |
| 6,293,770 B1 | 9/2001 | Matsumoto et al. | |
| 6,302,144 B1 | 10/2001 | Graham et al. | |
| 6,439,205 B2 | 8/2002 | Ushigome | |
| 6,598,594 B2 | 7/2003 | Takahashi | |
| 6,679,227 B2 | 1/2004 | Sawert et al. | |
| 6,923,208 B2 | 8/2005 | Okabe et al. | |
| 7,677,225 B2 | 3/2010 | Radue et al. | |
| 7,874,817 B2 | 1/2011 | Gettel et al. | |
| 8,079,479 B2 | 12/2011 | Leppert | |
| 8,286,802 B2 | 10/2012 | Leppert | |
| 8,360,740 B2 | 1/2013 | Leppert et al. | |
| 9,004,884 B2 | 4/2015 | Leppert | |
| 10,731,613 B2 | 8/2020 | Bykowski | |
| 10,975,814 B1 * | 4/2021 | Matusek | F02M 37/106 |
| 10,995,711 B1 * | 5/2021 | Matusek | F02M 37/0052 |
| 2001/0023687 A1 * | 9/2001 | Ushigome | F02M 37/025 |
| | | | 123/514 |
| 2002/0014225 A1 * | 2/2002 | Ushigome | F02M 37/44 |
| | | | 123/514 |
| 2003/0213477 A1 | 11/2003 | Ramamurthy et al. | |
| 2004/0163630 A1 | 8/2004 | Powell | |
| 2006/0070941 A1 | 4/2006 | Cline et al. | |
| 2011/0139278 A1 | 6/2011 | Kawajiri et al. | |
| 2011/0146628 A1 | 6/2011 | Powell et al. | |
| 2011/0315127 A1 | 12/2011 | Jackson | |
| 2012/0067034 A1 | 3/2012 | McClure | |
| 2013/0133765 A1 | 5/2013 | Israelson et al. | |
| 2018/0087475 A1 | 3/2018 | Mills et al. | |
| 2020/0056571 A1 * | 2/2020 | Fornara | F02M 37/0088 |
| 2020/0318590 A1 | 10/2020 | Bykowski | |
| 2021/0146773 A1 * | 5/2021 | Fukuoka | F02M 37/106 |

OTHER PUBLICATIONS

MR Power Systems website, APS Twin Pump Fuel System for the Pontiac Gto, Aps Automotive Pty. Ltd., http://www.airpowersystems.com/gto/fuel/apsgto-fss06.htm, retrieved Aug. 18, 2017, pp. 1-5.
First Office Action in Corresponding CN Application No. 201811156219.5, dated Jul. 10, 2020.

* cited by examiner

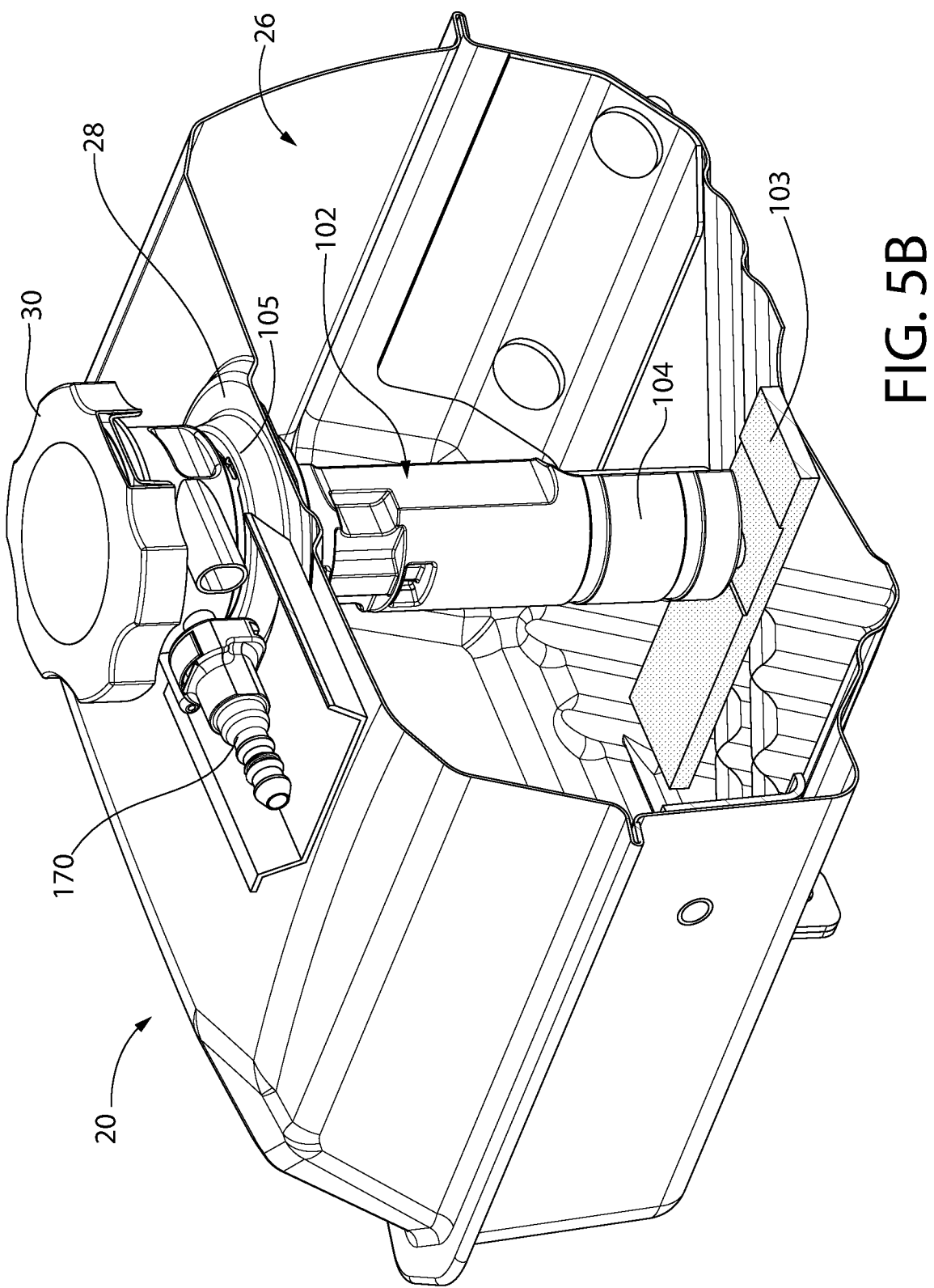

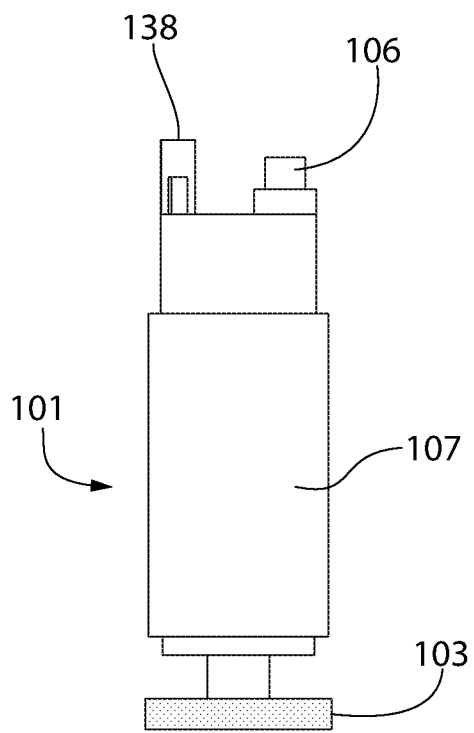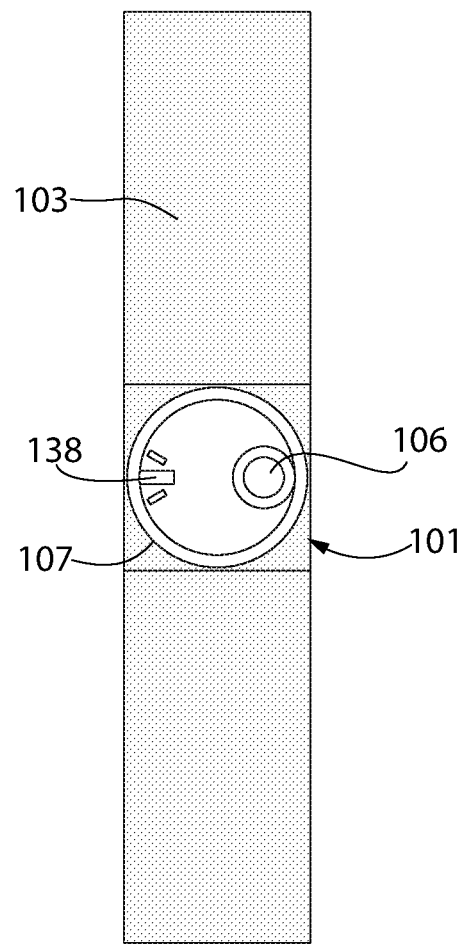
FIG. 9C
FIG. 9D

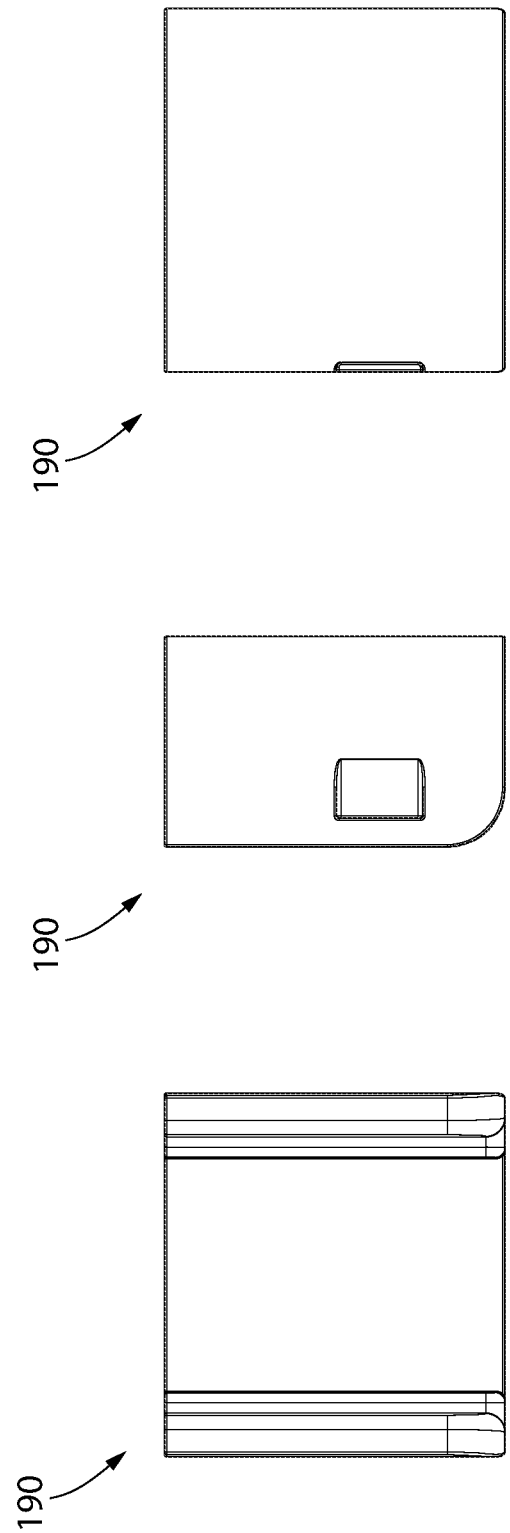

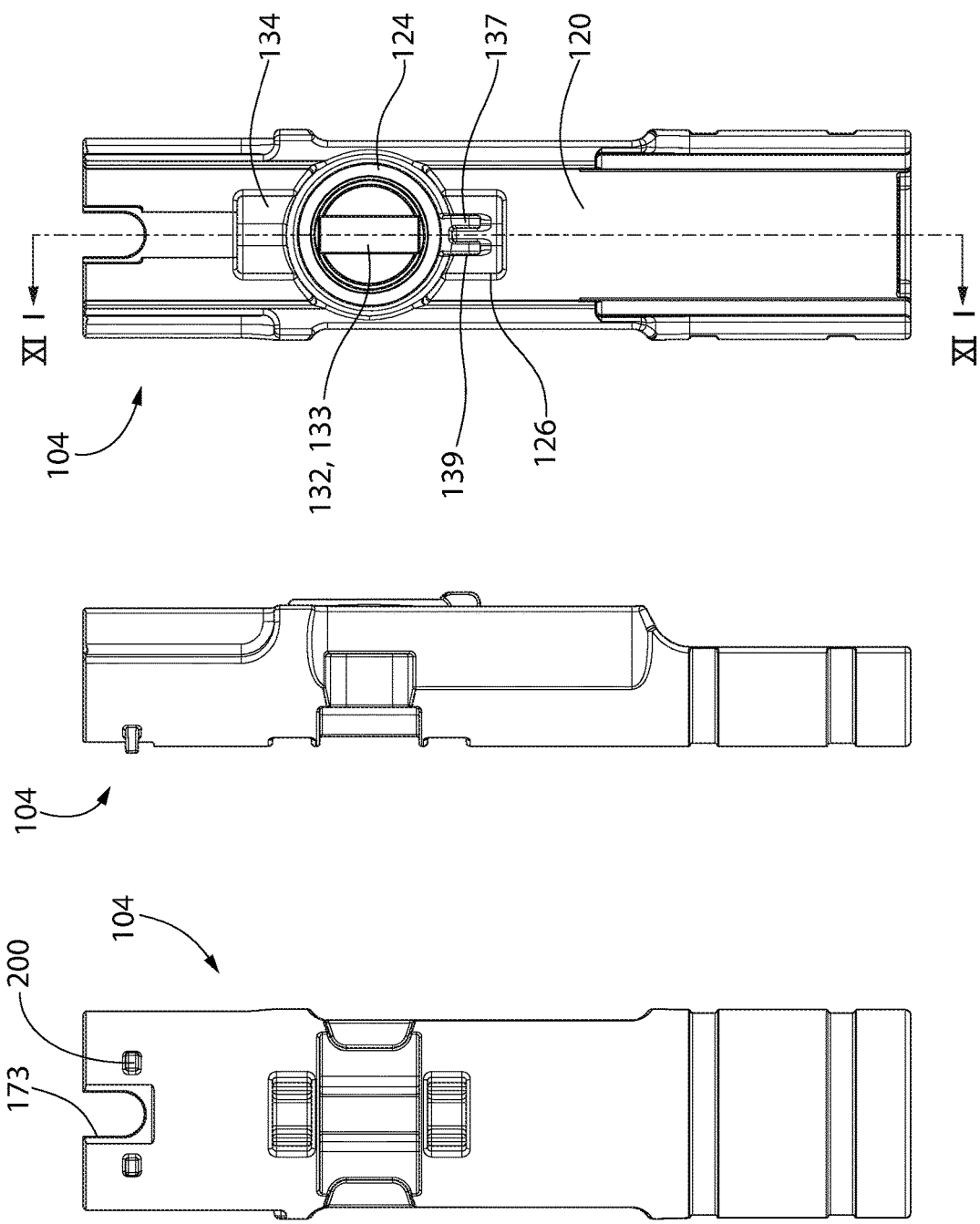

FUEL TANK AND PUMP SYSTEM

CROSS-REFERENCE TO RELATED APPLICATIONS

The present application is a continuation of U.S. patent application Ser. No. 16/910,666 filed Jun. 24, 2020, which is a continuation of U.S. patent application Ser. No. 16/137,808 filed Sep. 21, 2018 (now U.S. Pat. No. 10,731,613), which claims the benefit of U.S. Provisional Application No. 62/569,206 filed Oct. 6, 2017; the entireties of which are all incorporated herein by reference.

BACKGROUND OF THE DISCLOSURE

The present disclosure generally relates to fuel delivery systems for engine-driven devices and apparatuses, and more particularly to a system and method for supporting an in-tank type of fuel pump.

Gasoline engines with fuel injection require liquid fuel to be delivered to the engine at a higher and steadier pressure than typical carbureted gasoline engines. Because of this, a different type of fuel pump is used with fuel injected engines. Fuel pumps for fuel injected engines are most often electrically driven, and they operate at a constant speed whenever the power is switched on. The pump is designed to supply more fuel than the engine can consume, and the continued over-pumping generates pressure in the fuel supply line. A relief valve holds the pressure at the desired limit, and relieves any excess pressure by allowing some fuel to run back to the tank. Some fuel tanks may be fabricated in two halves to allow the pump to be mounted first inside the tank before the tank pieces are assembled. Other tanks may be one-piece molded fabrications. In addition to the fuel fill opening, prior fuel tanks generally have a separate opening dedicated specifically for the fuel pump.

An improved system and method is desired for mounting a fuel pump of a liquid fuel delivery system inside the fuel tank.

SUMMARY OF THE DISCLOSURE

A fuel pump assembly and mounting system is disclosed which may be configured and operable for mounting the pump assembly inside a fully assembled fuel tank. The fuel pump assembly may be mounted to the tank in a sufficiently rigid manner for fuel injection engine applications. In one aspect, the fuel pump may be configured for mounting in the same opening used for fuel fill. Advantageously, this dual-use single opening obviates the need for a separate opening for the fuel pump alone as in past designs. This results in a more compact construction and eliminates the separate tank opening for the pump which creates a secondary connection site for potential fuel leakage in addition to added fabrication costs. The fuel pump assembly may form part of a liquid fuel delivery or supply system for supplying fuel to an engine-operated device or apparatus. In one configuration, the apparatus may be a self-driven vehicle capable of moving over a liquid or solid surface or terrain. The fuel source may be gasoline in one implementation.

In one aspect, a fuel pump assembly comprises: a pump housing configured for mounting to a fuel fill opening of a fuel tank; at least a portion of the pump housing defining a fuel fill fluid pathway between the fuel fill opening and an interior of the fuel tank; and a fuel pump mounted to the pump housing for dispensing fuel from the fuel tank through the fuel fill opening. In one implementation, a discharge flow tube is fluidly coupled to the fuel pump for discharging the pressurized fuel from the pump, the discharge flow tube being routed through the fuel fill fluid pathway in the pump housing.

In another aspect, a fuel supply system comprises: a tank including a reservoir for holding fuel and a fuel fill opening fluidly communicating with the reservoir; a fuel pump system mounted in the tank through the fuel fill opening, at least a portion of the fuel pump system defining a fuel fill fluid pathway between the fuel fill opening and the reservoir; and the fuel pump system comprising a fuel pump disposed in the reservoir, the fuel pump operable to dispense fuel from the tank through the fuel fill opening.

In another aspect, a method for mounting a fuel pump in a fuel tank comprises: providing a pump housing including a fuel pump and an inlet fuel filter coupled to the fuel pump, the filter being resiliently deformable between a flattened unfolded condition and a folded condition; aligning the pump housing with a fuel fill opening in a fuel tank, the filter being in the unfolded condition; inserting a lower portion of the pump housing through the fuel fill opening; engaging the filter with the fuel tank at the fuel fill opening, the engagement collapsing the filter from the unfolded condition to the folded condition; and spreading the filter from the folded condition to the unfolded condition once the filter disengages the fuel tank at the fuel fill opening; wherein the pump housing is positioned through the fuel fill opening.

BRIEF DESCRIPTION OF THE DRAWINGS

The features of the example ("exemplary") embodiments will be described with reference to the following drawings where like elements are labeled similarly, and in which:

FIG. 5B is a perspective cross-sectional thereof;
FIG. 9C is a third side view thereof;
FIG. 9D is a top view thereof;
FIG. 10A is a first side view of a retainer for frictionally coupling a lower pump housing unit to an upper pump housing unit of the pump housing;
FIG. 10B is a second side view thereof;
FIG. 10C is a third side view thereof.

FIG. 13C is a first side view thereof;
FIG. 13D is a second side view thereof;
FIG. 13E is a third side view thereof.

Figure 1:
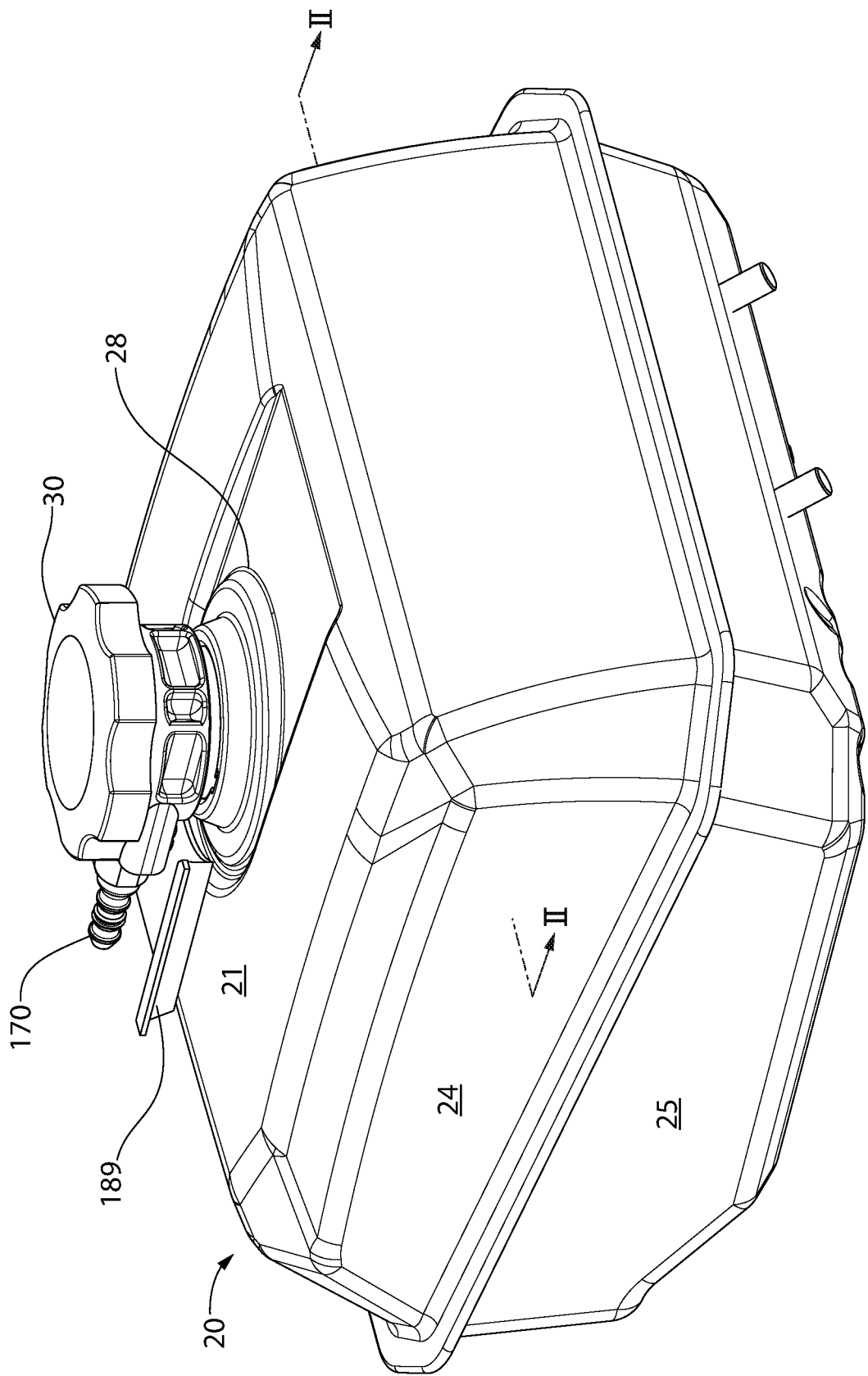
FIG. 1 is a perspective view of a fuel pump assembly and fuel supply system according to the present disclosure.
Figure 2:
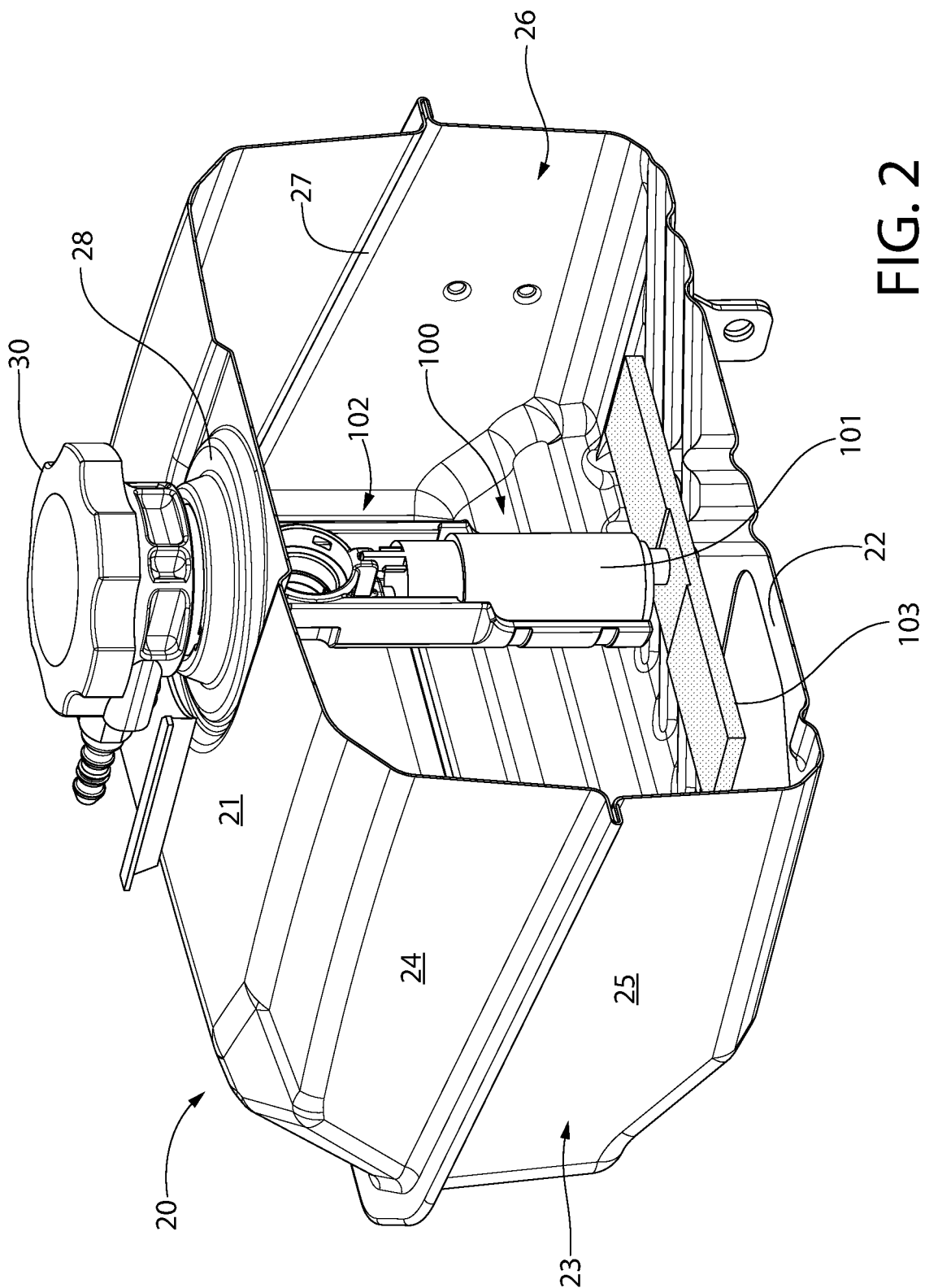
FIG. 2 is a cutaway view thereof.
Figure 3:
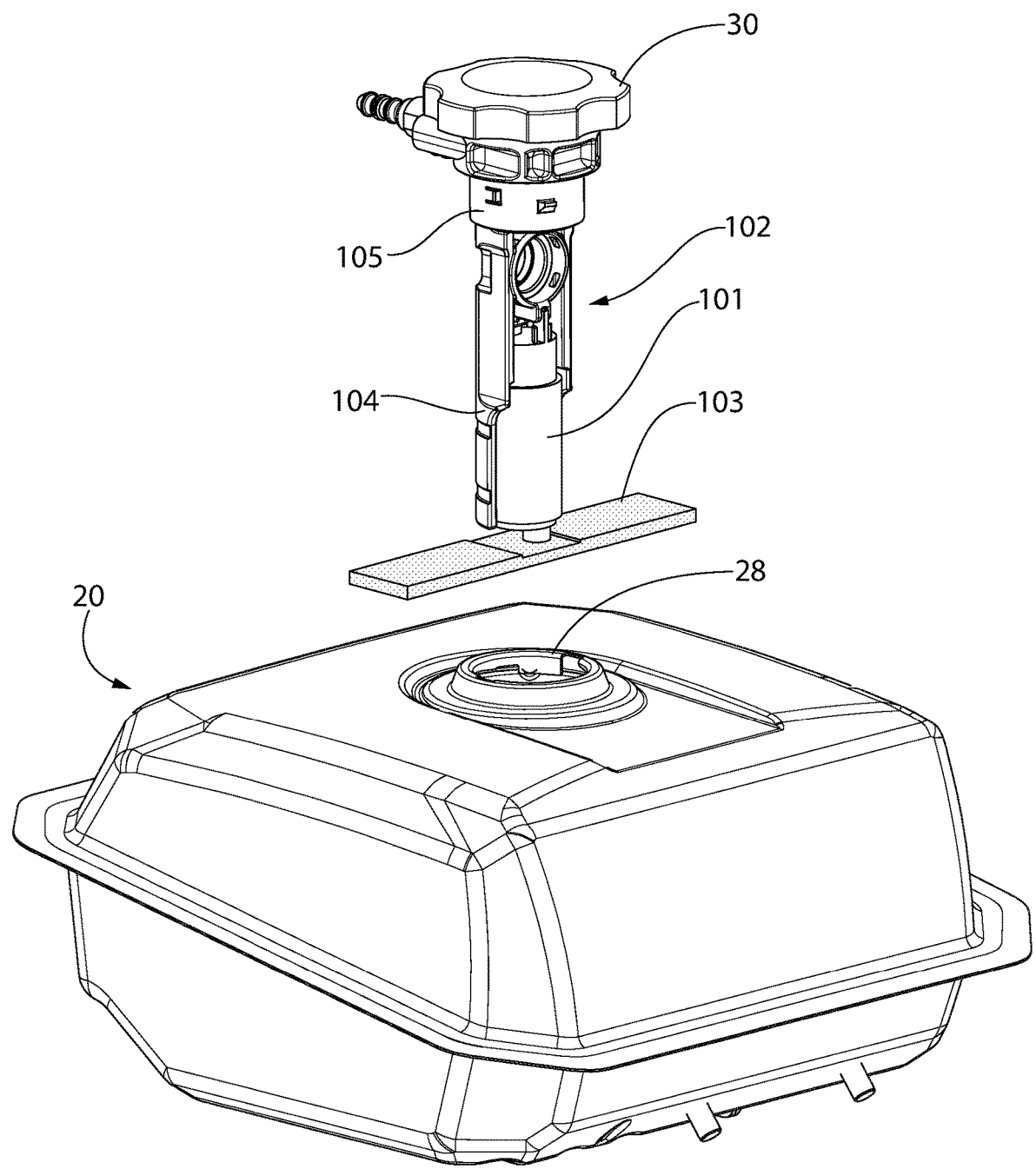
FIG. 3 is an exploded view thereof.
Figure 4:
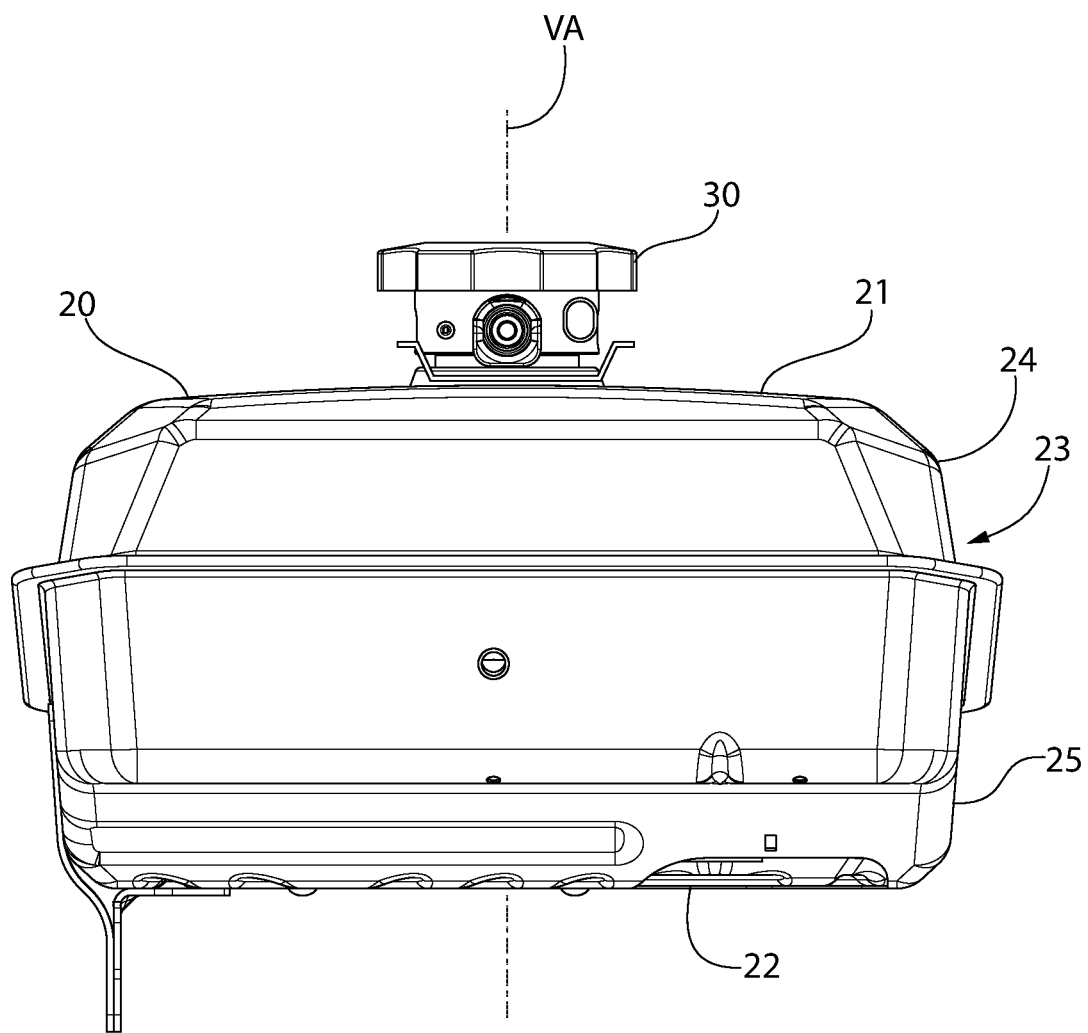
FIG. 4 is a side view thereof.
Figure 5A:
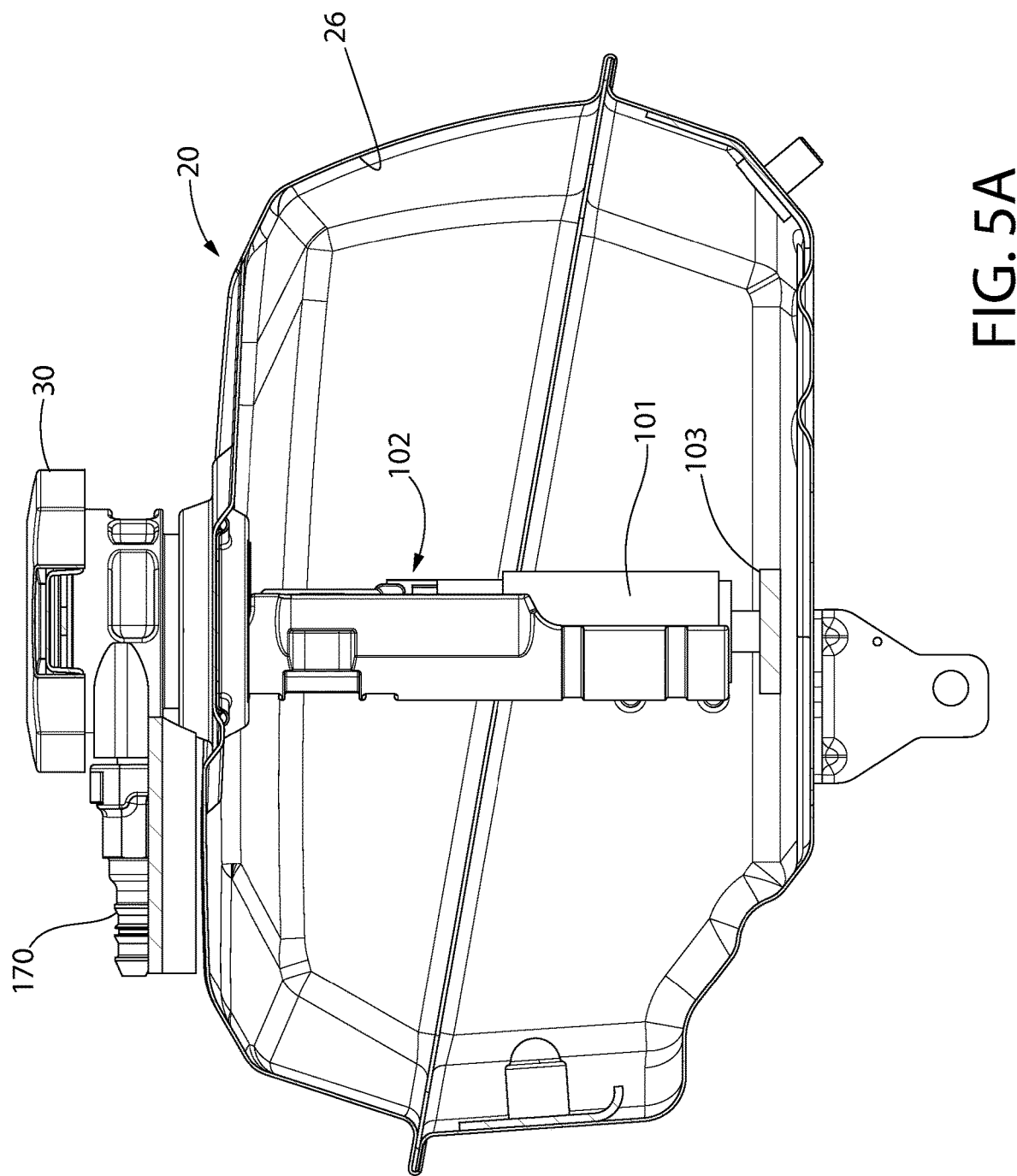
FIG. 5A is a transverse cross-sectional view thereof.
Figure 6A:
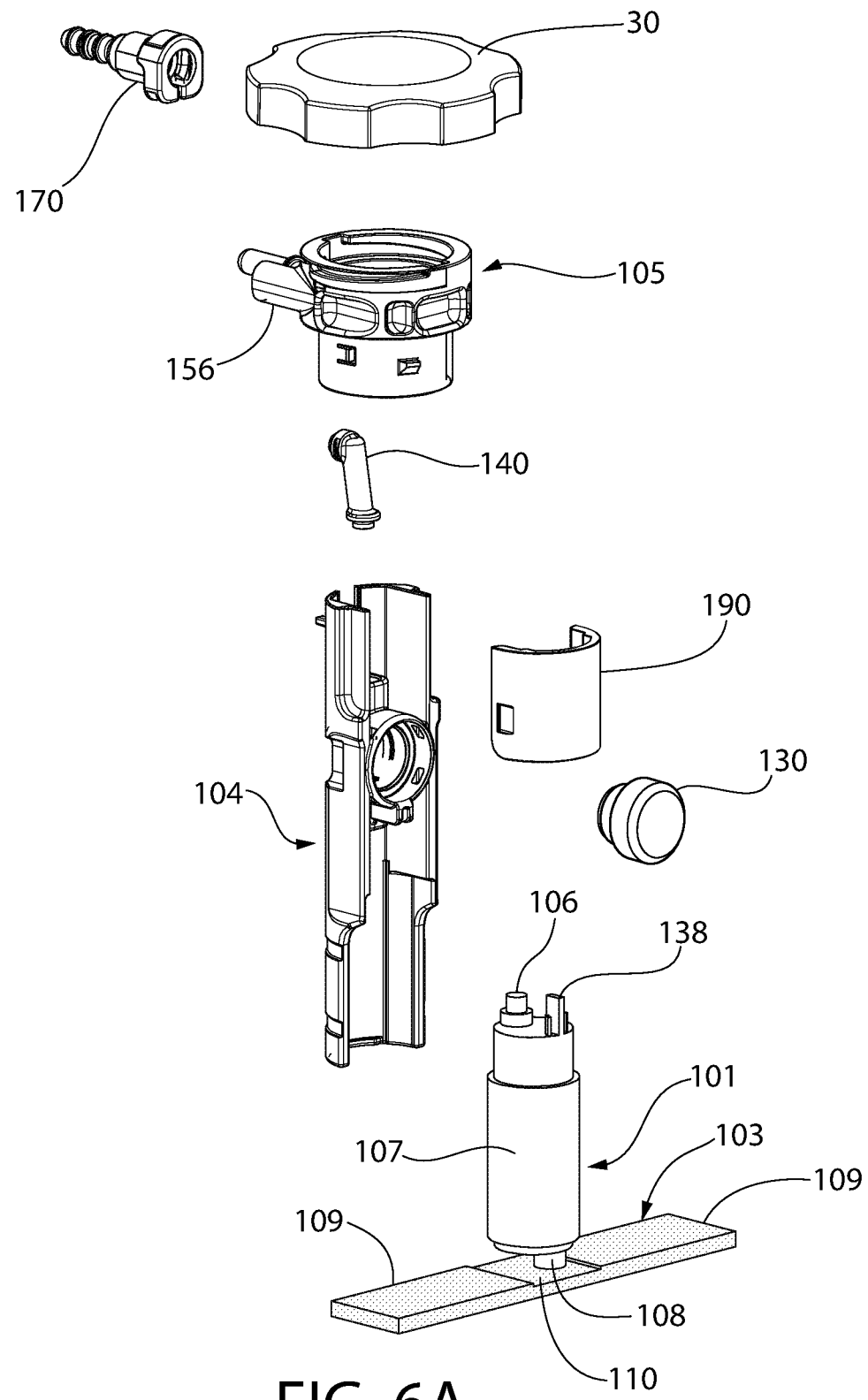
FIGS. 6A and 6B are exploded top and bottom perspective views respectively of the fuel pump assembly.
Figure 6B:
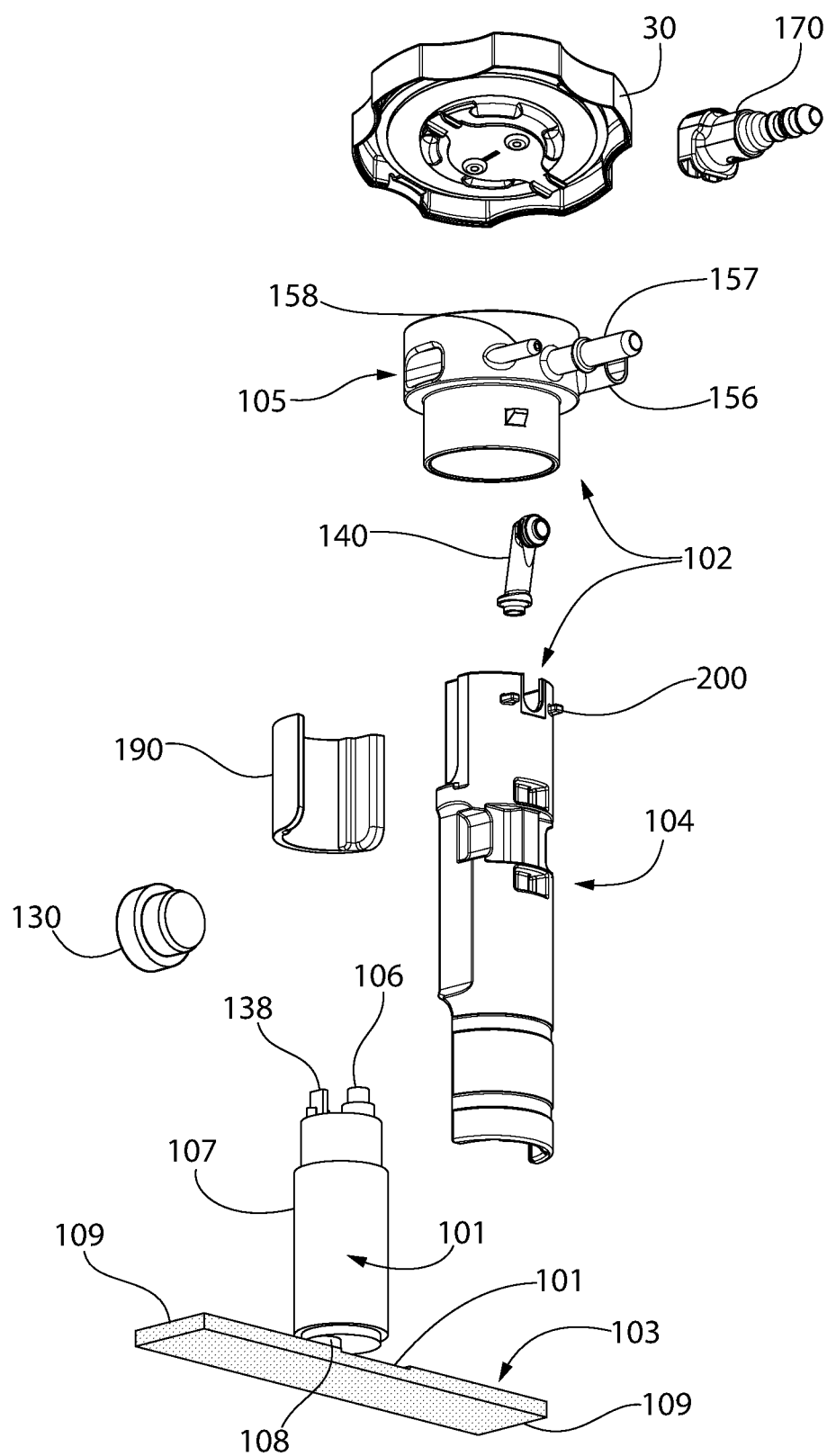
Figure 7:
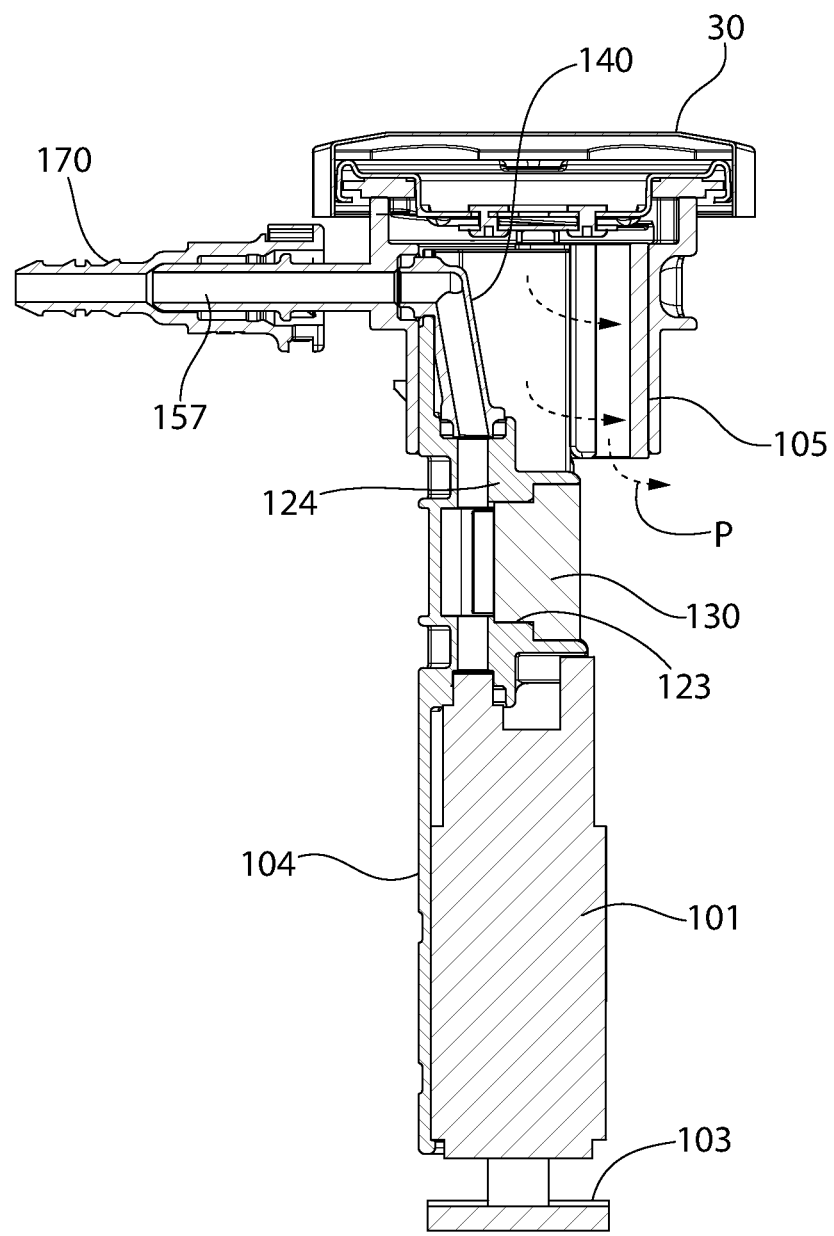
FIG. 7 is a cross-sectional view of the pump assembly.
Figure 8C:
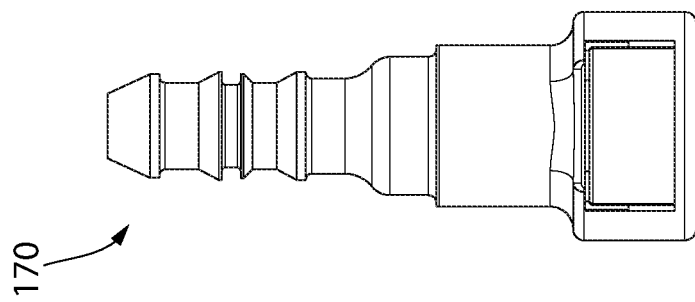
FIG. 8C is a third side view thereof.
Figure 8B:
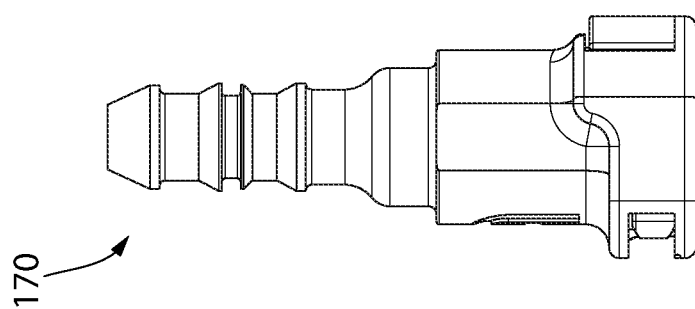
FIG. 8B is a second side view thereof.
Figure 8A:
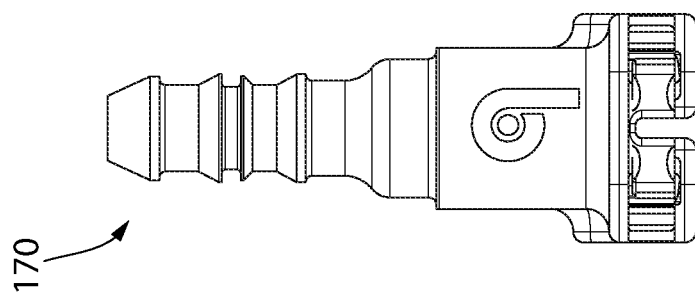
FIG. 8A is a first side view of a tubing coupler of a fuel dispensing nozzle assembly.
Figure 8D:
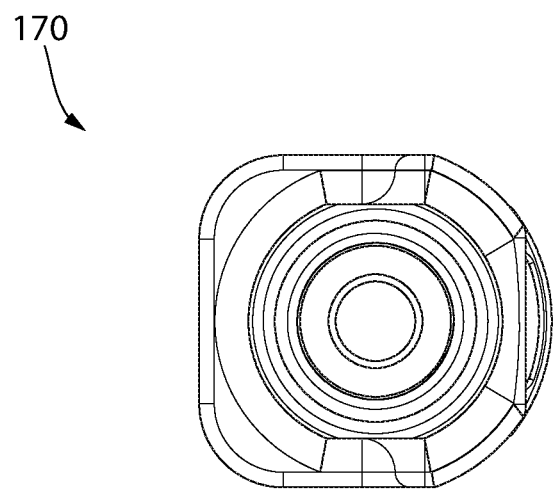
FIG. 8D is a front end view thereof.
Figure 8E:
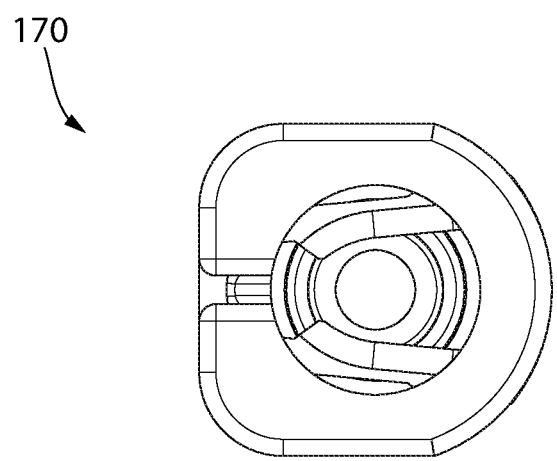
FIG. 8E is rear end view thereof.
Figure 9A:
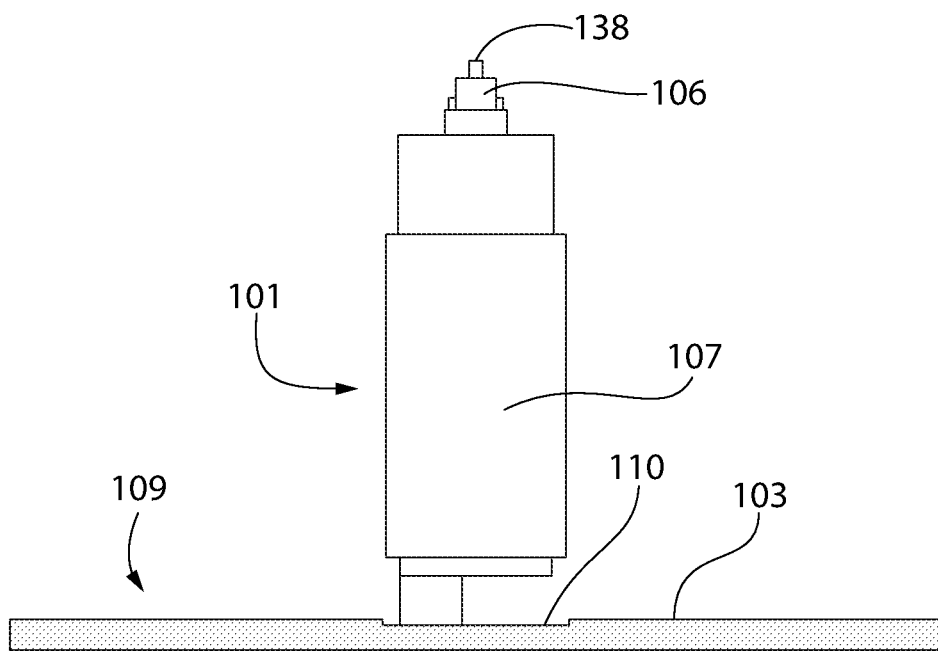
FIG. 9A is a first side view of the fuel pump with attached fuel filter.
Figure 9B:
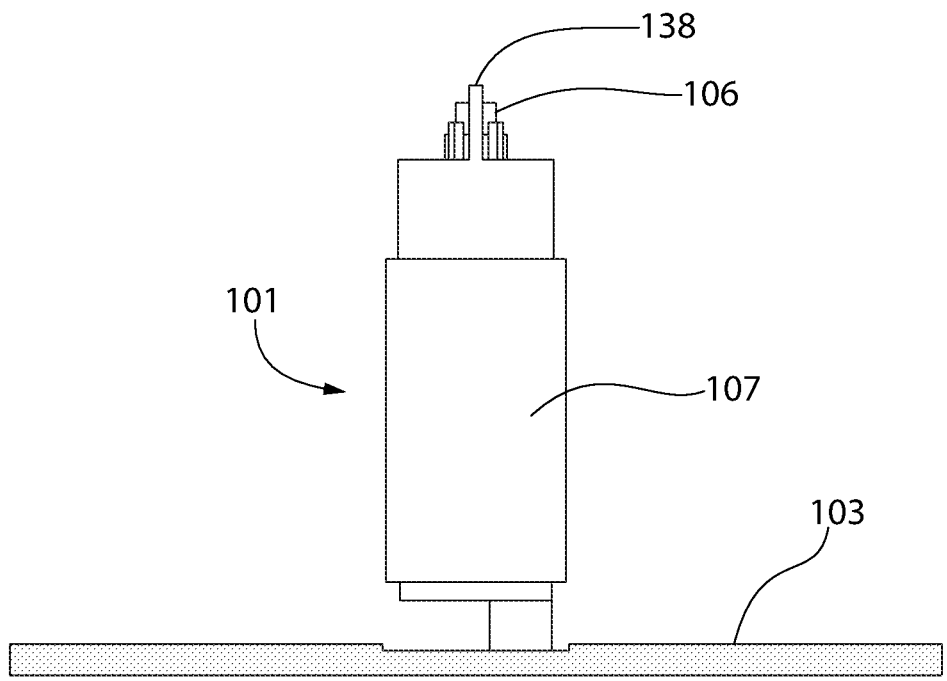
FIG. 9B is a second side view thereof.
Figure 10D:
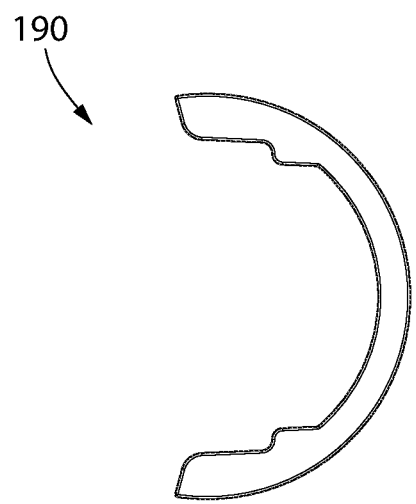
FIG. 10D is a first end view thereof.
Figure 10E:
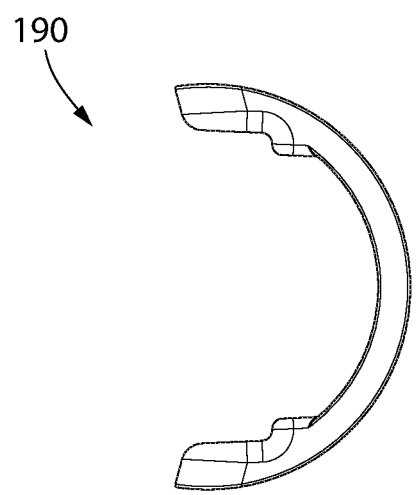
FIG. 10E is a second end view thereof.
Figure 11C:
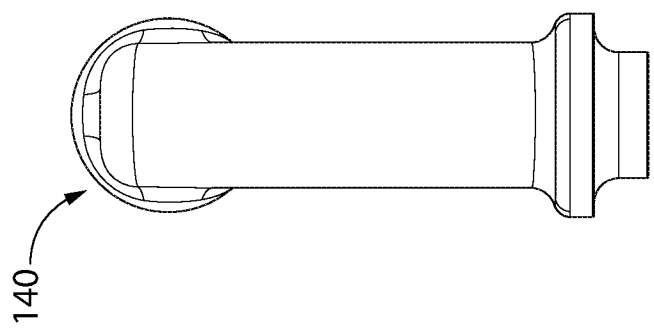
FIG. 11C is a third side view thereof.
Figure 11B:
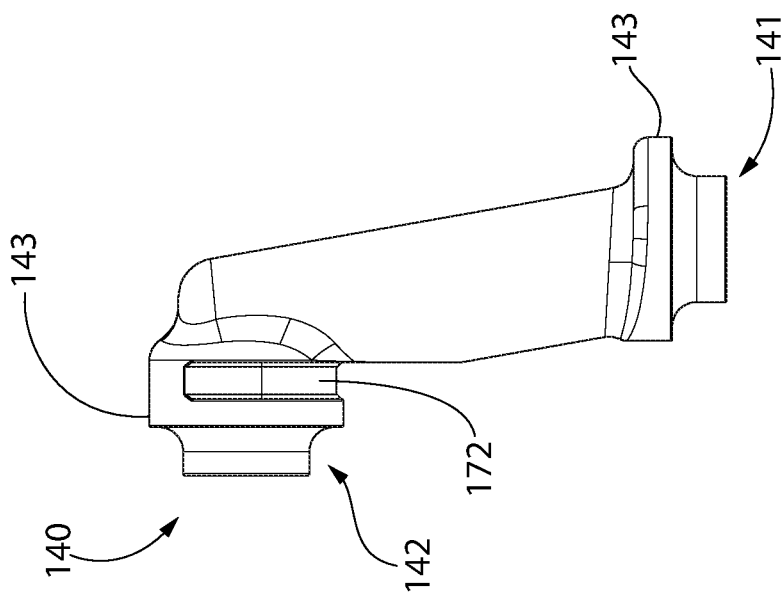
FIG. 11B is a second side view thereof.
Figure 11A:
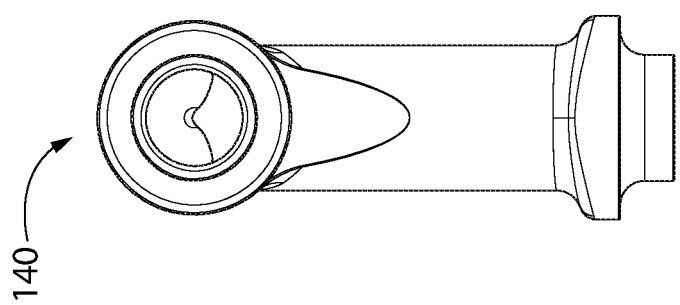
FIG. 11A is a first side view of a flow tube.
Figure 11D:
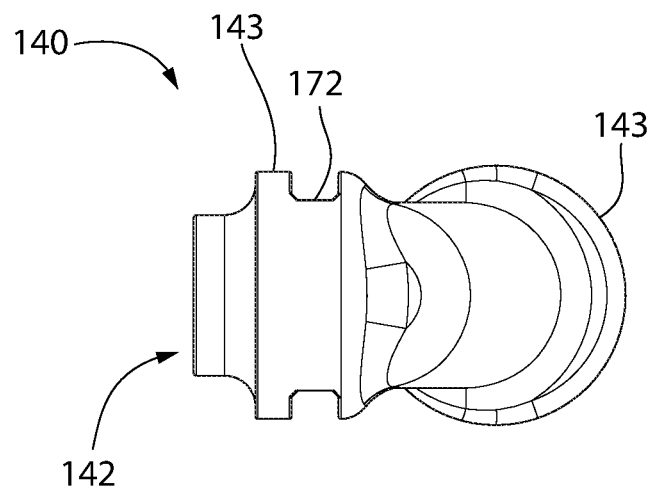
FIG. 11D is a top view thereof.
Figure 11E:
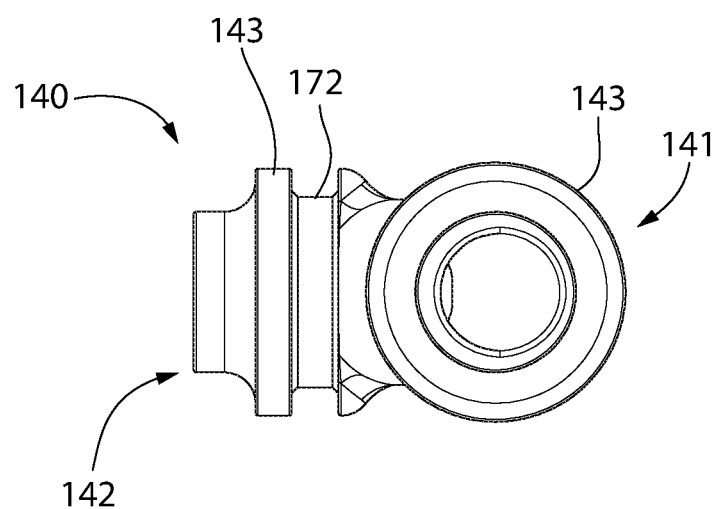
FIG. 11E is a bottom view thereof.
Figure 12A:
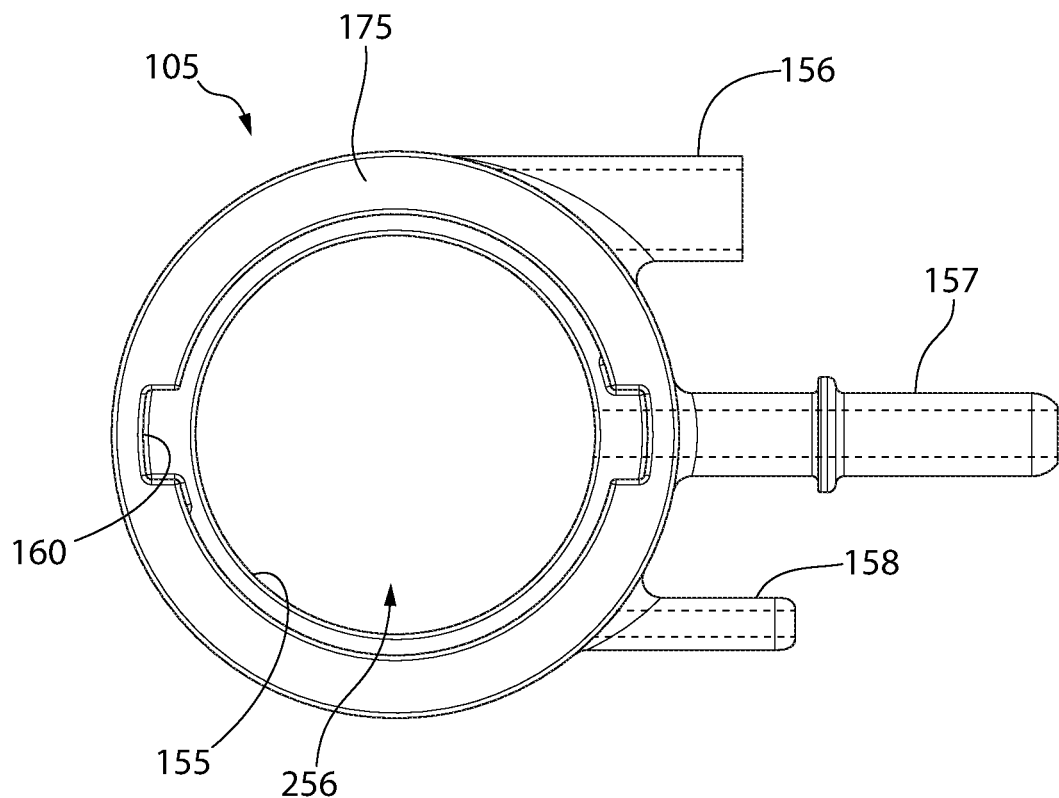
FIG. 12A is a top view of the upper pump housing unit.
Figure 12B:
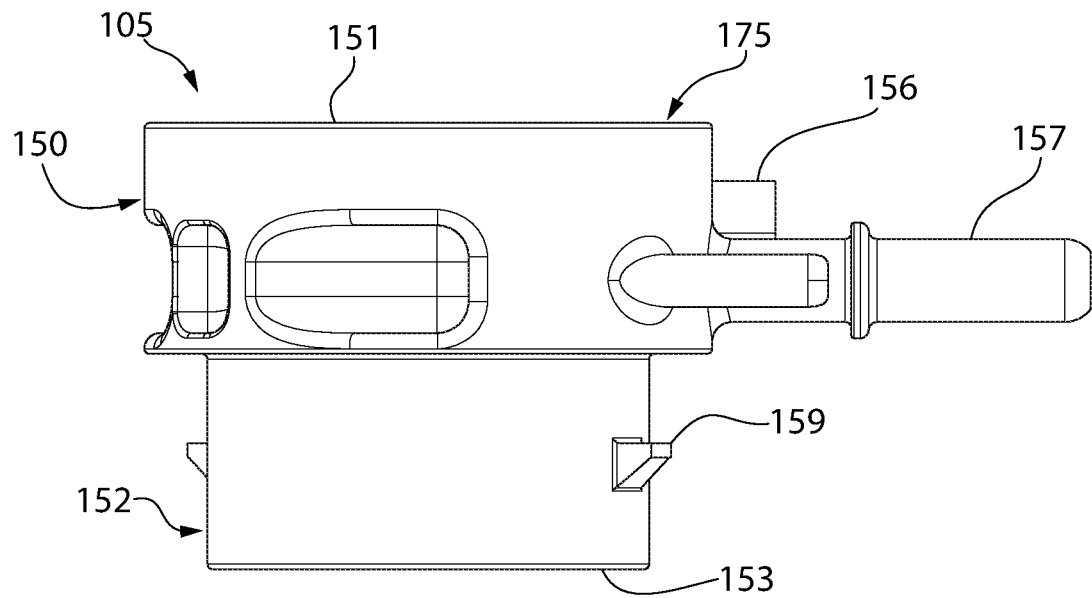
FIG. 12B is a first side view thereof.
Figures 12C, 12D:
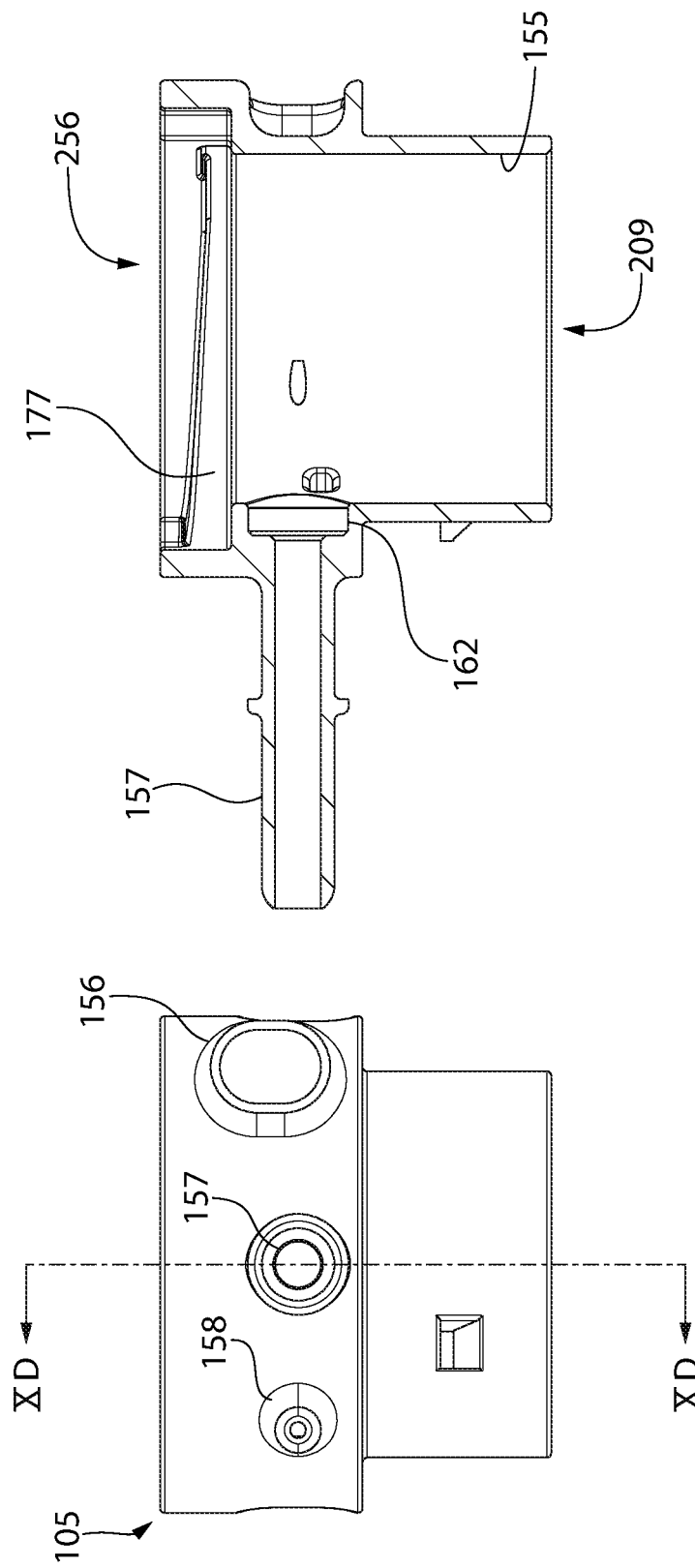
FIG. 12C is a second side view thereof.
FIG. 12D is a transverse cross-sectional view thereof.
Figure 12E:
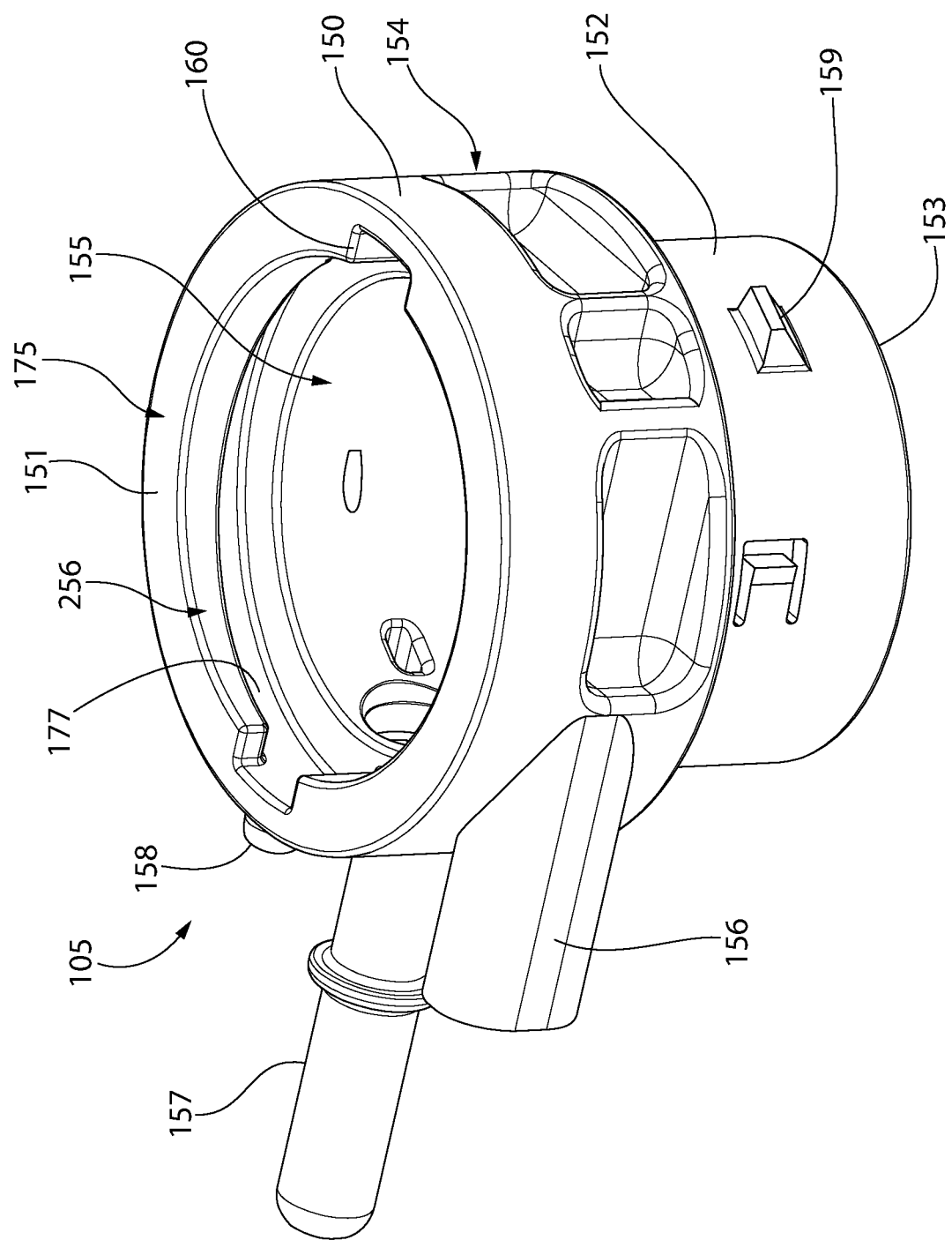
FIG. 12E is a top perspective view thereof.
Figure 12F:
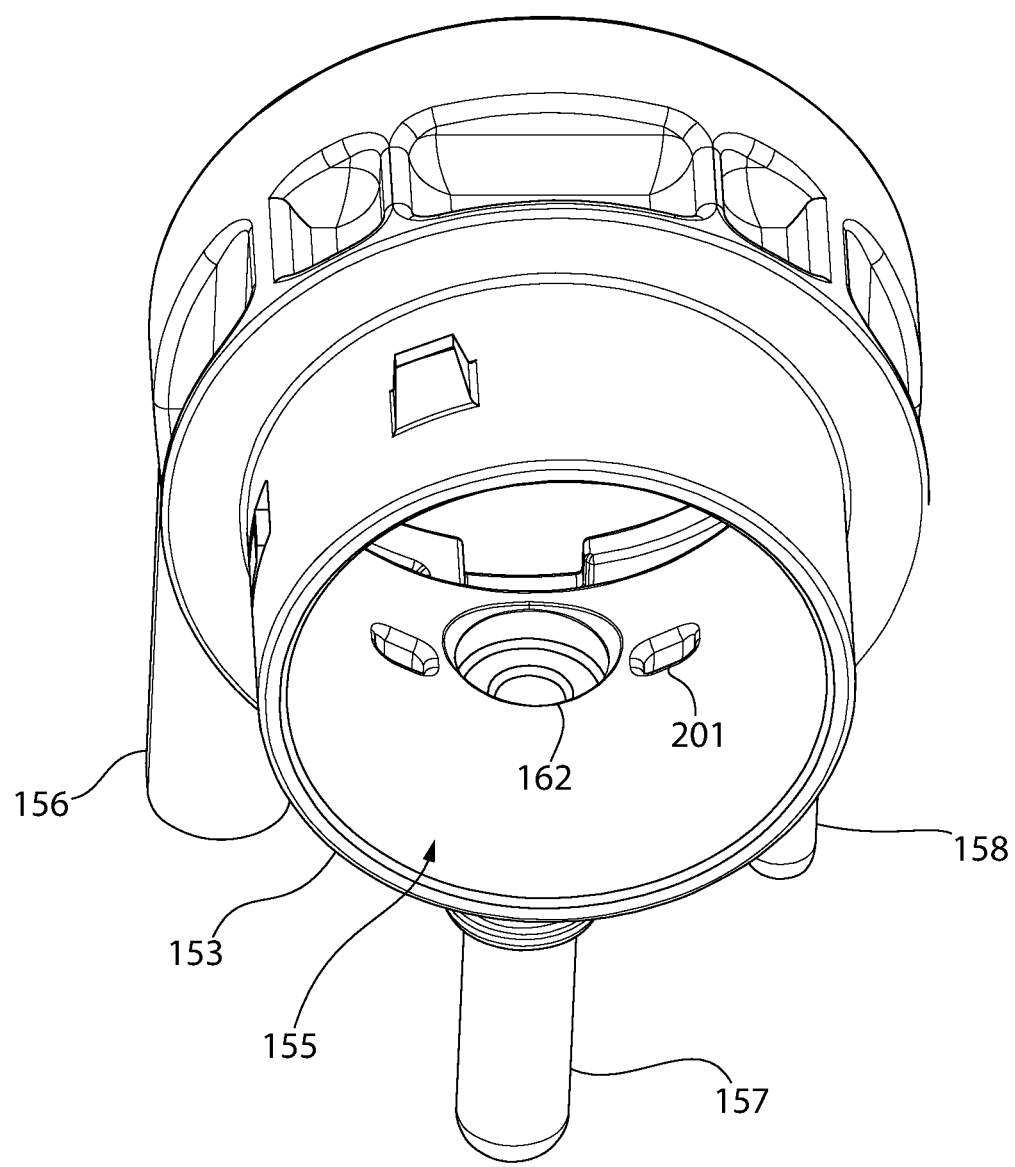
FIG. 12F is a first bottom perspective view thereof.
Figure 12G:
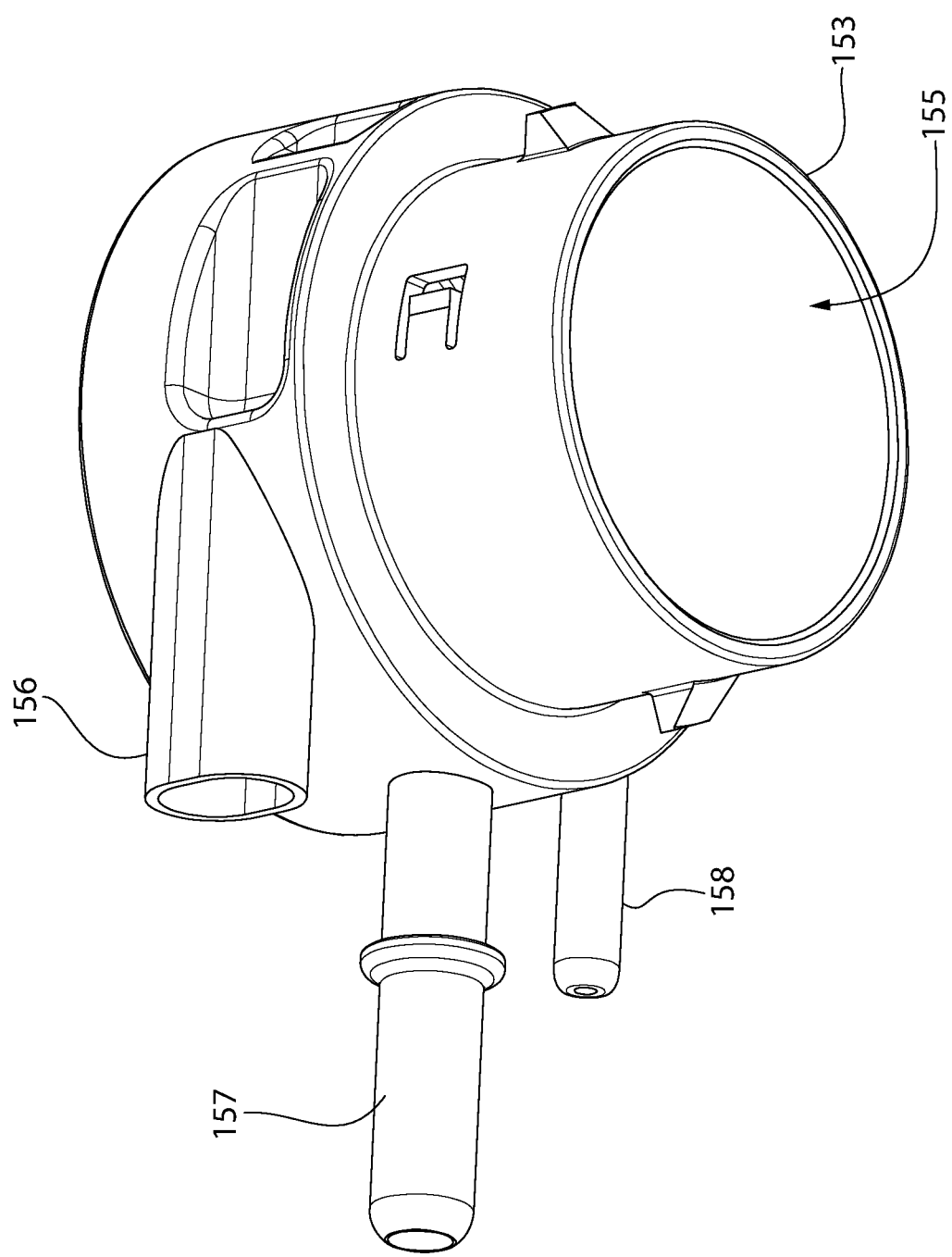
FIG. 12G is a second bottom perspective view thereof.
Figure 13A:
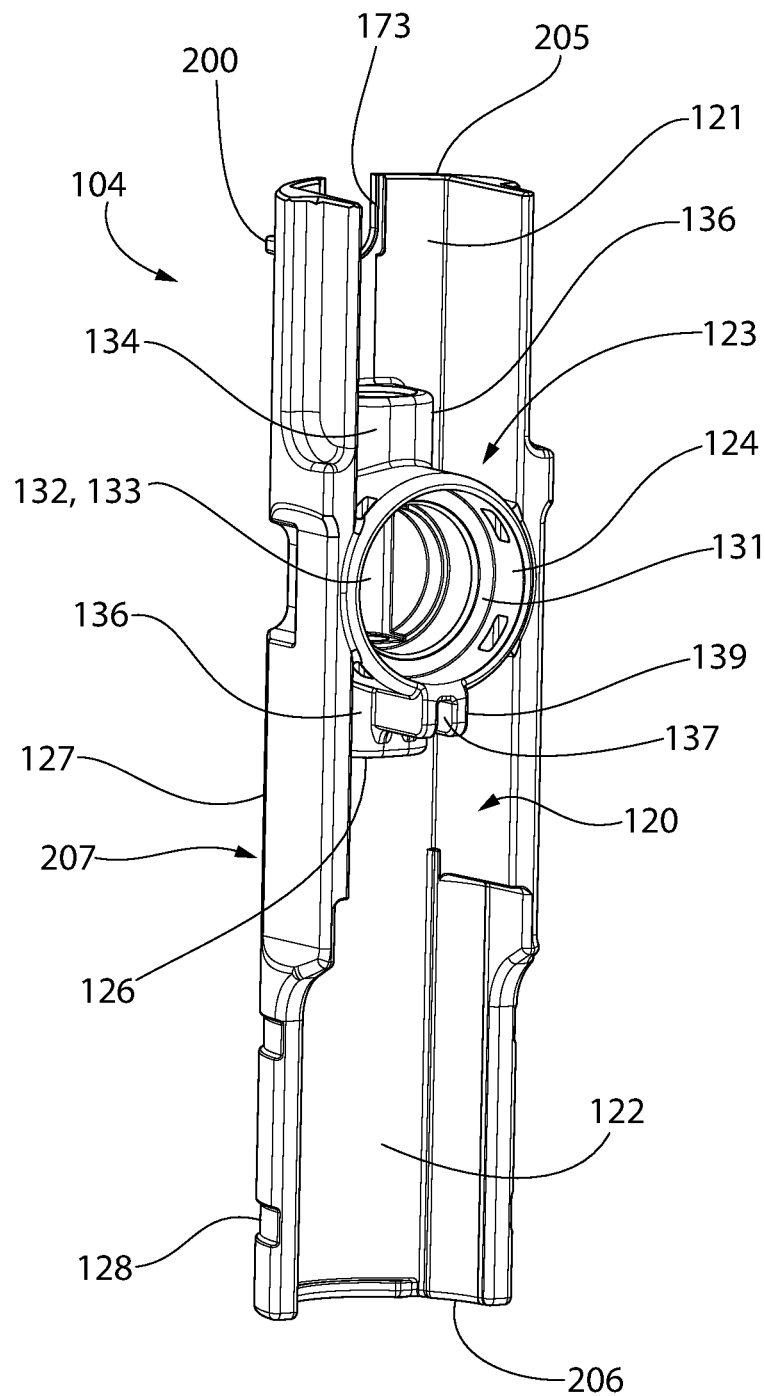
FIG. 13A is a first perspective view of the lower pump housing unit.
Figure 13B:
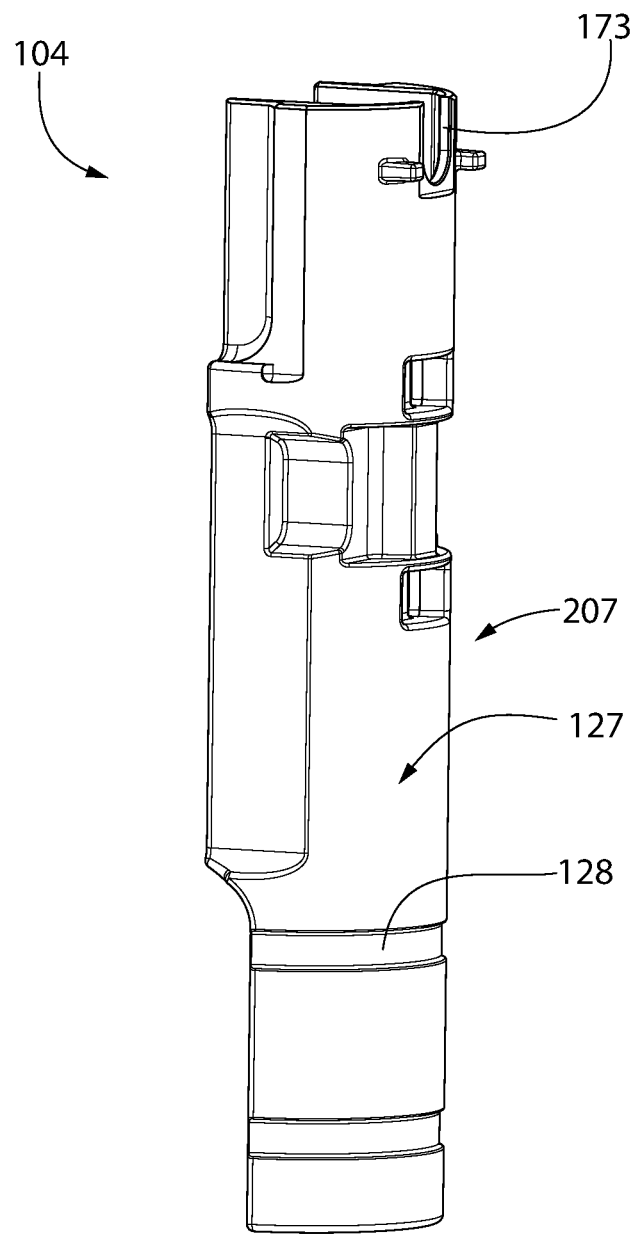
FIG. 13B is a second perspective view thereof.
Figure 13I:
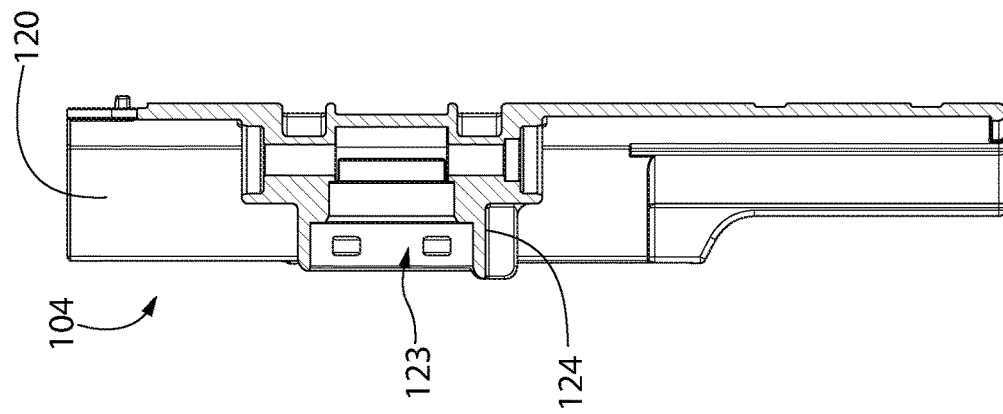
FIG. 13I is a side cross-sectional view thereof.
Figure 13H:
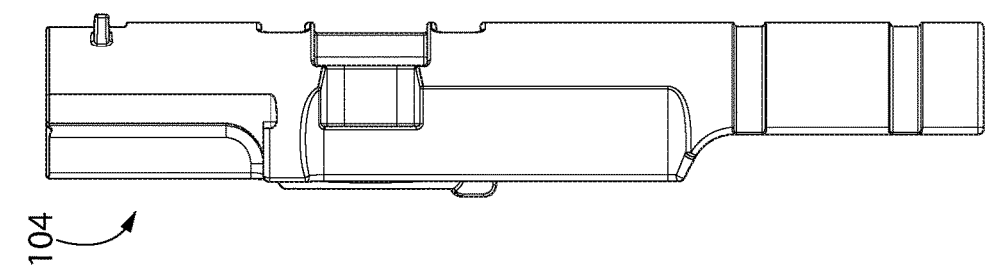
FIG. 13H is a fourth side view thereof.
Figure 13F:
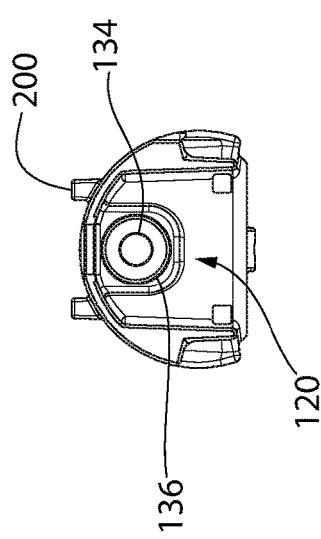
FIG. 13F is a top view thereof.
Figure 13G:
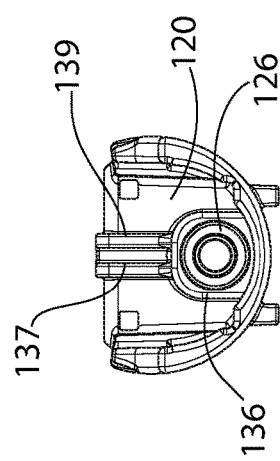
FIG. 13G is a bottom view thereof.

All drawings are schematic and not necessarily to scale. A reference to a figure number herein comprised of a set of multiple figures sharing the same figure number but with different alphabetic suffixes shall be construed as a reference to all those figures in the set unless expressly noted otherwise.

DETAILED DESCRIPTION

The features and benefits of the invention are illustrated and described herein by reference to example ("exemplary") embodiments. This description of example embodiments is intended to be read in connection with the accompanying drawings, which are to be considered part of the entire written description. Accordingly, the disclosure expressly should not be limited to such embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," and "interconnected," refer to a relationship wherein structures are secured or attached to one another either directly or indirectly through intervening structures, as well as both movable or rigid attachments or relationships, unless expressly described otherwise.

The overall purpose of locating a fuel pump for fuel injection engines within the fuel tank is so that it runs cooler. Electric fuel pumps run continuously, and generate heat in the process of providing pressurized fuel. If fuel is heated too much, it can vaporize causing pockets of vaporous (non-liquid) fuel which become difficult to pump out. The internal mechanisms of these pumps cannot accommodate the thin and lighter vapor in the same way as liquid, which is more viscous, and thus pumping of vapor is difficult. Locating the pump within the fuel tank means that it will be bathed in liquid fuel, which will act to cool the outside of the pump housing, and also cool the fuel within the pump.

Another reason to locate a fuel pump within a fuel tank is to put it at a lower altitude or elevation than the fuel surface level. This means that the incoming fuel does not need to be lifted by the pump. Lifting the fuel with suction from a pump causes negative pressure in the draw tube. When fuel is under negative pressure it can vaporize, causing the same non-liquid fuel pockets that can disrupt the pumping action. If the pump is below the fill-level of the fuel, a slight positive pressure is assured at the draw tube, and the risk of vaporization is greatly reduced.

There are many different ways that a fuel pump can be suspended inside of a fuel tank, but it generally needs to be robust enough to support the mass of the pump under vibration and acceleration loads generated by the application (vehicle, tractor, utility machine, or other engine powered device) and generated by the actions of the application (road travel loads, stump grinding loads, ground tamper loads, etc.). Support needs to be sufficient to hold the pump in place without fatigue failure of the mounting structure for the desired life of the engine-powered application or of the pump (if less than the overall useable life). The suspension also needs to be somewhat compliant, so that high acceleration levels are not directly imparted onto the pump, as high acceleration levels that are sustained for long periods of time can damage the internal mechanisms of the pump.

FIGS. 1-9 depict one implementation of an in-tank fuel pump assembly and fuel supply system according to the present disclosure. The system may generally comprise fuel tank 20 and fuel pump assembly 100 disposed at least partially therein. Fuel tank 20 may include a substantially hollow body defining a top wall 21, opposing bottom wall, a plurality of peripheral sidewalls 23 extending around the body between the top and bottom walls, and an internal cavity or reservoir 26 for storing a reserve of fuel used to power a fuel-injected engine of an engine-operated device. The fuel may be gasoline in one example; however, other types of liquid fuels may be stored and pumped. A closeable fuel fill opening 28 may be formed in top wall 21 of the tank 20 for adding fuel to the reservoir 26. Fuel fill opening defines a vertical mounting axis VA for reference. Accordingly, in one implementation, the fuel fill opening 28 may also serve for mounting the fuel pump assembly 100 according to the present disclosure.

In the non-limiting configuration shown, the tank 20 may be of a two-piece construction including an upper half-section 24 and a lower half-section 25 joined at an intermediary seam 27 therebetween. Seam 27 may extend perimetrically and continuously around the sidewalls 23. The seam may be a crimped, soldered, brazed, welded, adhesively bonded, mechanically fastened (e.g. fasteners, clamps, etc.), or otherwise to close the seam, which is at least leak resistant to prevent seepage of fuel therethrough. Fuel tank 20 may be formed of a suitable metallic or non-metallic material. In other possible constructions, the fuel tank body may be formed as a seamless monolithic unitary structure which may be formed of molded plastic. The example fuel tank is expressly not limited to either a seamless or seamed tank construction.

Fuel pump assembly 100 generally includes a fuel pump 101, pump housing 102 supporting the pump, and a fuel filter 103 fluidly coupled to the pump. Pump 101 may be any suitable type of submersible electric in-tank fuel pump suitable for pumping to supply pressures desired for fuel injection type ignition systems. The supply pressure will typically be greater than the pressure at which fuel is added to the fuel tank reservoir from either a fuel can or fueling nozzle at a service station. Pump 101 includes electrical connectors (not shown) for coupling to power wires routed through pump housing 102 and/or fuel tank 20 from an external power source associated with the engine assembly. Pump 101 may have a generally vertically elongated and cylindrical casing 101, a discharge nozzle 106 at a top end of the casing, and a suction nozzle 108 at a bottom end. Suction nozzle 108 is fluidly coupled to fuel filter 103. The nozzles 106, 108 may have a cylindrical shape. Other arrangements and locations of the nozzles may be used. Pump 101 draws and discharges fuel from the fuel tank 20 vertically and parallel to vertical centerline VA of the tank. The pump casing may be made of plastic in one example; however, other materials may be used. Pump 101 is configured and operable to dispense a flow of pressurized fuel which is delivered to the fuel injection system of the engine.

Fuel filter 103 may be directly coupled to suction nozzle 108 which lends to a compact and efficient design. In one configuration, fuel filter 103 may have a polygonal configuration such as without limitation an elongated rectangular shape with a thickness. Filter 103 includes opposing end portions 109 and an intermediate portion 110 therebetween. Filter 103 has a length greater than the diameter of the fuel pump 101 and may be symmetrically positioned on the pump suction nozzle 108 such that the end portions 109 extend perpendicularly to the pump and pump housing 102. In one embodiment, filter 103 may be resiliently deformable and constructed of a material having an elastic memory. This allows the opposing end portions 109 to be collapsed and folded upwards into a folded state or condition for insertion into the fuel tank 20 through fuel fill opening 28 via engagement with the tank at opening. The filter will spring back and spread to its original unfolded flattened state or condition once the filter fully enters the tank reservoir 26 and disengages the fuel tank at the fuel fill opening, as further described herein. Filter 103 may therefore be movable and deformable between a folded condition and a flattened condition. In one construction, intermediate portion 110 may have a thickness less than end portions 109 to provide additional flexibility for folding the filter. The filter 103 allows fuel to be drawn from the fuel tank reservoir 26 via suction produced by pump 101 and capillary action. The fuel passes from the filter 103 through the suction nozzle 108 of the pump 101. Any suitable type of absorbent and porous filter media or material having resiliently deformable characteristics may be used for filter 103. Examples include porous polymeric foams or other materials. The filter may be fabricated from a thin cast polymeric material in one construction, with pores formed in the casting process.

Pump housing 102 may be a two-piece construction in some implementations including an upper housing unit 105 and a lower housing unit 104. Upper and lower housing units 105, 104 are configured for coupling together, as further described herein. Pump housing 102 may have a generally tubular configuration with various openings formed therein for different appurtenances and purposes to be described. When mounted in the fuel tank 20, the top portion of the pump housing 102 remains exposed and the housing is coaxially aligned with vertical mounting axis VA.

Lower housing unit 104 may be configured for mounting and securing the fuel pump 101 thereto. Accordingly, lower housing unit 104 may include a portion which has a complementary configuration to the casing 107 of the pump 101. The upper housing unit 105 may be configured for coupling directly to the fuel tank 20 at the fuel fill opening 28. In other implementations, the upper housing unit 105 may be indirectly coupled to the fuel fill opening through an intermediate mounting sleeve or other element. When assembled, the pump housing 102 extends for a majority of the height, and in some implementations substantially the entire height of the fuel tank 20 and reservoir 26 from the top wall 21 to a point substantially proximate the bottom wall 22 (allowing for clearance to couple the fuel filter 103 to the bottom of the pump).

FIGS. 13A-I depict various views of the lower housing unit 104 of the pump housing 102. Lower housing unit 104 includes a top end 205, bottom end 206, and an arcuately curved sidewall 207 extending between the ends. In one implementation, lower housing unit 104 may have a generally tubular or cylindrically shaped body having a laterally open side that may extend for the entire length of the unit in some configurations. This can be considered to essentially split the lower housing unit approximately in half lengthwise, thereby defining a semi-circular and generally C-shaped body structure with half-tubular or half-cylindrical cross sectional shape as shown. The arcuate sidewall 207 of lower housing unit 104 defines a vertical longitudinal concavity 120 on one side and a convex surface 127 on the opposing side of the body. The concavity 120 includes a lower pump receptacle 122 and an upper fuel fill cavity 121. Upper cavity 121 receives fuel dispensed from a fueling nozzle (e.g. gas can or service station pump) inserted through the tank fill opening 28 and directs the fuel flow substantially downwardly into the fuel tank reservoir 26 (see, e.g. FIG. 7 directional fuel flow arrows). In some implementations, the upper cavity 121 may be dimensioned so that the end portion of the fueling nozzle may at least partially enter the upper cavity. The upper cavity 121 thus is laterally open and communicates with the volume of the reservoir 26 when filling the fuel tank. Upper cavity 121 may also be upwardly open and communicates with the upper housing unit 105 (e.g. internal cavity 155) to define part of the fuel fill fluid pathway P therein and through the pump housing 102 into the fuel tank 20. In one example, without limitation, lower housing unit 104 may be approximately 6 inches long and 2 inches in diameter. Other dimensions may of course be used.

The lower receptacle 122 may be complementary configured to the cylindrical shape of the pump casing 107 so that the pump partially nests within the receptacle when mounted thereto. In one implementation, the fuel pump 101 may be readily secured to the lower housing unit 104 simply with a pair of plastic electrical cable zip ties 129 (see, e.g. FIG. 14B). The convex surface 127 may include arcuately shaped channels 128 for securing the zip ties in vertical position on the lower housing unit to prevent slippage (see, e.g. FIG. 13B). The ties can be readily cut if the pump should require removal from the housing and replacement. Other methods of mounting the pump to the lower receptacle 122 of lower housing unit 104 may of course be used.

A circular socket 123 is disposed between the lower pump receptacle 122 and upper fuel fill cavity 121 for mounting a pressure relief valve 130 therein. Valve 130 operates to maintain the pressure of the pump discharge fuel flow at a desired preset fuel supply pressure limit, and relieves any excess pressure by discharging a portion of the fuel from the valve back into the fuel tank 20 to prevent over-pressurization of the fuel delivery line. Socket 123 is defined by a circumferentially-extending circular wall 124, which may be mutually configured with the relief valve 130 to secure the valve in place in the socket. Socket 123 includes an outer section 131 which receives the relief valve body and an inner section 132. Inner section 132 remains open beneath the relief valve 130 when the valve is installed and defines a flow channel through the socket between the lower and upper housing units 104, 105. The outer section 131 is occupied by the relief valve 130 when inserted therein and seated. This also closes the inner section inner section 132 which is in fluid communication with the relief valve 130 for returning a portion of the fuel flow back to the tank reservoir 26. In one configuration, relief valve 130 may be generally cylindrical and have a step-shaped structure as shown. Outer section 131 of socket 123 may have a complementary configured step-shaped structure. Relief valve 130 may be mounted inside the socket 123 in any suitable way, for example without limitation interlocked tabs and slots/grooves, threading, or other mechanical coupling means. The mode of attachment is not limiting of the present disclosure.

Socket 123 further includes an inlet port 126 at the bottom of the socket and an outlet port 134 at top. Inlet port 126 may be circular and configured to fluidly and mechanically couple the discharge nozzle 106 of the pump thereto. Nozzle 106 may be inserted into the port 126 via appropriately sized diameters of the nozzle and port. Similarly, outlet port 134 may be circular and configured to fluidly and mechanically couple to a fuel transfer flow tube 140 which dispenses the pressurized fuel from the fuel pump assembly 100 through the fuel fill fluid pathway P. The flow of pressurized fuel in the fuel fill fluid pathway is generally upwards while the fuel filling the reservoir of the fuel tank is generally downwards in the fuel fill fluid pathway. Flow tube 140 may be inserted into the port 134 via appropriately sized diameters of the tube and port. An O-ring seal 135 may be provided to seal the connection between the flow tube 140 and port 134. Ports 126 and 134 may be defined by protrusions 136 extending vertically downwards and upwards respectively from the circular socket walls 124. Ports 126 and 134 are in fluid communication with the flow channel 133 extending through the socket 123, thereby forming a continuously open flow path in the pump housing 102 from the pump discharge to the discharge flow tube 140.

FIGS. 11A-E depict various views of the fuel discharge flow tube 140. Tube 140 may have a bottom inlet end 141 fluidly coupled to outlet port 134 and a top outlet end 142. Outlet end 142 may be angled relative to the inlet end 141 and forms a flow elbow which dispenses fuel at a different angle than received at the inlet end. This allows fuel to be discharged at a perpendicular or oblique angle to vertical mounting axis VA. The flow tube 140 occupies a portion of the upper fuel fill cavity 121, but is fluidly isolated from the cavity. The ends 141, 142 may include diametrically enlarged flanges 143 configured to help retain O-rings mounted thereto for fluidly sealing the tube ends to their respective fluid connections in the pump housing. To properly align the inlet end 141 of flow tube 140 with outlet port 134 of the socket 123, the upper end of the lower housing unit 104 may include an upwardly open mounting slot 173. Slot 173 slideably receives a mating downwardly open slot 172 formed proximate to the outlet end 142 of the flow tube 140.

To properly locate the pump 101 in the lower housing unit 104, a laterally and downwardly open slot 137 provided in the housing unit receives a guide tab 138 formed on the pump casing 107 (see, e.g. FIGS. 14A-G). Slot 137 is formed in pump receptacle 122 of the longitudinal concavity 120. Tab 138 may be formed on the top of the pump casing and projects vertically upwards therefrom proximate to the pump discharge nozzle 106. In one embodiment, the slot 137 may be defined by a clevis-shaped projection 139 extending downwards from the socket walls 124. The slot and tab arrangement helps to axially align the discharge nozzle 106 for insertion into the inlet port 126 of the socket 123 when the pump is mounted in the lower housing unit 104.

The upper housing unit 105 of pump housing 102 will now be described with additional reference to FIGS. 12A-G. Upper housing unit 105 has a cylindrical or tubular body with an annular shape. Upper housing unit 105 includes an upper fuel cap mounting section 150 defining a top 151, a lower tank mounting section 152 defining a bottom 153, and cylindrical sidewalls 154 extending between the top and bottom. An internal cavity 155 is defined between and penetrates the top and bottom 151, 153 defining a top opening 256 and a bottom opening 209 of the housing body. Cavity 155 extends longitudinally along vertical mounting axis VA. Upper section 150 may be diametrically enlarged relative to the lower section 152. Lower section 152 is configured for insertion into and mounting to the fuel fill opening 28 of the fuel tank 20. The upper section 150 remains outside the top of the fuel tank and exposed when the upper housing unit 105 is fully seated in the fuel fill opening. The upper section 150 thus doubles as a fuel fill tube for the fuel tank 20. Both the lower section 152 of upper housing unit 105 and the lower housing unit 104 have diameters which are smaller than the diameter of fuel fill opening of fuel tank 20. This allows these portions of the pump housing to be inserted into the fuel tank reservoir 26 when mounting the pump assembly to the fuel tank 20.

Lower section 150 of the upper housing unit 105 includes mounting features configured to interact and cooperate with corresponding mounting features formed in the fuel tank 20 within the fuel fill opening 28 for securing the upper housing unit 105 therein. In one implementation, lower section 150 includes a plurality of radially protruding lugs 159 which are configured to engage an annular lip 161 arranged inside the fuel fill opening 28 (see, e.g. FIG. 21E). Annular lip 161 may be discontinuous to allow inserted of the lugs 159 beneath the lip. The upper housing unit 105 can then be rotated to lock the lugs 159 beneath the lip 161 which prevent axial removal of the housing unit 105 from the fuel fill opening 28. In other implementations, the lower section 150 may threadably engage the fuel tank at the fuel fill opening 28. Other types of mechanical coupling mechanisms may be used in other constructions.

Upper section 150 includes a fuel dispensing nozzle 157, vent nozzle 158, and electrical wiring conduit tube 156 for insertion of electrical power wires through the pump housing and/or fuel tank to the pump. Nozzle 157 is fluidly coupled to cavity 155 of the upper section via flow hole 162. Hole 162 is configured for fluid coupling to top outlet end 142 of the flow tube 140. This connection may be sealed via an O-ring. Fuel discharged by the pump 101 flows through flow tube 140 into the fuel dispensing nozzle 157. A tubing coupler 170 may be coupled to nozzle 157. Coupler 170 is configured for securement of a fuel supply tube thereto via suitable connector, such as without limitation clamps or other means for forming a leak tight fluid coupling. In one configuration, nozzle 157 is insertable into coupler 170 and may be fluidly sealed thereto via an O-ring.

Figure 20:
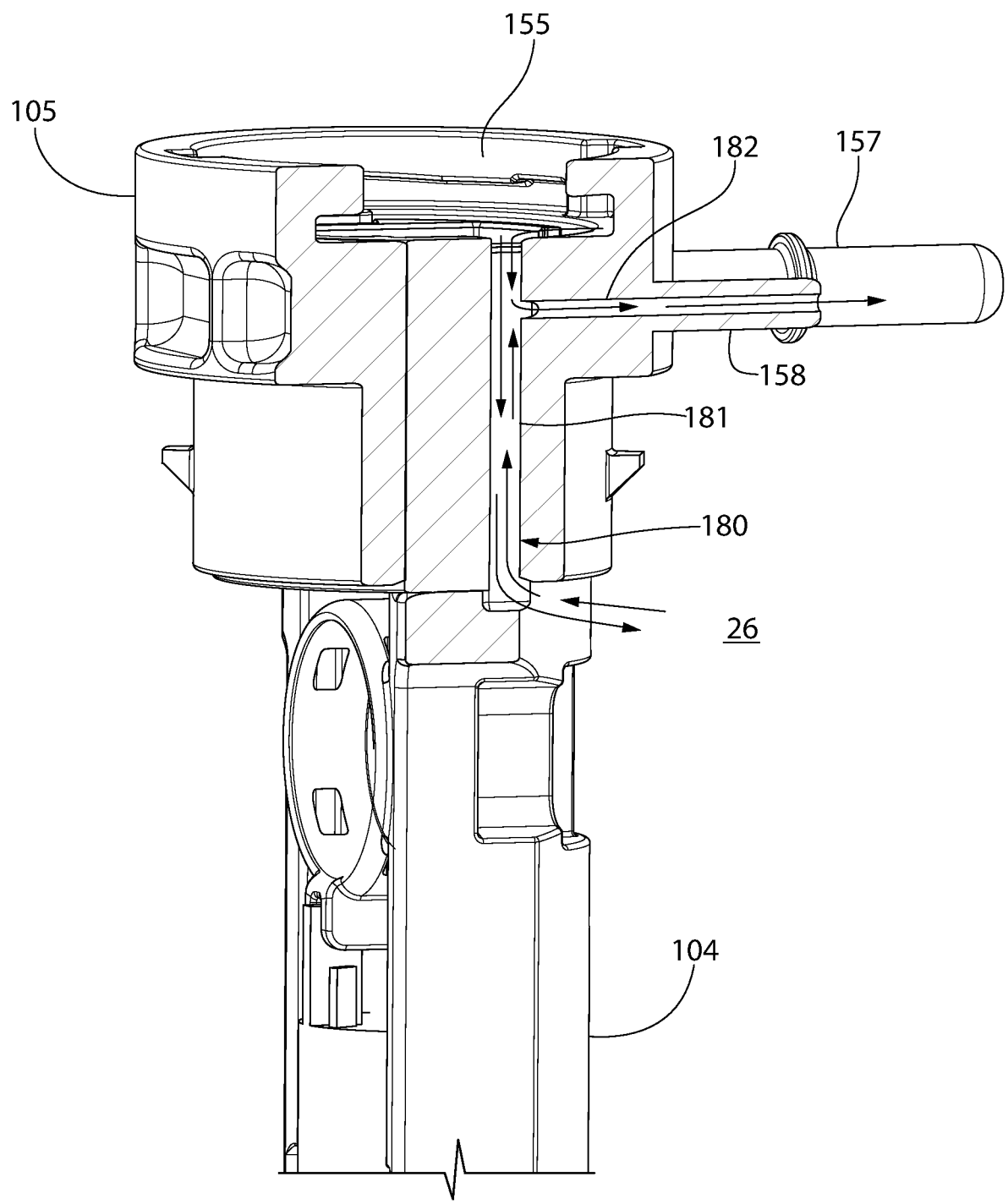
FIG. 20 is a cross-sectional view of the pump housing showing an integral fuel vapor trap system and flow path.

With additional reference to FIG. 20, vapor vent nozzle 158 forms part of a fuel vapor removal trap system incorporated into the upper housing unit 105 of pump housing 102. Through natural evaporative properties of fuels, fuel vapor will accumulate in the fuel tank 20. Vapor vent nozzle 158 allows vapor to pass to the engine, but the trap, formed in part by passage way 180, separates out any portions of liquid fuel. Nozzle 158 is fluidly coupled to both internal cavity 155 of the upper housing unit 105 via a top opening and fuel tank reservoir 26 via a bottom opening by a branched internal vent passageway 180 formed through the body of upper housing unit 105. Passageway 180 includes a vertical section 181 and horizontal section 182 fluidly communicating directly with the nozzle 158. A lower leg of the vertical section 181 of passageway 180 draws fuel vapor accumulating the top of the fuel tank 20 above the fuel surface level. An upper leg of the vertical passageway 181 draws vapor that may accumulate within the internal cavity 155 of the upper housing unit 105. Vertical section 181 may be larger in diameter than horizontal section 182. This ensures that only vapor is drawn out through the vapor trap, and liquid falls out back into the fuel tank 20. FIG. 20 includes direction flow arrows showing the flow paths of the vapor moving through the trap and drawn out of the vapor nozzle 158 and the liquid fuel flowing downward in the vertical section 181 and returning to the fuel tank. The design also provides that the vertical section of the trap is sufficiently large, to allow liquid and vapor fuel to occupy the same space, yet not to be forced together. Gravity will act to pull the liquid fuel down the vertical section 181, and an opening at the bottom of passageway 180 allows the liquid fuel to fall back into the fuel tank. Vapor is drawn from an upper-region of the vertical trap, and is shaped with a relatively long horizontal section 182 in communication with the vertical section 181. Openings on both the top and the bottom of the trap will give priority to the low resistance vapor, and liquid will fall away. The horizontal section in communication with the vertical section of the trap is sufficiently long to not completely fill with liquid, thereby giving time for liquid to fall back into the tank and giving priority to the low resistance vapor which is drawn out of the upper housing unit trap system.

As shown by the directional flow arrows, vaporous fuel is evacuated from reservoir 26 in a first vapor path through the passageway 180 and vapor nozzle 158. Nozzle 158 is fluidly connected to a fuel vapor recovery canister or device, such as a carbon filter operable to handle and treat fuel vapors in the usual manner. A second vapor path is formed from the internal cavity 155 through passageway 180 and nozzle 158. Vapors flowing from both directions in the vertical section 181 are combined in the horizontal section 182 by the bifurcated vapor passageway 180.

Figure 24:
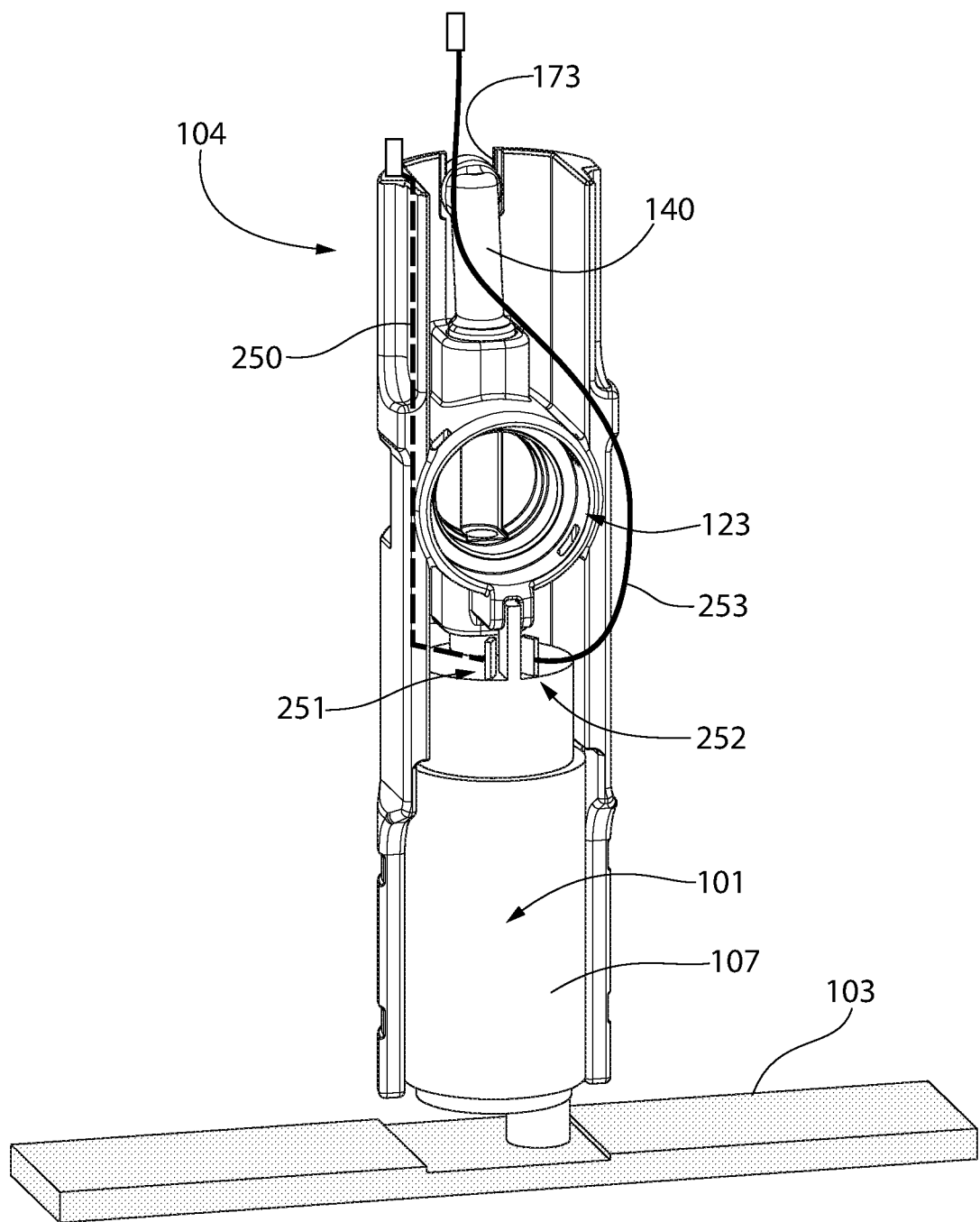
FIG. 24 is a perspective view of the pump housing showing options for providing electrical power to the pump.

Wiring conduit tube 156 provides a pathway for routing a power supply wire (not shown) from an external power supply (e.g. engine-driven device/vehicle electrical system) through the upper and lower housing units 105, 104 of pump housing 102 into the fuel tank 20. This allows connection of the power supply wire to the fuel pump 101. Any suitable means may be used to connect the pump 101 to the power supply. Non-limiting examples are shown in FIG. 24. One approach is to use conductive pathways 250 integrated into the pump housing 102 to connect the external source of power to the positive and negative electrical terminals 251, 252 on the pump 101. Alternatively, the power supply may be wired to the electrical terminals on the pump via conventional wire leads 253. In either case, the external power supply may be introduced into the housing and fuel tank through the wiring conduit tube 156 of the upper housing unit 105. Other types of electrical connections may be used.

The pump 101, filter 103, upper housing unit 105, and lower housing unit 104 advantageously may be fully pre-assembled before insertion into the fuel tank 20. Pump 101 may be mounted to the lower housing unit 104 in the manner previously described. Filter 103 may be pre-installed on the pump suction nozzle 108.

Figure 14A:
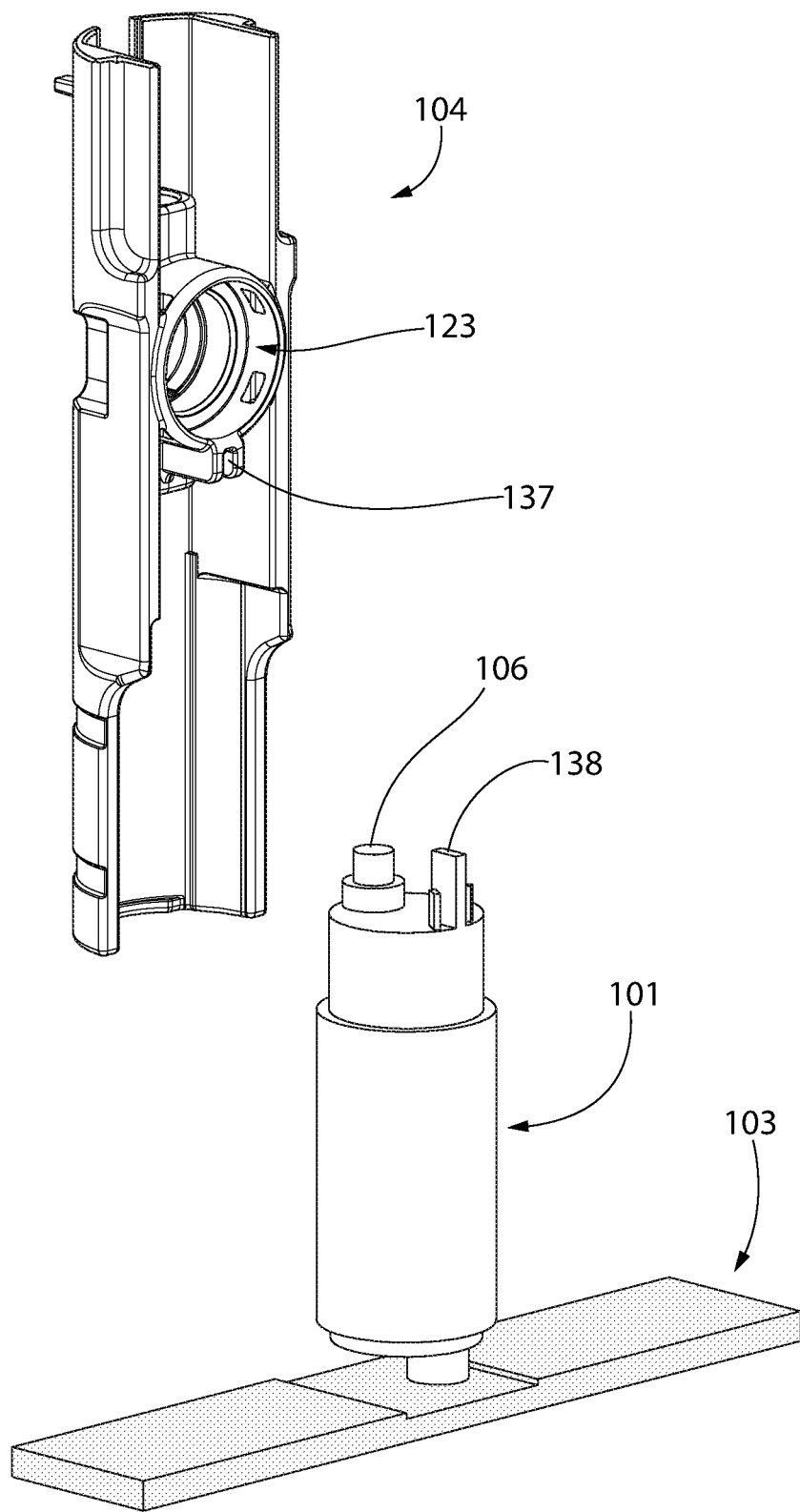
FIG. 14A is a first sequential view for a process or method of assembling the pump assembly.
Figure 14B:
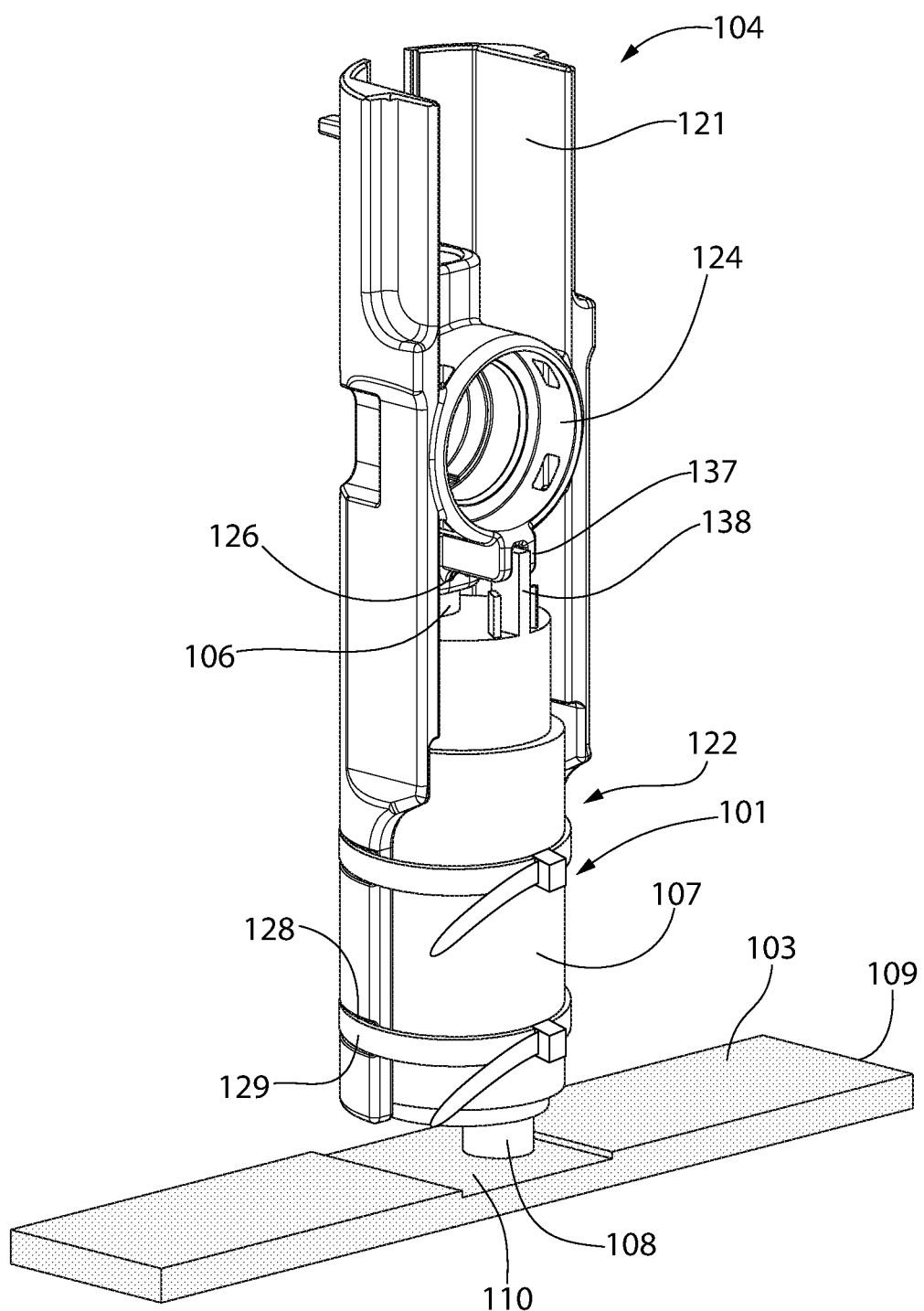
FIG. 14B is a second sequential view thereof.
Figure 14C:
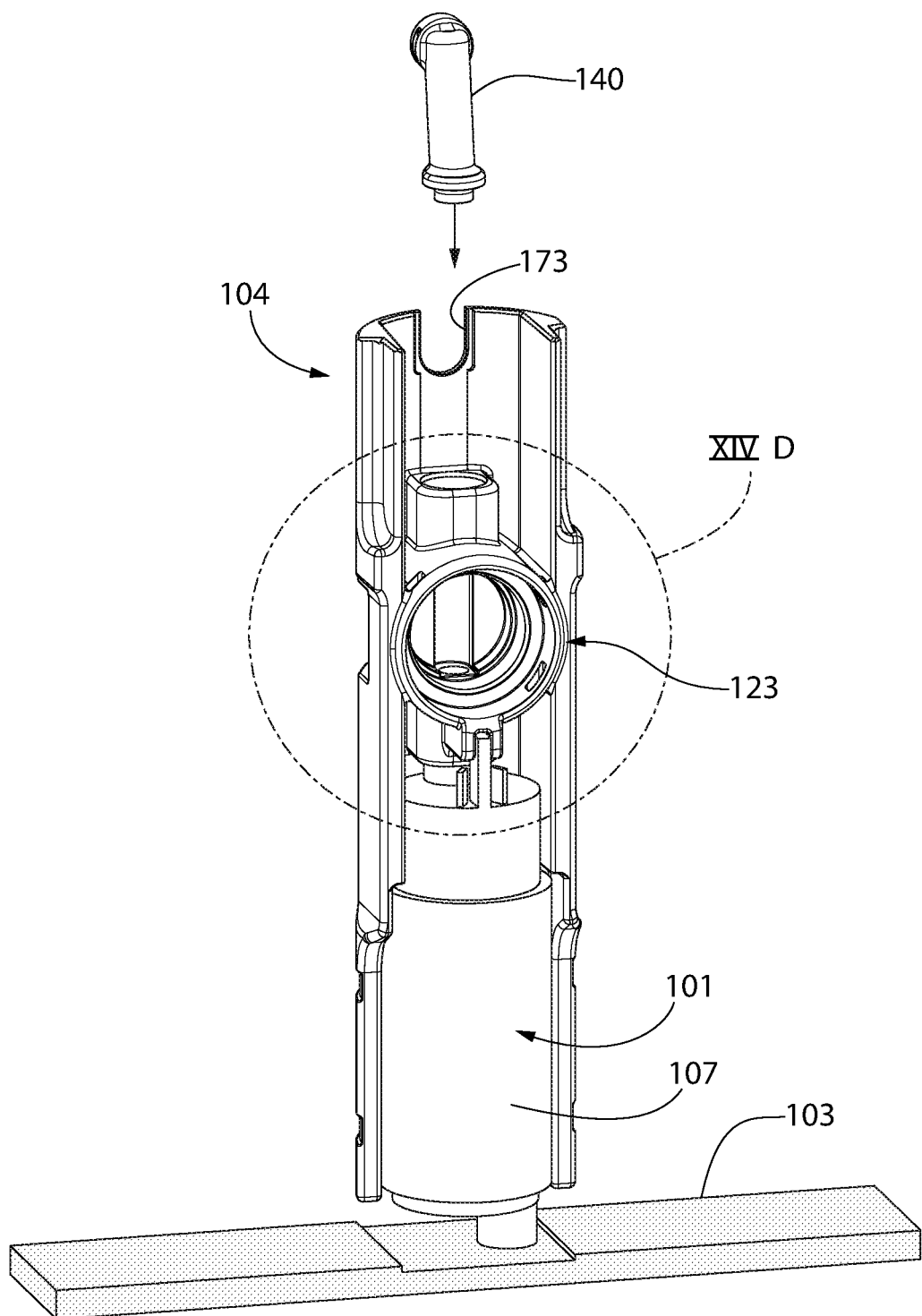
FIG. 14C is a third sequential view thereof.
Figure 14D:
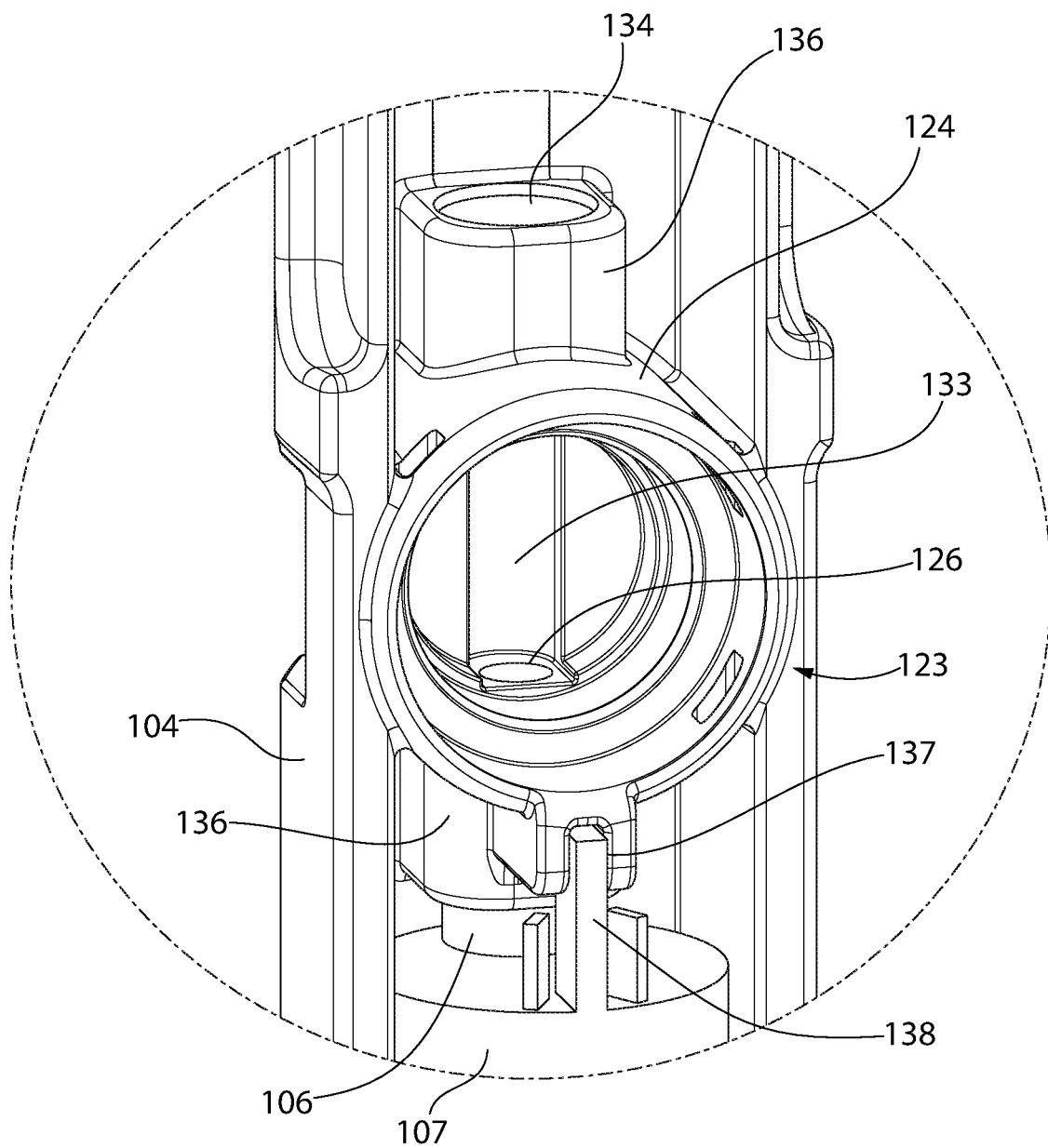
FIG. 14D is detailed view taken from FIG. 14C.
Figure 14E:
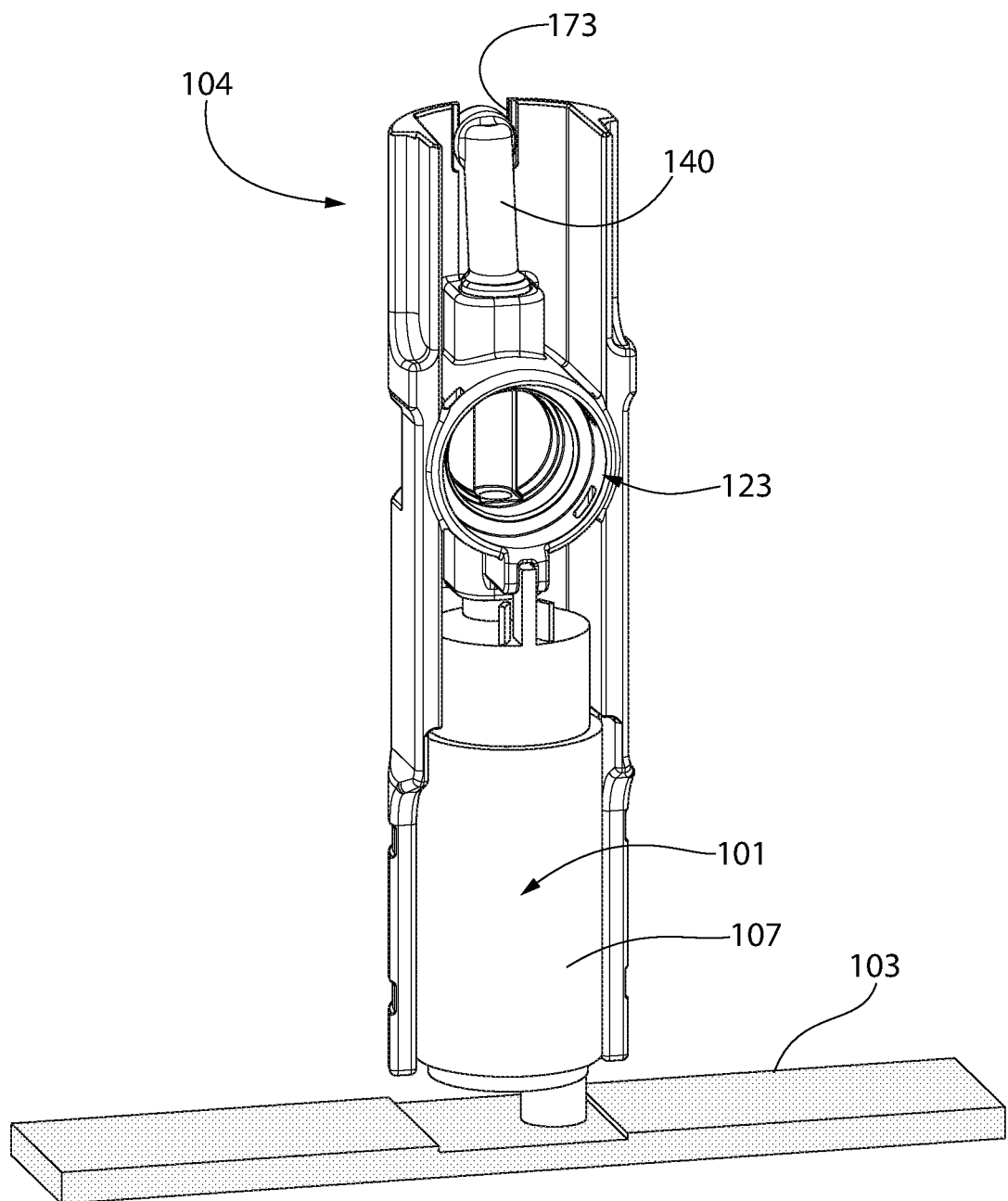
FIG. 14E is a fourth sequential view of the process or method of assembling the pump assembly.
Figure 14F:
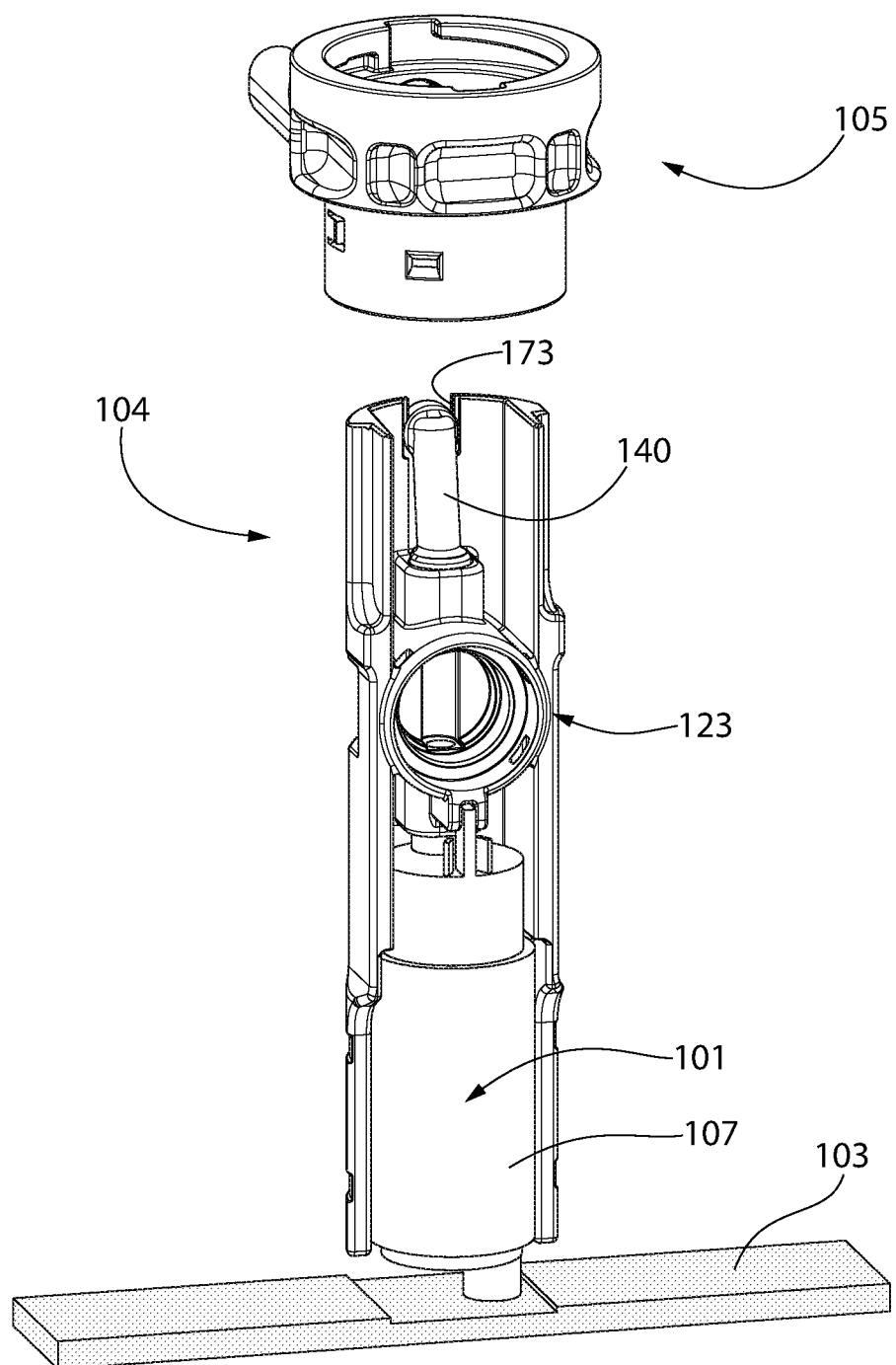
FIG. 14F is a fifth sequential view thereof.
Figure 14G:
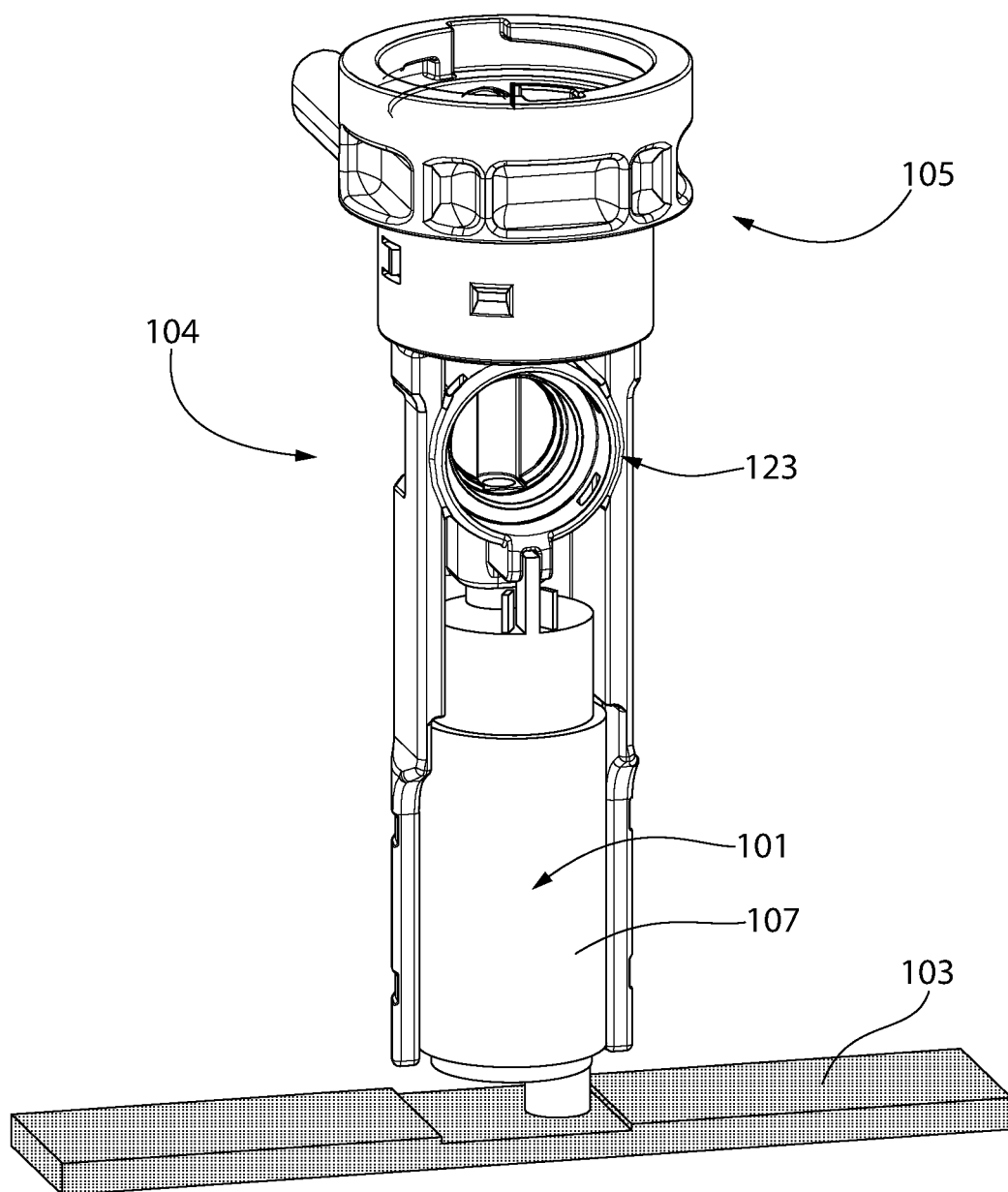
FIG. 14G is a sixth sequential view thereof.
Figure 14H:
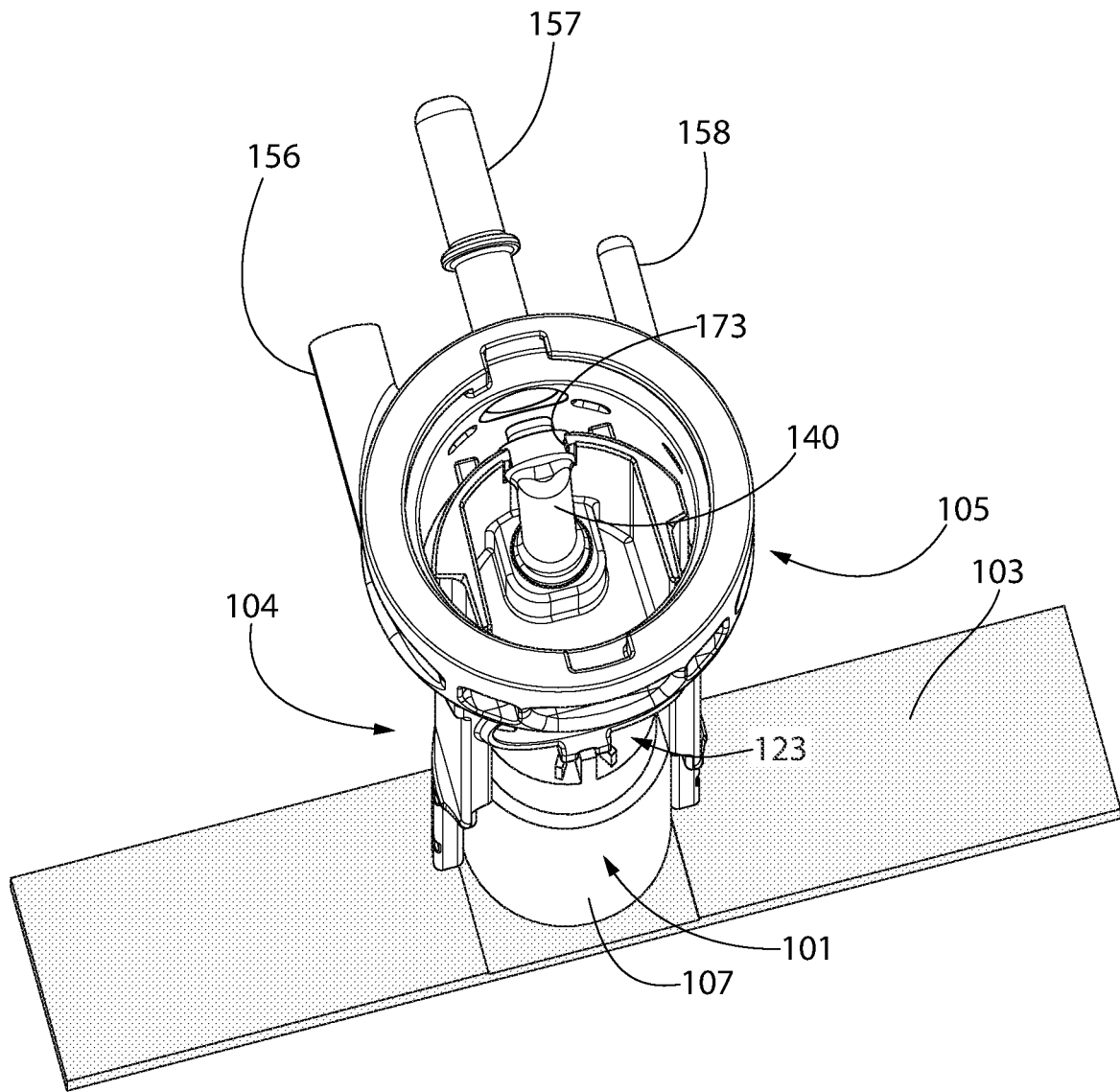
FIG. 14H is a seventh sequential view thereof.
Figure 14I:
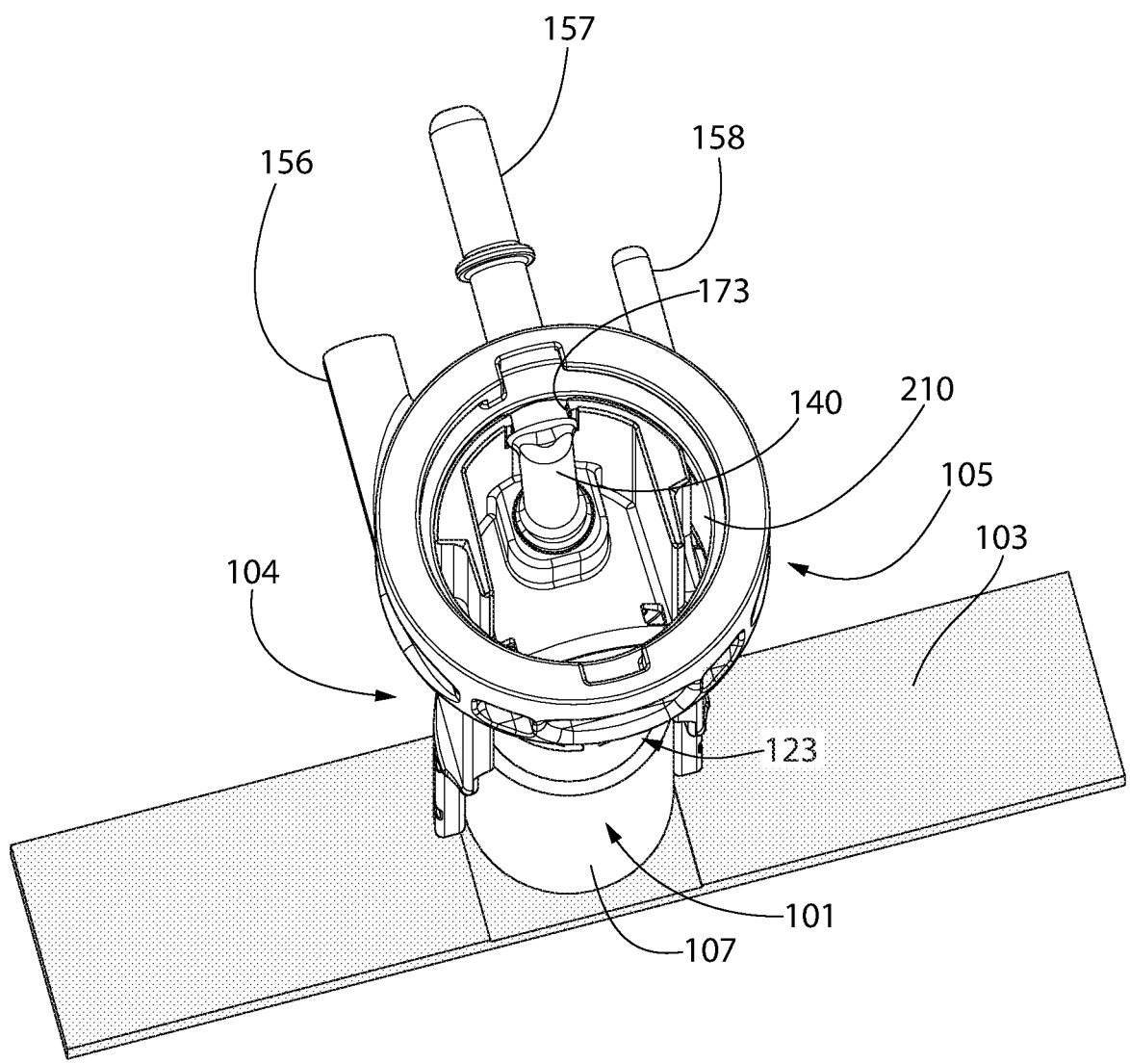
FIG. 14I is a eighth sequential view thereof.

FIGS. 14A-I and 15A-E show sequential views in assembling the pump 101 to the pump housing and coupling the upper and lower housing units 105, 104 together. FIG. 14A shows the unassembled lower housing unit 104 and pump 101 with filter 103 pre-installed. The pump 101 is then installed and mounted on the lower housing unit as shown in FIG. 14B. Discharge flow tube 140 is then installed on the lower housing unit as shown in FIG. 14C (either before or after mounting the pump). FIG. 14E shows the pump and flow tube installed. Upper housing unit 105 is axially aligned with the lower housing unit 104 (FIG. 14F). The top portion of the lower housing unit is then inserted through the bottom of the upper housing unit from below as shown in FIG. 14G. The flow tube 140 is then coupled to the fuel dispensing nozzle 157 on upper housing unit 105 via flow hole 162 as shown in FIGS. 14H and 14I. The upper and lower housing units are now ready to be securely coupled together.

Referring to FIGS. 15A-E, upper and lower housing units 105, 104 are first axially aligned. The upper end of the lower housing unit 104 is then inserted through the open bottom 153 of the upper housing unit 105 and into internal cavity 155. Top outlet end 142 of flow tube 140, previously mounted in the lower housing unit 105, is inserted into hole 162 of the upper section 150 of the upper housing unit 105. This fluidly couples the tube to the fuel dispensing nozzle 157. In one construction, the upper portion of the lower housing unit 104 includes a spaced apart pair of lateral guide projections 200 which are inserted into corresponding guide holes 201 disposed proximate to flow hole 162 inside cavity 155 of the upper housing unit 105 (see, e.g. FIGS. 12F and 13). This ensures that the outlet end 142 of flow tube 140 is properly located and aligned for insertion into flow hole 162 of the upper section 150 of the upper housing unit 105.

Figure 15A:
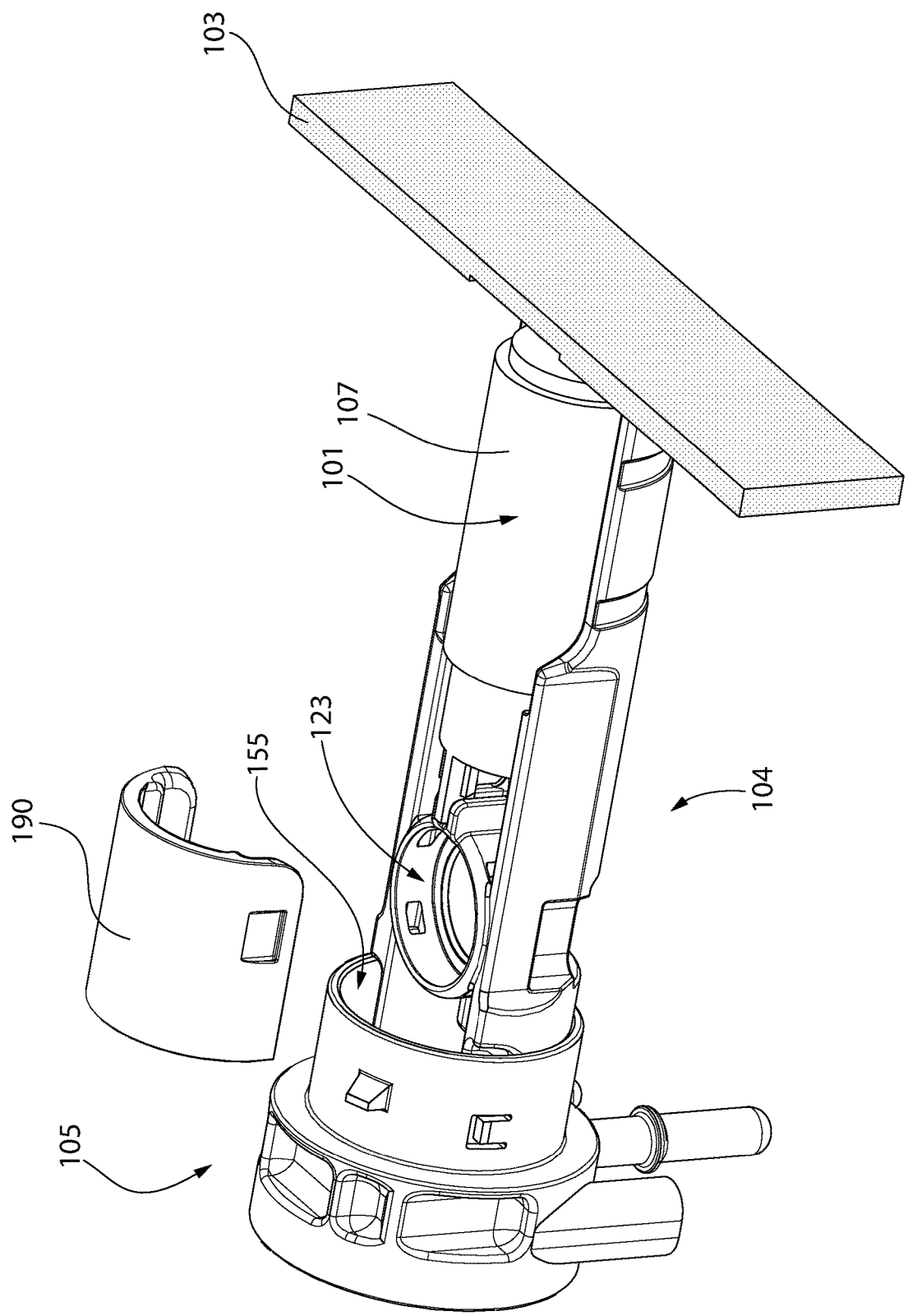
FIG. 15A is a first sequential view for a process or method of coupling the lower pump housing unit to the upper pump housing unit using the retainer.
Figure 15B:
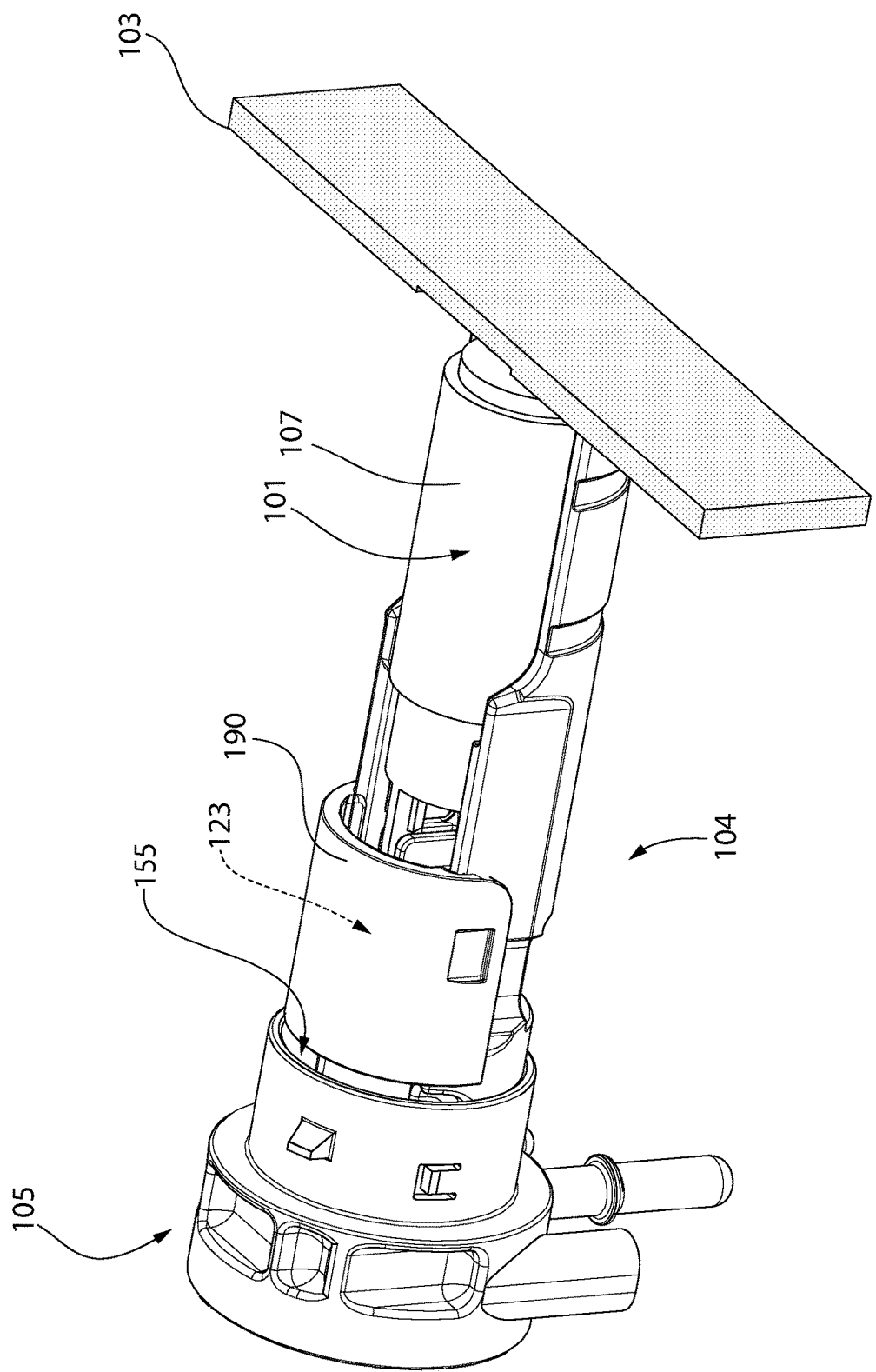
FIG. 15B is a second sequential view thereof.
Figure 15C:
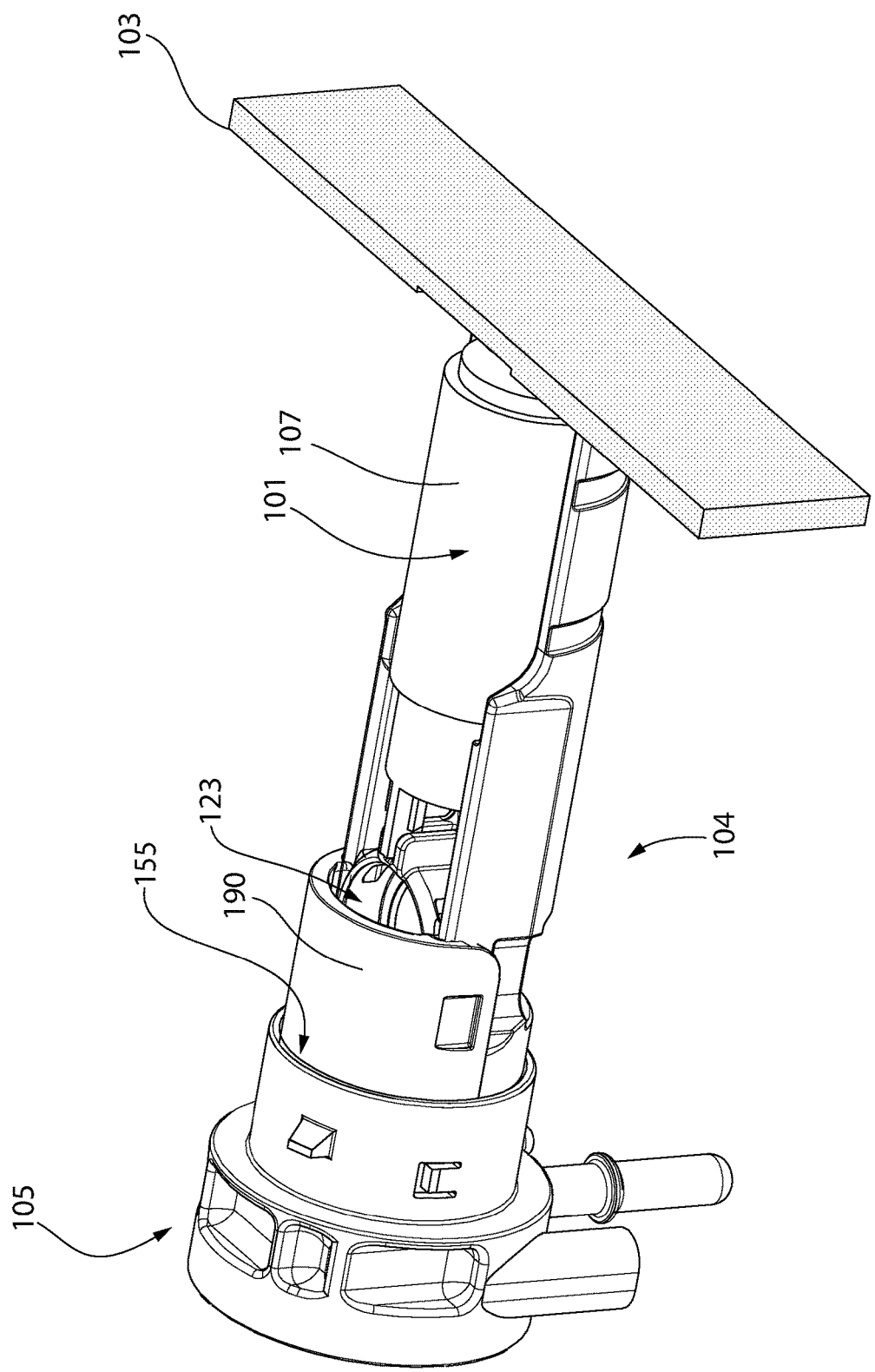
FIG. 15C is a third sequential view thereof.
Figure 15D:
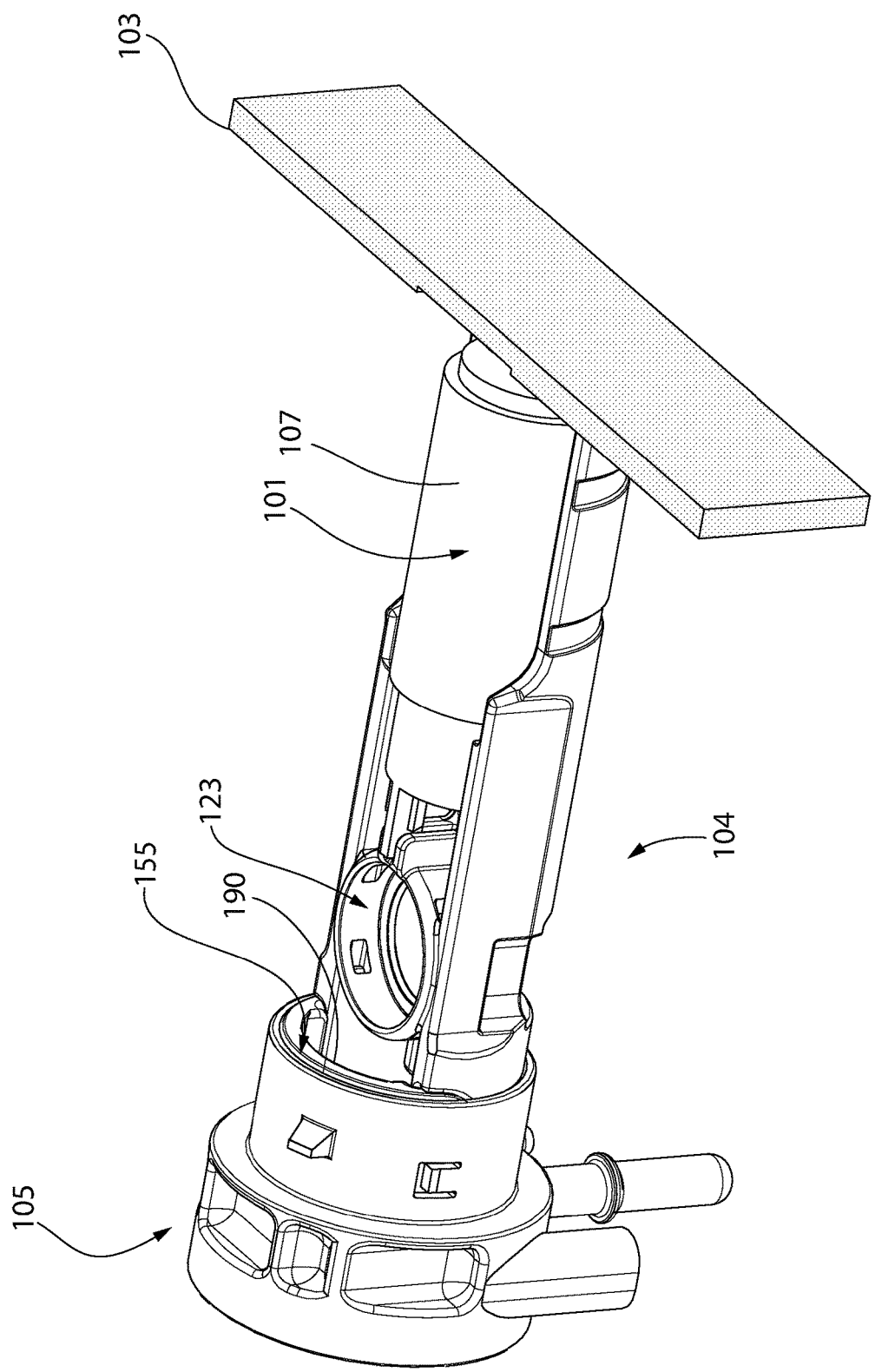
FIG. 15D is a fourth sequential view thereof.
Figure 15E:
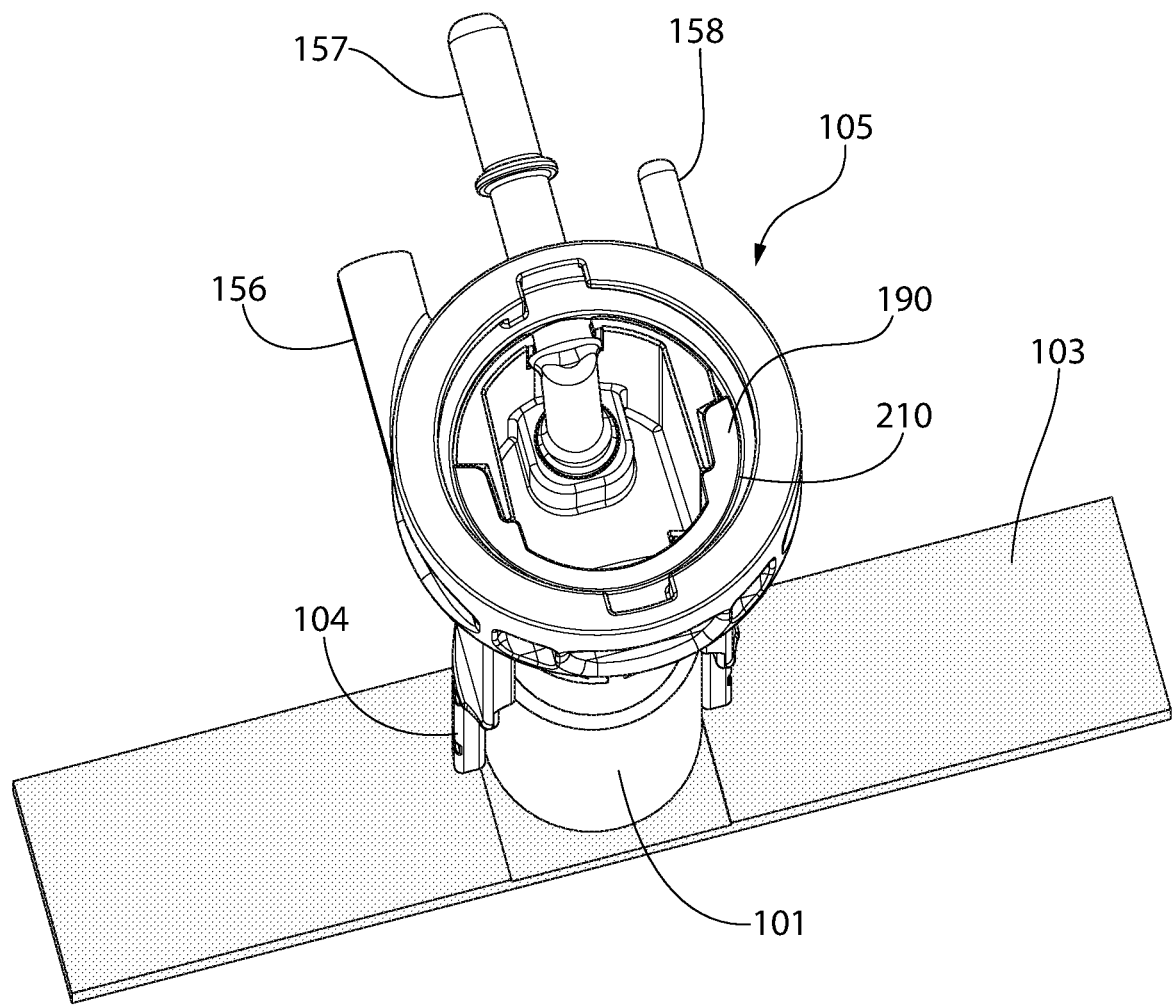
FIG. 15E is a fifth sequential view thereof.
Figure 16:
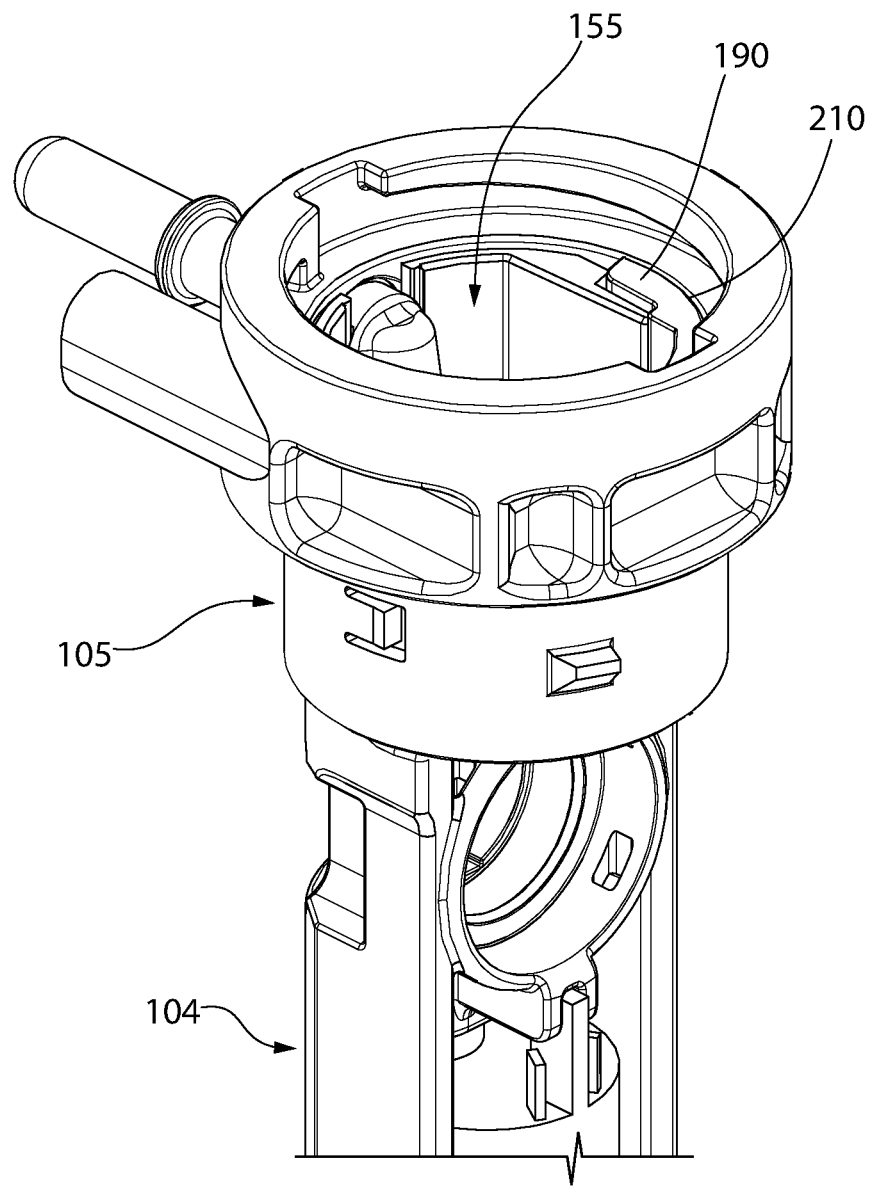
FIG. 16 is a top perspective view showing lower and upper pump housing units assembled to form the pump housing.
Figure 17:
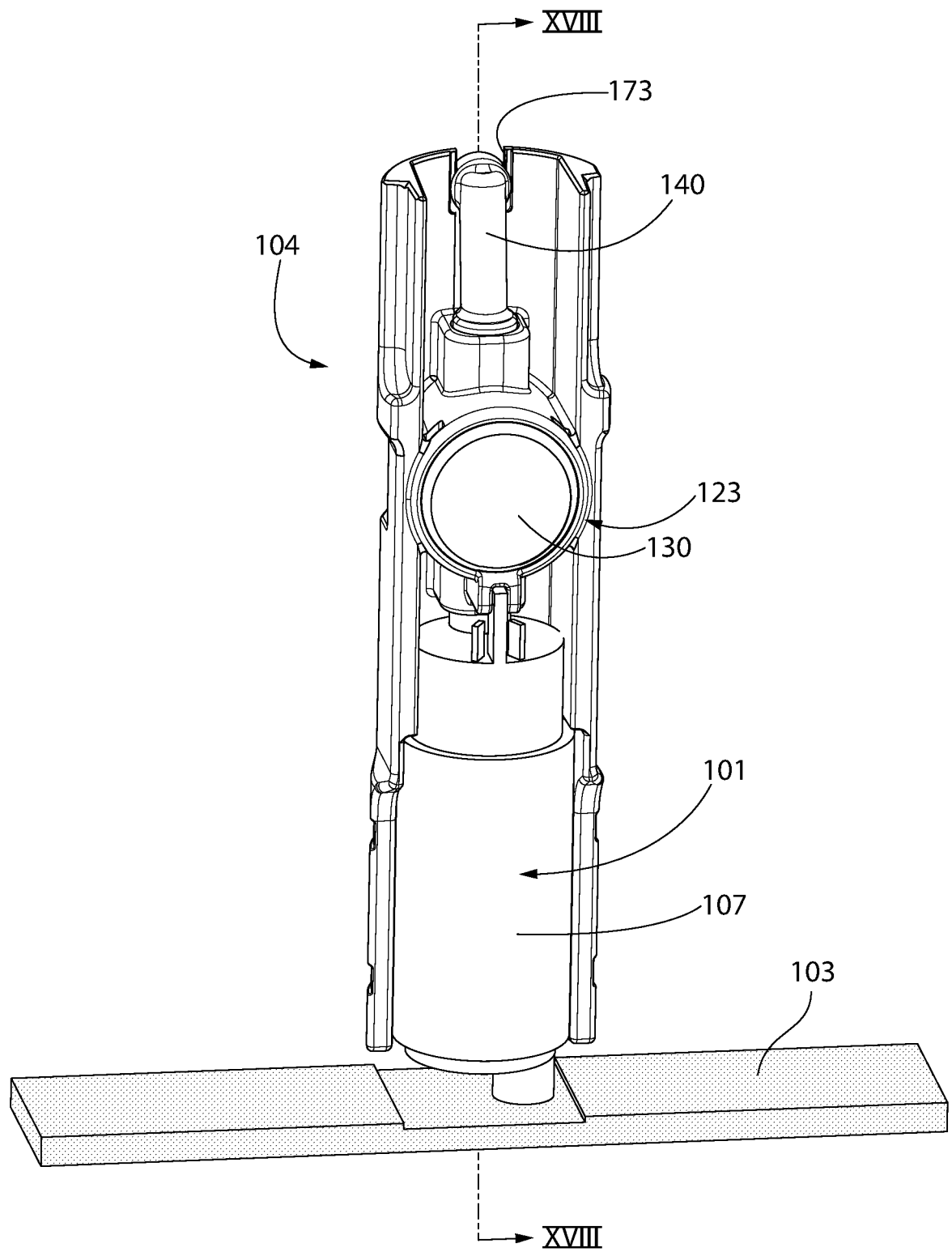
FIG. 17 is a front perspective view of the assembled pump housing.
Figure 18:
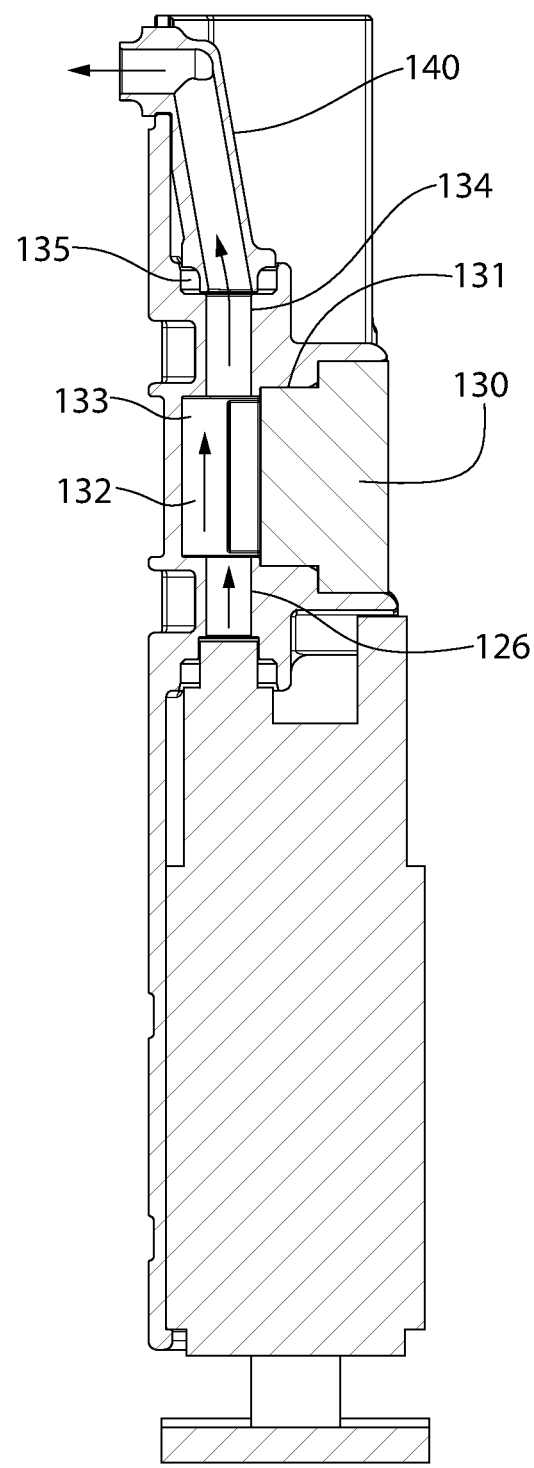
FIG. 18 is cross-sectional view thereof taken from FIG. 17.

Insertion of the lower housing unit 104 into the upper housing unit 105 forms an annular gap 210 between the upper and lower housing units within cavity 155 when the units are coupled together. The gap 210 extends circumferentially for at least part of the circumference of the upper and lower housing units 105, 104. A retainer 190 configured for insertion into this annular gap 210 is provided to lock the upper housing unit 105 to the lower housing unit 104. In one implementation, retainer 190 may have an arcuately curved C-shape Interior end portions of the retainer 190 may be step shaped to mate with corresponding step shaped portions of the annular gap. The mutually engaged steps prevent the retainer 190 from rotating within the upper housing unit 105. In operation, retainer 190 is placed against the upper portion of lower housing unit 104 over the socket 123 and then slid upwards into annular gap 120 within the upper housing unit 105. The retainer 190 may be inserted into the gap for substantially the entire length of the retainer. This frictionally secures the upper housing unit 105 to the lower housing unit 104 via an interference fit created so that the two parts cannot be axially separated easily with the retainer in place. The retainer 190 is sized to compress the joint between the upper and lower housing units 105, 104, thereby acting a compression fitting. FIGS. 15E and 16 are top views of the pump housing 102 showing the retainer 190 fully seated in the annular gap 120 formed within the upper housing unit 105.

Figure 15F:
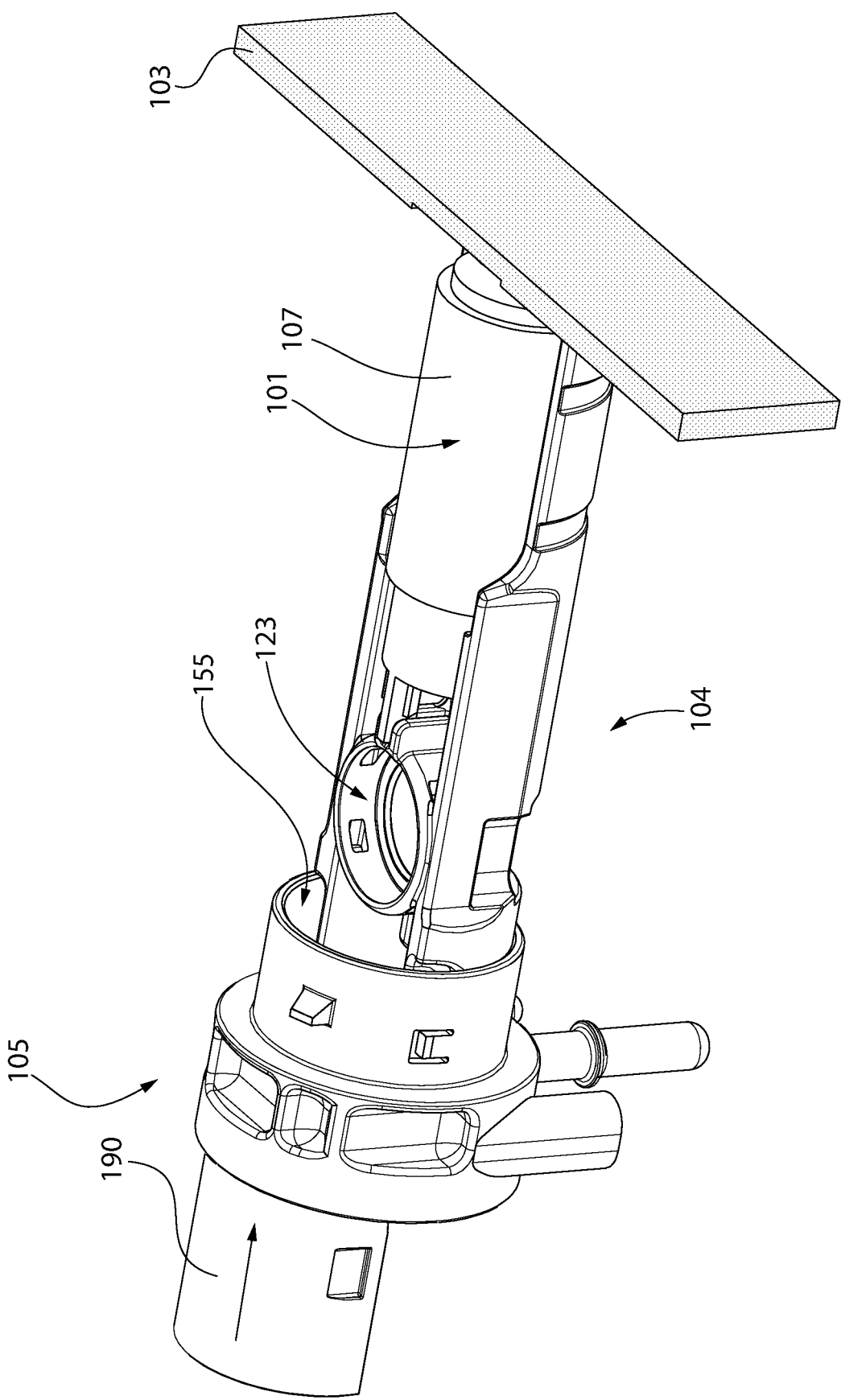
FIG. 15F is a perspective view of an alternative process or method of coupling the lower pump housing unit to the upper housing unit using the retainer.

In lieu of inserting retainer 190 into annular gap 210 through the bottom of the upper housing unit 105 as shown in FIGS. 15A-E, in some implementations the retainer may instead be inserted into the gap 210 from the top of the upper housing unit. This is illustrated in FIG. 15F. The upper housing unit 105 in this case is configured to allow insertion of the retainer through its top opening 256.

Electrical wiring connections may now be made to pump 101 via wiring conduit tube 156 before the pump assembly is installed in the fuel tank 20. In alternative constructions, the upper housing unit 105 and lower housing unit 104 may have complementary configured mating male/female electrical terminals (not shown) to automatically make the necessary electrical connections to the pump when the upper and lower housing units are coupled together. The terminals may in turn be wired to the pump 101 and length of electrical wires inserted through wiring conduit tube 156.

The fuel cap 30 may next be mounted on the fuel tank 20 by rotary coupling to the top end of the pump housing 102. Referring to FIGS. 19A-D, fuel cap 30 is an assembly comprising a circular upper operating portion 192 and a lower coupling portion 193 configured for coupling to the upper housing unit 105 of the pump housing. Operating portion 192 may be configured for grasping by a user and has a diameter larger than the diameter of the upper housing unit 105. Coupling portion 193 has a diameter smaller than the upper housing unit 105 to allow insertion into the internal cavity of the upper housing unit.

Figure 19A:
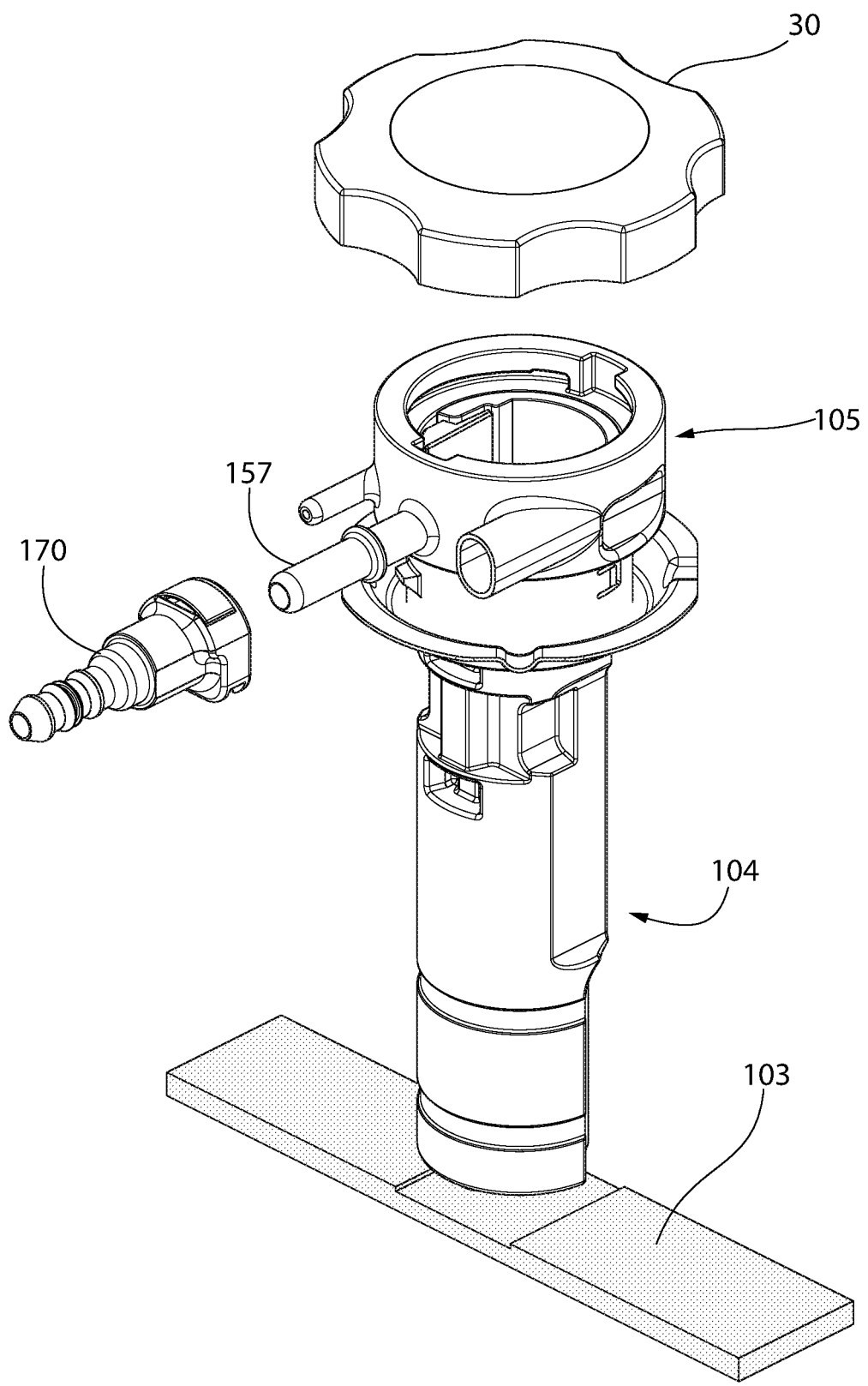
FIG. 19A is an exploded view of the pump housing assembly including a fuel cap and tubing coupler of a fuel dispensing nozzle assembly.
Figure 19B:
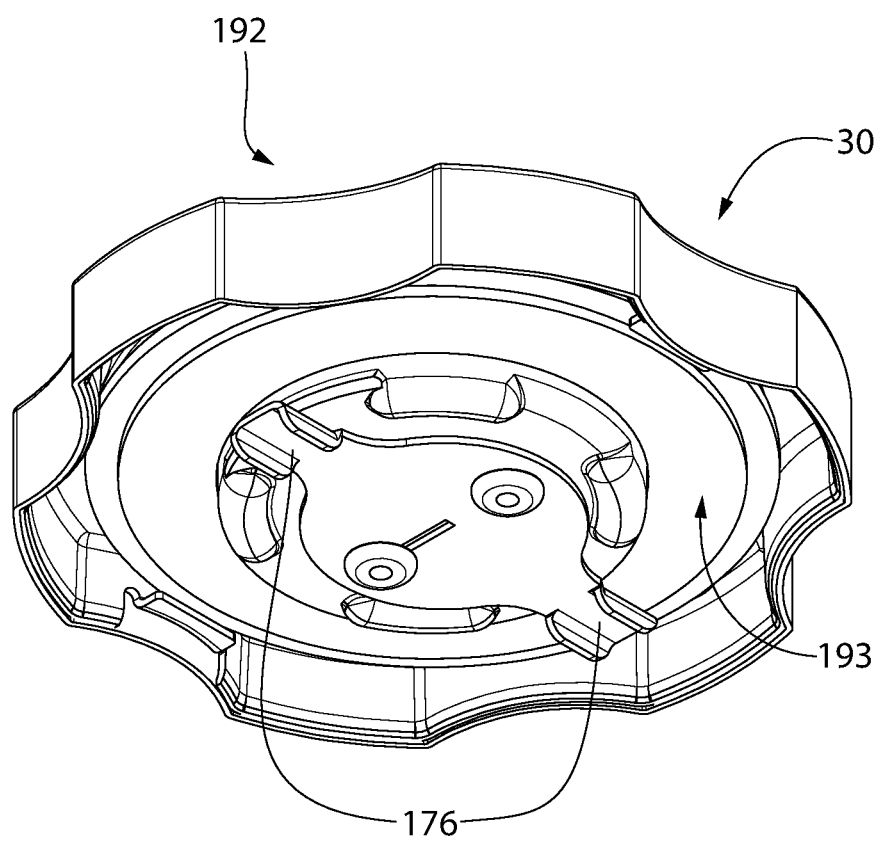
FIG. 19B is a bottom perspective view of the fuel cap.
Figure 19C:
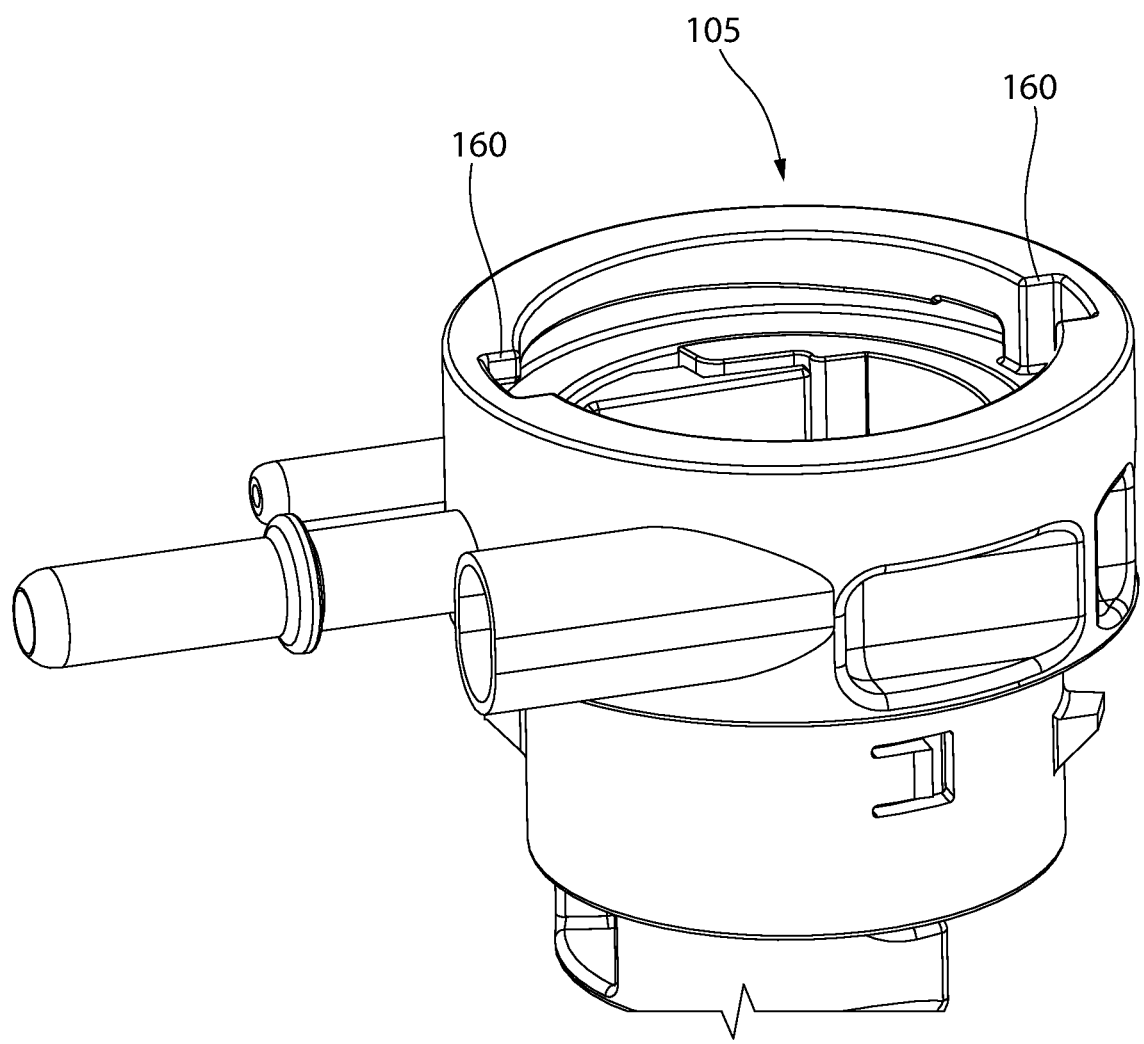
FIG. 19C is a top perspective view of the upper housing unit of the pump housing on which the fuel cap is mounted.
Figure 19D:
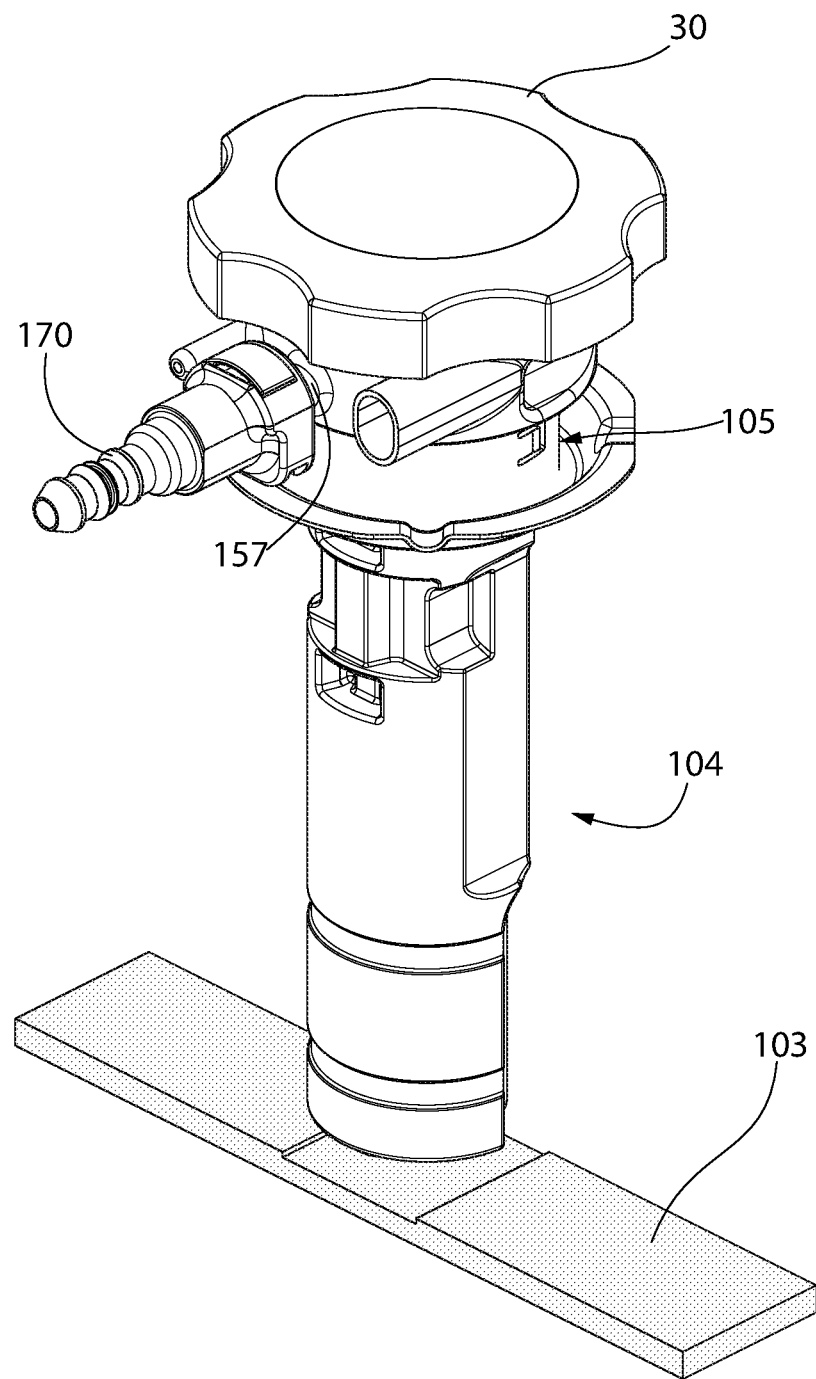
FIG. 19D shows the fuel cap in a rotatably mounted position on the upper housing unit.

With continuing reference to FIG. 19A D, upper housing unit 105 of pump housing 102 is configured for removably mounting the fuel cap 30 thereto, thereby forming a tank fuel fill port or tube. This provision, along with the configuration of the lower housing section 104 (e.g. upper fuel fill cavity 121) advantageously allow a single fuel tank opening to be used for both mounting the fuel pump and fuel fill. Upper section 150 of housing unit 105 and fuel cap 30 each include complementary configured mechanical coupling features which allow removable coupling of the fuel cap to the pump housing. In one example, fuel cap 30 may be rotatably and threadably attached to the upper section 150 of the upper housing unit 105. In another possible arrangement as illustrated, a cam lock type configuration may be used to rotatably secure the fuel cap 30 in place on the upper housing unit 105. Upper section 150 of upper housing unit 105 may include a pair of circumferential cam lock tracks or grooves 177. Grooves 177 may be inwardly open to cavity 155 and diametrically opposed. Grooves 177 may be formed in the lateral sidewalls 154 of the upper section 150. In one implementation, cam lock grooves 177 each have a circumferentially measured length or extent that is about one-half or less than the circumference of the upper section 150 (i.e. angularly about 180 degrees or less). Each groove 177 has an open entry end 179 and closed end 178 formed by an end wall. The entry ends 179 each communicate with an entrance slot 160 formed through an annular top surface 175 of the upper housing unit 105. The pair of slots 160 may be diametrically opposed and receive pair of diametrically opposed camming lugs 176 formed at or near the bottom end 178 of the fuel cap assembly. Camming lugs 176 protrude radially and laterally outwards from the fuel cap assembly. In use, the fuel cap assembly is axially inserted into the internal cavity 155 of the upper housing unit 105. Camming lugs 176 are aligned with and inserted through the slots 160 into the groove 177. The fuel cap 30 is then rotated. The lugs 176 each slidably engage and travel circumferentially in their respective cam lock grooves 177 from the entrance slots 160 to a respective closed end 178 of each groove. This prevents the fuel cap 30 from further rotation and locks the cap in place on the fuel tank 20. In one configuration, the cam lock grooves 177 may each be angled or sloped downwards from the entry ends 179 to the closed ends 178 (best shown in FIG. 12D). As the fuel cap 30 is turned, the rotary motion of the lugs 176 in the sloped grooves 177 draws the fuel caps axially downward to tighten engagement with the upper housing unit 105. Fuel cap 30 may include suitable seals and appurtenances for sealing the connection to the upper housing unit 105.

Figure 21A:
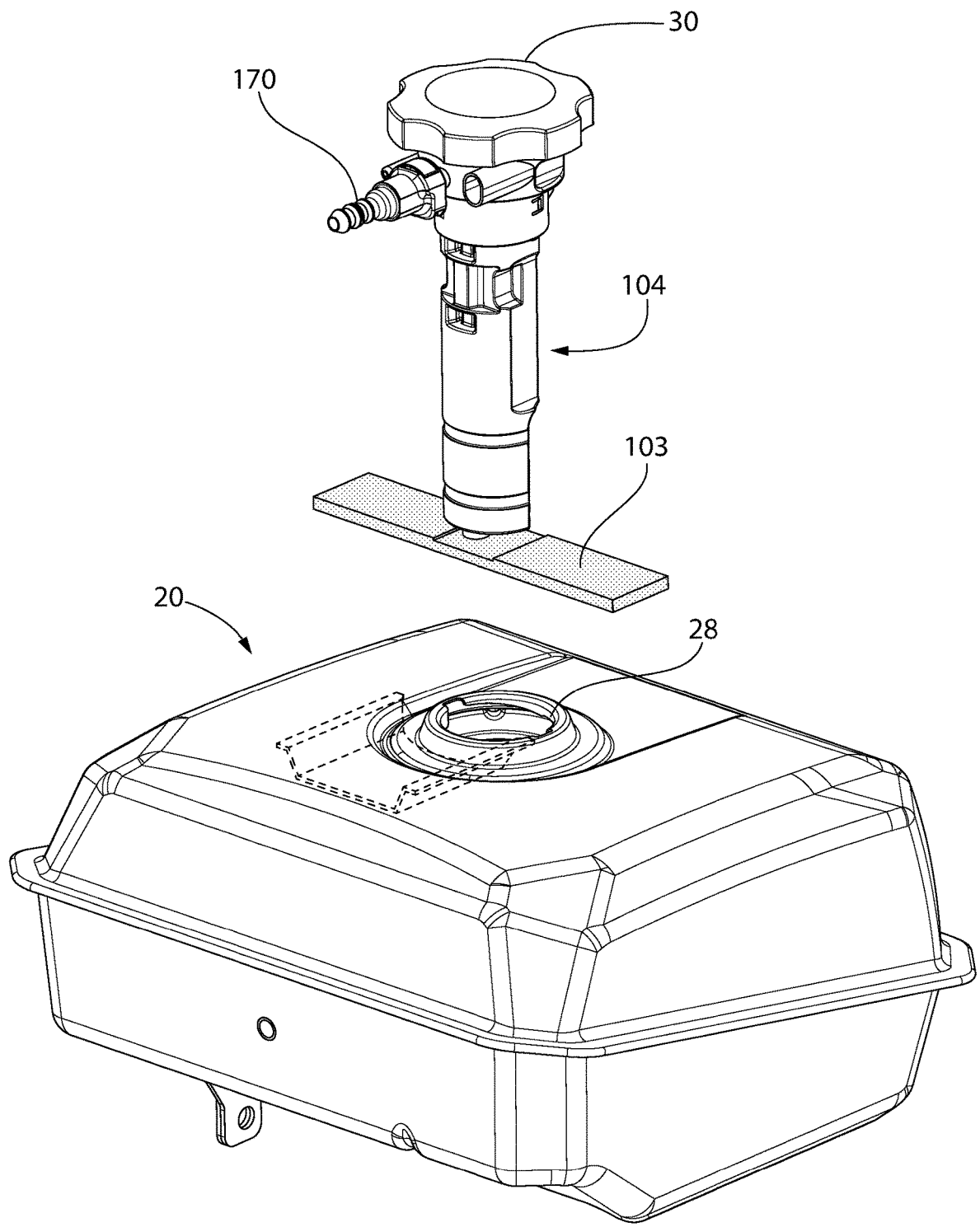
FIG. 21A is a first sequential view of installing a fully assembled pump assembly into the fuel tank through the fuel fill opening, the filter being shown in an unfolded condition.
Figure 21B:
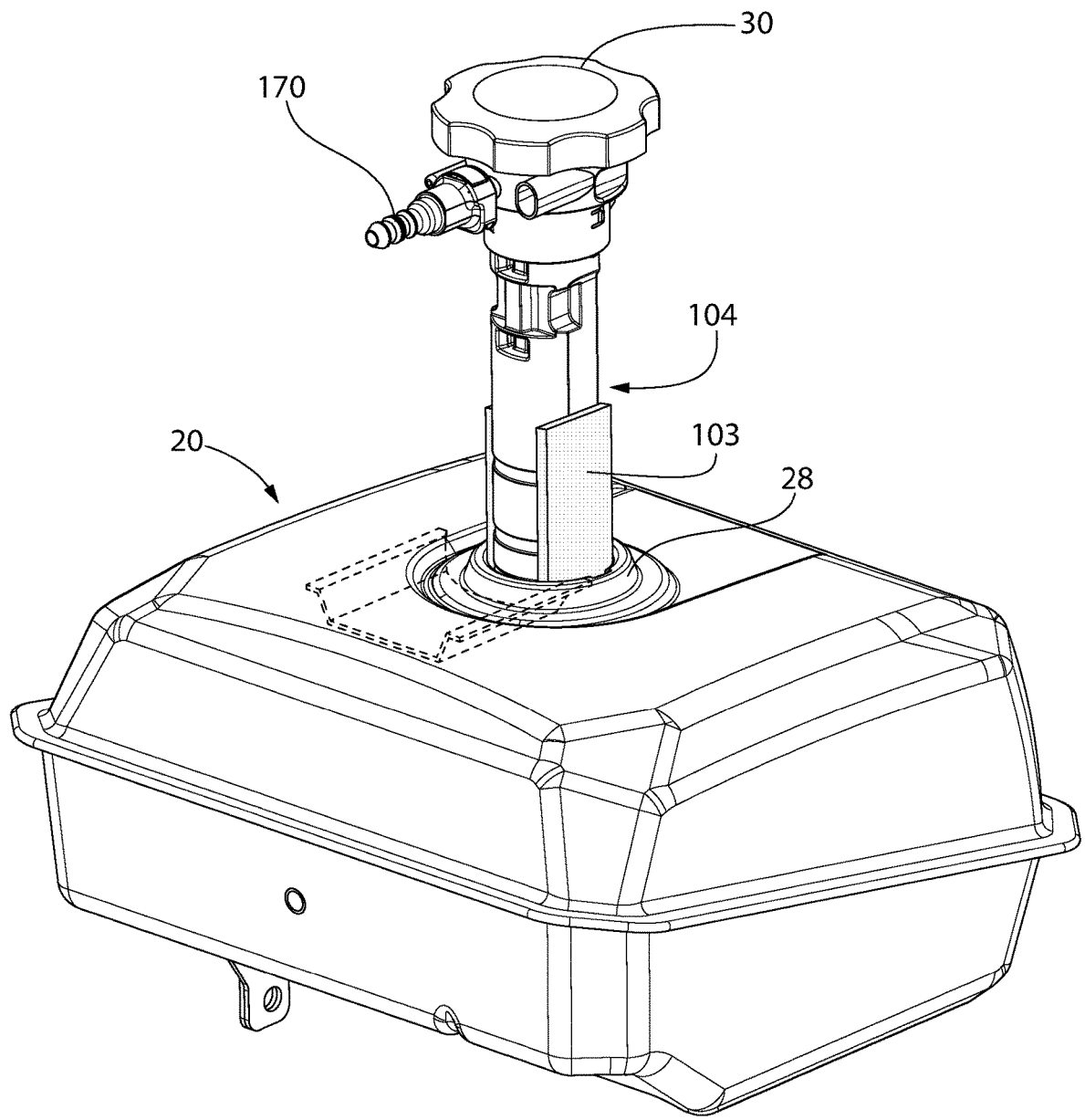
FIG. 21B is a second sequential view thereof, the filter being shown in a folded condition.
Figure 21C:
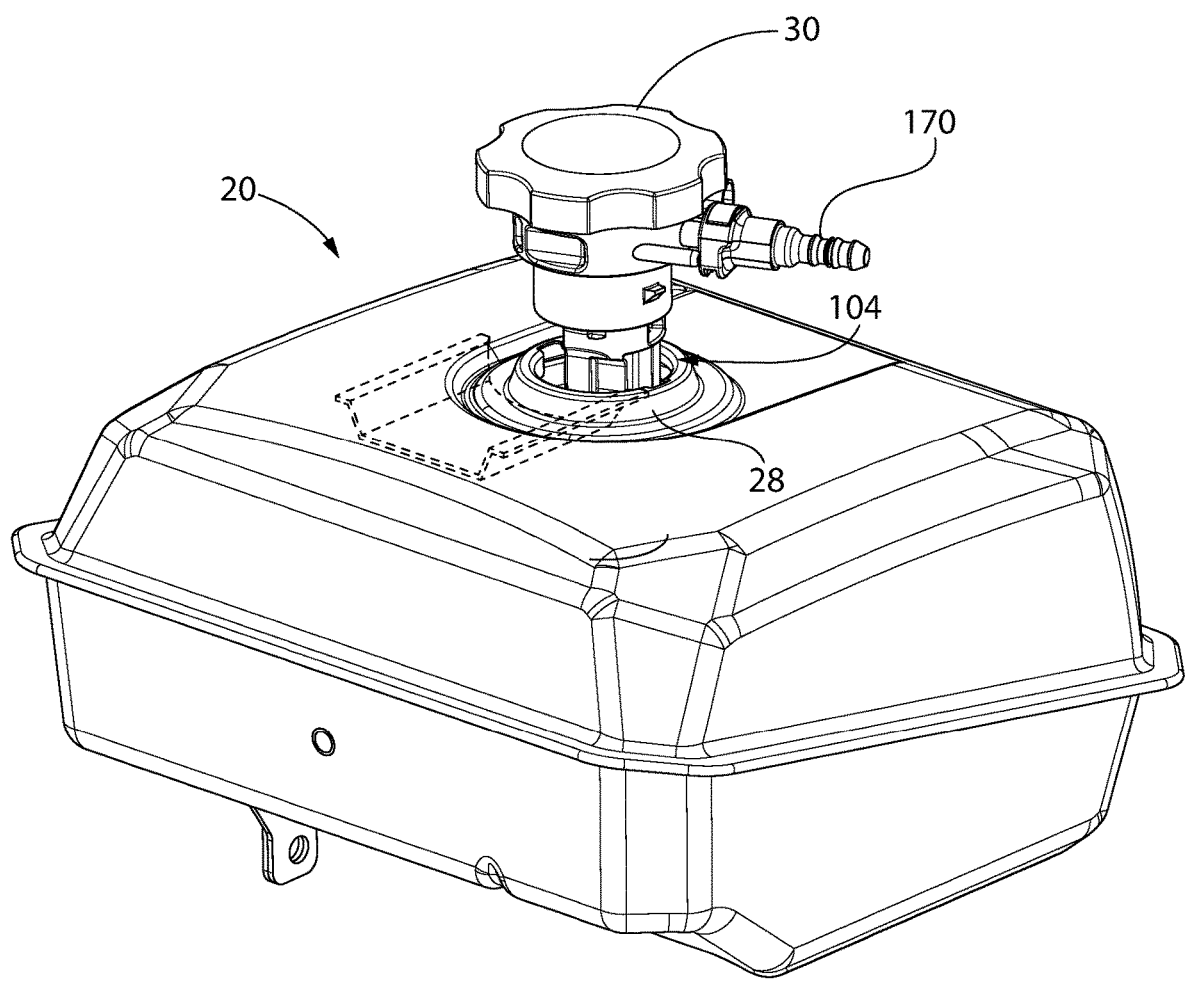
FIG. 21C is a third sequential view thereof.
Figure 21D:
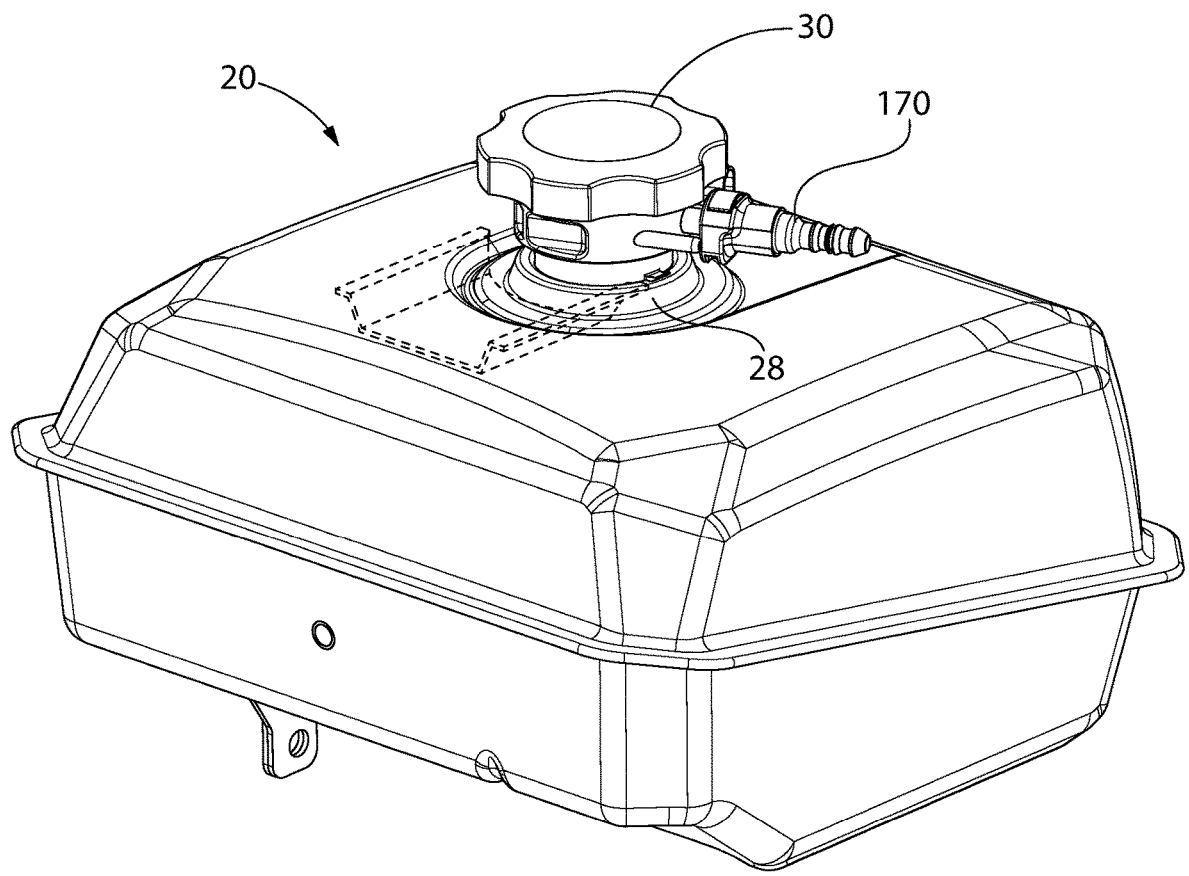
FIG. 21D is a fourth sequential view thereof.

FIGS. 21A-F show sequential steps in a process or method for installing the fully-assembled fuel pump assembly (with or without fuel cap 30 in place on the pump housing) into the fuel tank 20. Fuel pump assembly (inclusive of the pump housing 102, pump 101, and filter 103) is vertically and axially aligned with the fuel fill opening 28 in fuel tank 20 along vertical mounting axis VA (FIG. 21A). The fuel filter 103 is in its normal unfolded flattened (i.e. undeformed/undeflected) condition or state with ends 109 protruding laterally outwards beyond the pump housing 102. The bottom end of the lower housing unit 104 and filter are slideably and vertically inserted into the fuel fill opening 28. Filter 103 engages fuel tank 20 at the fuel fill opening 28, which causes the ends 109 of the filter to fold upwards into approximately a U-shaped configuration (FIG. 21B). This conforms the filter to the size of the opening temporarily to allow the pump housing to be fully inserted into the tank 20. Once the pump housing 102 is inserted to a sufficient depth into the fuel tank 20 (FIG. 21C), the ends 109 of filter 103 will pass beneath and disengaged the tank fuel fill opening 28 and spring back to their original unfolded flattened condition.

Figure 21E:
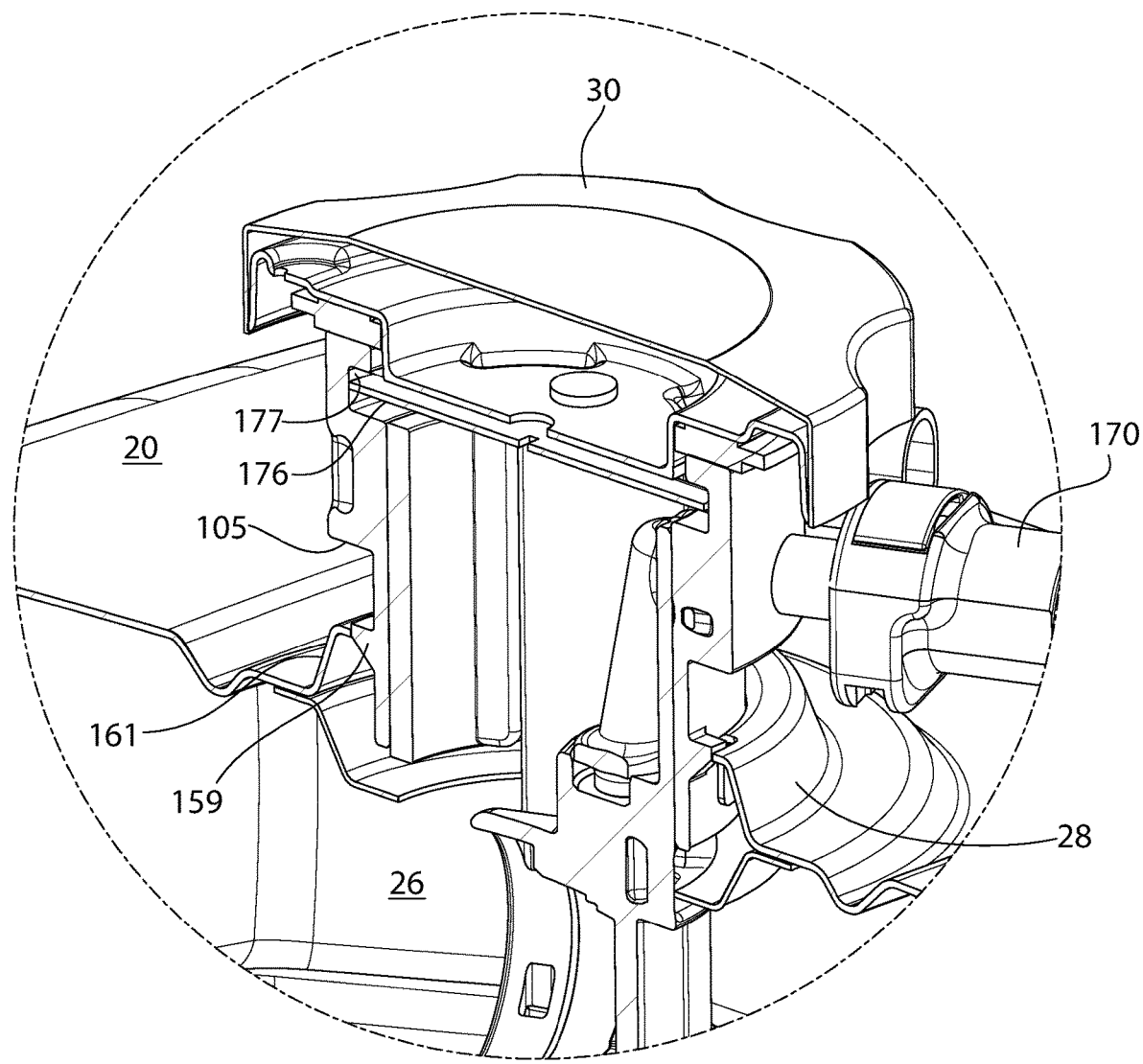
FIG. 21E is a fifth sequential view thereof.
Figure 21F:
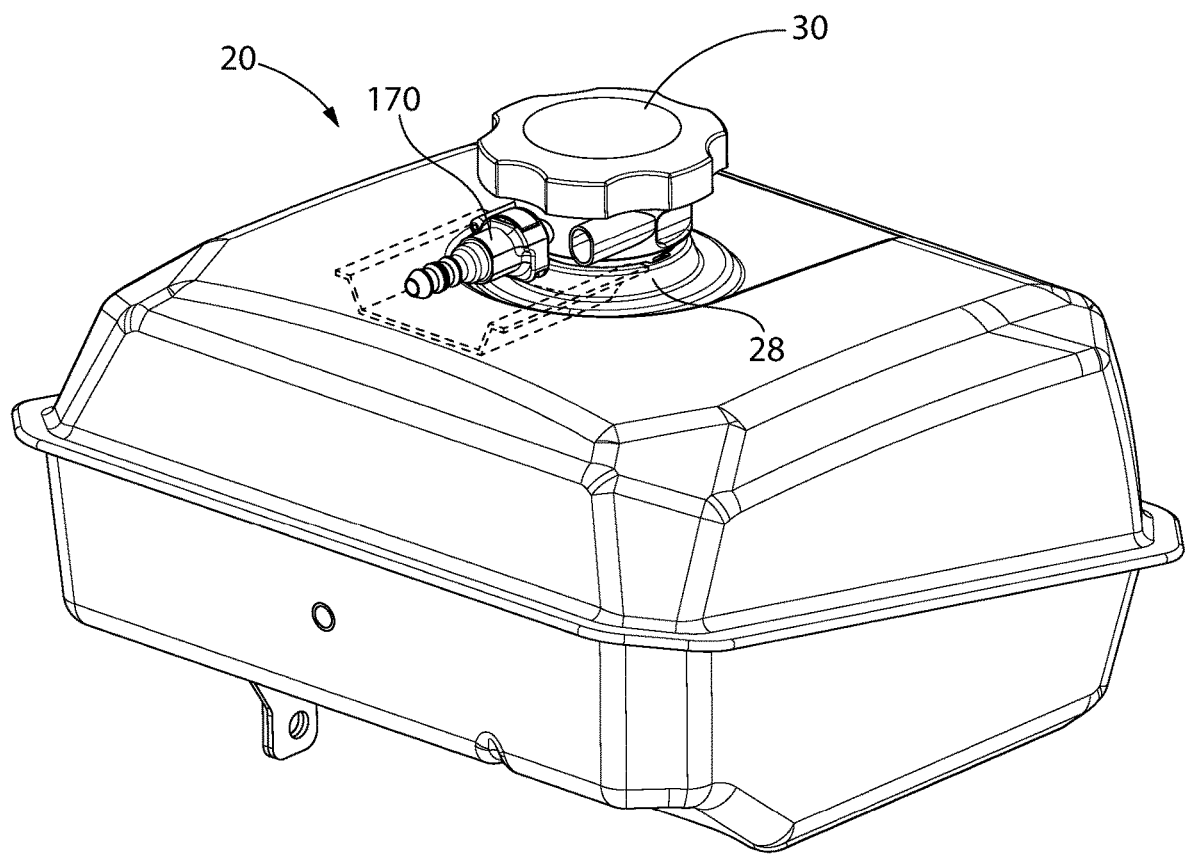
FIG. 21F is a sixth sequential view thereof.

Once the pump assembly is fully lowered and inserted into the fuel tank 30 (FIG. 21D), the pump assembly may then be rotated about 90 degrees in one example to lock the pump housing 102 to the fuel tank 30 (FIG. 21F). This is accomplished via the radially protruding lugs 159 on the upper housing unit 105 engaging the annular lip 161 arranged inside the fuel fill opening 28 of the fuel tank 20 (FIG. 21E). Vertical axial removal of the pump assembly from the fuel fill opening 28 is prevented without rotating the pump assembly back to its original insertion orientation. The pump housing nozzles 158, 157, and electrical conduit tube 156 are now axially aligned with a protective tubing channel 198 mounted on the top of the fuel tank 30. Only the bottom section of the tubing channel structure is shown for clarity of depiction; however, a mating top section which may have the same configuration as the bottom section may then be coupled to the bottom section to fully enclose and protect the nozzles 157, 158 and electrical conduit tube 156 from damage. The fuel line and vapor line runs between the fuel pump assembly and the engine and vapor canister may next be coupled as required. It bears noting the electrical wiring connections to pump 101 via wiring conduit tube 156 may be made before the pump assembly is installed in the fuel tank 20 during assembly of the pump housing as previously described herein.

Advantageously, the pump housing 102 is configured so that the fuel tank 20 may be filled with fuel with the fuel pump assembly remains installed in the fuel fill opening 28 of the tank. This is provided by the fuel fill flow path P defined through the pump housing as previously described herein. The dual purpose fuel fill opening, used for both filling the tank with fuel and mounting the pump assembly therein, obviates the need for a separate pump opening.

Figure 22:
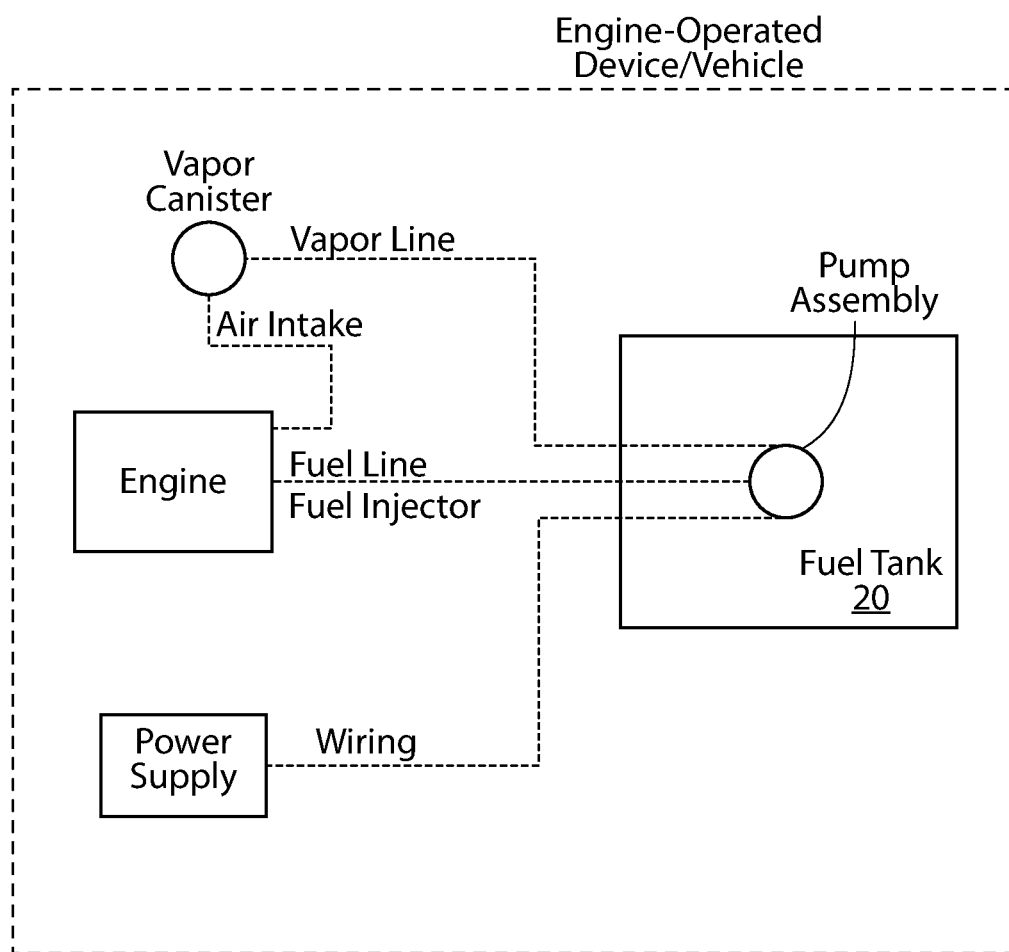
FIG. 22 is a schematic diagram showing an engine-operated device or apparatus with liquid fuel delivery system according to the present disclosure.
Figure 23A:
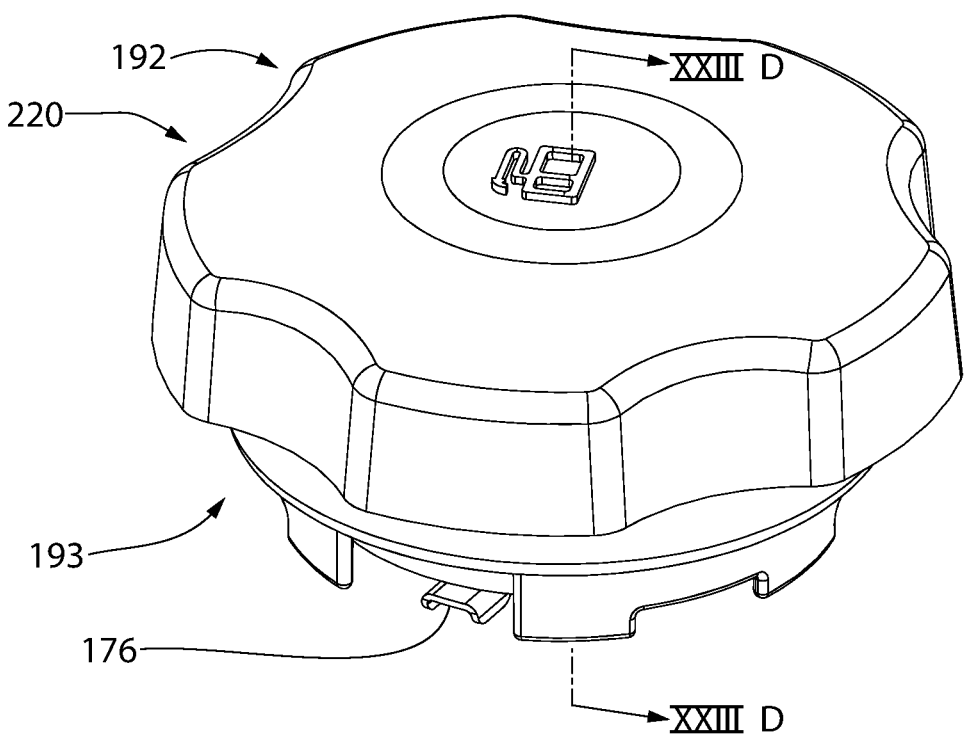
FIG. 23A is a top perspective view of an alternative fuel cap usable with the fuel pump assembly which incorporates a carbon fuel vapor canister.
Figure 23B:
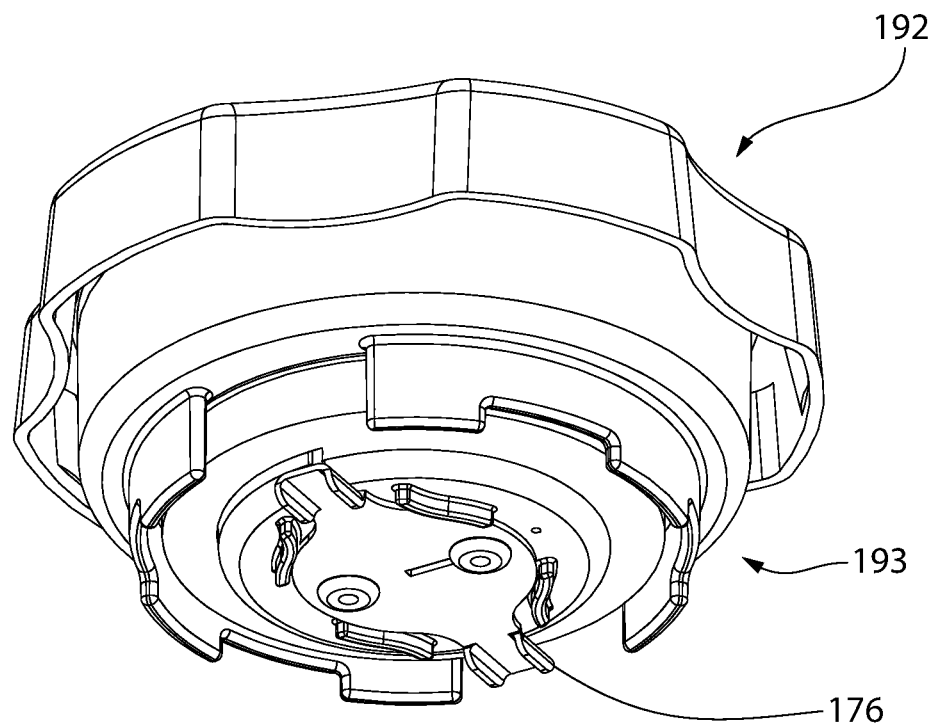
FIG. 23B is a bottom perspective view thereof.
Figure 23C:
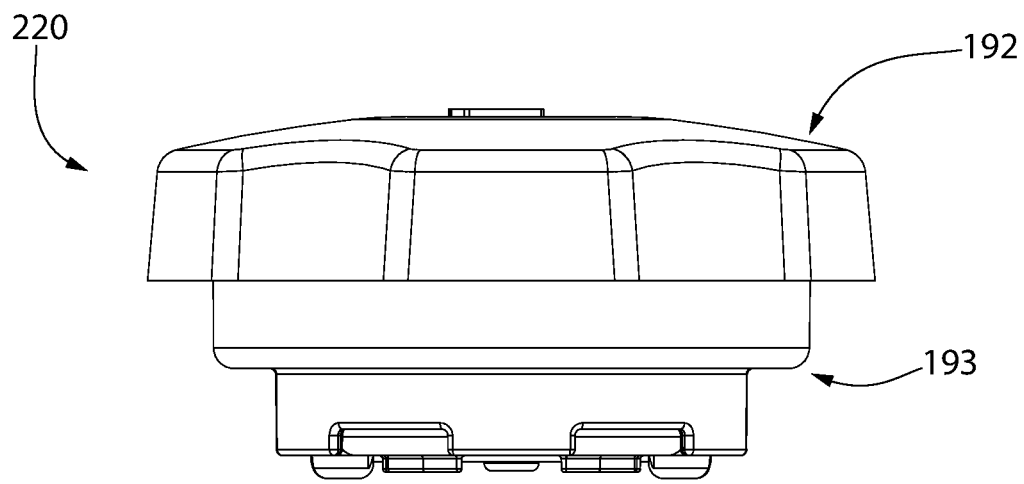
FIG. 23C is a side view thereof.
Figure 23D:
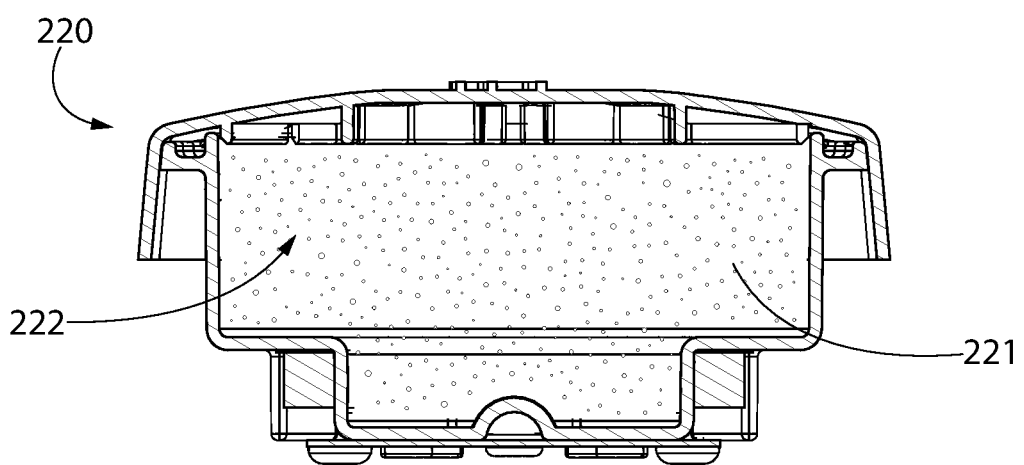
FIG. 23D is a transverse cross-sectional view thereof.

FIG. 22 is a schematic diagram showing an engine-operated device or apparatus with liquid fuel delivery system according to the present disclosure. The apparatus may be any type of vehicle or equipment which operates on liquid fuel. For example, the vehicle may include wheel, rotating tracks, or propellers for creating propulsion to translate the vehicle across a surface or body of water, such as for example without limitation a riding mower, snowmobile, boat, all-terrain vehicle (ATV), automobile, etc. In other possible implementations, the apparatus may be a stationary piece of equipment a power generator, farm equipment, yard equipment, or other. The type of engine-operated apparatus is not limiting of the present disclosure. The apparatus may include an internal combustion engine configured to combust liquid fuel such as gasoline which may be stored in tank 20 mounted on-board. Tank 20 includes a fuel pump assembly according to the present disclosure including pump housing 102, pump 101, and filter 103. The pump housing 102 includes fuel dispensing nozzle 157, vapor vent nozzle 158, and electrical wiring conduit tube 156. The fuel dispensing nozzle 157 is fluidly coupled to the engine via the fuel tubing or line. Vent nozzle 158 is fluidly coupled to the fuel vapor canister via the vapor tubing or line. Fuel pump 101 (not individually shown in FIG. 22) of the fuel pump assembly may be electrically connected to the device/vehicle power supply system via suitable wiring and wiring conduit tube 156. The pressurized fuel line travels directly to the fuel injector. The fuel injector may go into an air-mixer throttle body, or into intake manifold, or may go directly in-cylinder (for direct-injection scheme). The vapor line continues from carbon canister (or AKA "vapor canister") to the air intake for the engine. Fuel vapors, which were temporarily stored in the absorptive carbon, will be re-evaporated into an air stream to the engine, thereby digesting all fuel completely during the normal combustion process. In operation, the pump assembly pumps fuel from tank 20 to the fuel injection system of the engine based on the position of the throttle. Vaporous fuel accumulating in the tank flows to the vapor canister, and then travel from the canister to the intake of the engine for digestion in the combustion process. The engine-operated apparatus includes all other components and appurtenances necessary for a fully functional liquid-fuel powered apparatus.

FIGS. 23A-D depict an alternative carbon canister fuel cap 220 usable with the fuel pump assembly 100. Fuel cap 220 has a higher profile than fuel cap 30 that defines an internal chamber 221 configured to house a carbon fuel vapor canister 222 for treatment of vaporous fuel emissions. Fuel cap 220 may be similar to fuel cap 30 in all other aspects including the provision of camming lugs 176 to fasten the cap to the upper housing unit 105 of pump assembly 100, as previously described herein.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. A fuel tank for an internal combustion engine comprising:
   a hollow body defining an internal reservoir configured for holding liquid fuel and a fuel fill opening at top configured for adding the fuel to the tank;
   a fuel pump having a pump housing suspended in the reservoir from the fuel fill opening, the fuel pump configured to pump fuel from the internal reservoir;
   wherein the pump housing comprises an internal cavity defining a fuel fill pathway between the fuel fill opening of the tank and the reservoir.

2. The fuel tank according to claim 1, wherein the cavity of the pump housing is configured for receiving and adding fuel from an external fuel source to the fuel tank via the fuel fill opening.

3. The fuel tank according to claim 2, wherein the fuel fill opening and cavity are collectively configured for at least partial insertion of a fueling nozzle therein associated with the external fuel source to direct the fuel dispensed from the fueling nozzle through the pump housing and into the reservoir of the fuel tank.

4. The fuel tank according to claim 1, wherein the pump housing includes an annular upper housing unit rotatably coupled to the fuel fill opening in the fuel tank, and a lower housing unit removably coupled in turn to the upper housing unit.

5. The fuel tank according to claim 4, wherein the upper housing unit comprises open top and bottom ends forming part of the fuel fill pathway.

6. The fuel tank according to claim 4, wherein the upper housing unit is rotatably engaged with a detachable fuel cap which closes a top opening of the upper housing unit leading to the fuel fill fluid pathway.

7. The fuel tank according to claim 5, wherein the upper housing unit comprises an exposed upper section located above a top wall of the fuel tank and a cylindrical lower section extending downwards from the upper section into the reservoir.

8. The fuel tank according to claim 7, wherein the upper section of the upper housing unit includes a radially extending fuel dispensing nozzle configured for securement of a fuel supply tube thereto.

9. The fuel tank according to claim 7, wherein the lower housing unit is upwardly slideably insertable inside the lower section of the upper housing unit.

10. The fuel tank according to claim 7, wherein the lower section of the upper housing unit includes a plurality of radially protruding lugs rotatably engaging an annular lip of the fuel tank inside the fuel fill opening.

11. The fuel tank according to claim 4, wherein the lower housing unit comprises a vertically-extending longitudinal concavity which is laterally open and forms part of the fuel fill pathway.

12. The fuel tank according to claim 11, wherein the lower housing unit has a C-shaped body in transverse cross section.

13. The fuel tank according to claim 11, wherein the longitudinal concavity is configured to receive the fuel from the upper housing unit in a vertical direction and introduce the fuel to the reservoir in a lateral direction through the pump housing.

14. The fuel tank according to claim 4, wherein the fuel pump housing is configured and operable to dispense fuel from the reservoir back through the fuel fill opening in the upper housing unit of the fuel pump.

15. The fuel tank according to claim 1, wherein a bottom end of the fuel pump does not engage a bottom wall of the fuel tank opposite to the fuel fill opening.

16. The fuel tank according to claim 1, wherein the fuel tank has a unitary monolithic construction.

17. A fuel pump assembly comprising:
a pump housing including an annular upper housing unit and a vertically elongated lower housing unit removably coupled thereto;
the upper housing unit configured for detachable coupling to a fuel fill opening in a fuel tank through which fuel is added to the tank, the upper housing unit including an internal cavity;
the lower housing unit having a longitudinal concavity in fluid communication with the internal cavity of the upper housing unit; and
a fuel pump coupled to the lower housing unit.

18. The fuel pump assembly according to claim 17, wherein the longitudinal concavity is configured to receive the fuel from the cavity of the upper housing unit in a vertical direction and introduce the fuel into a reservoir of the tank in a lateral direction from the lower housing unit.

19. The fuel pump assembly according to claim 18, wherein the pump housing is supported in a vertically suspended manner from the fuel fill opening of the tank and extends for substantially an entire height of the tank inside the reservoir.

20. The fuel pump assembly according to claim 17, wherein the fuel fill opening of the tank and pump housing are collectively configured for at least partial insertion of a fueling nozzle therein associated with an external fuel source, the fuel fill opening and pump housing defining an only fuel fill pathway for adding fuel to the tank.

* * * * *